United States Patent
Pennington et al.

(10) Patent No.: US 11,436,607 B2
(45) Date of Patent: *Sep. 6, 2022

(54) SYSTEMS, DEVICES, AND METHODS FOR DLT-BASED DATA MANAGEMENT PLATFORMS AND DATA PRODUCTS

(71) Applicants: SYMBIONT.IO, INC., New York, NY (US); The Vanguard Group, Inc., Malvern, PA (US)

(72) Inventors: Warren B. Pennington, New Castle, DE (US); John C. Evans, Downingtown, PA (US); Mark Smith, St. Petersburg, FL (US); Anush Vijayaraghavan, Jersey City, NJ (US); Ron Papanek, New York, NY (US)

(73) Assignees: SYMBIONT.IO, INC., New York, NY (US); The Vanguard Group, Inc., Malvern, PA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/028,185

(22) Filed: Sep. 22, 2020

(65) Prior Publication Data

US 2021/0224805 A1  Jul. 22, 2021

Related U.S. Application Data

(63) Continuation of application No. 16/845,838, filed on Apr. 10, 2020, now Pat. No. 10,825,024.
(Continued)

(51) Int. Cl.
*H04L 29/06* (2006.01)
*G06Q 20/40* (2012.01)
(Continued)

(52) U.S. Cl.
CPC ......... *G06Q 20/405* (2013.01); *H04L 9/0643* (2013.01); *H04L 9/3263* (2013.01);
(Continued)

(58) Field of Classification Search
CPC .............. G06Q 20/405; G06Q 2220/00; H04L 9/0643; H04L 9/3263; H04L 2209/38; H04L 2209/56
See application file for complete search history.

(56) References Cited

U.S. PATENT DOCUMENTS 5,550,976 A    8/1996  Henderson et al.
9,397,985 B1   7/2016  Seger et al.
(Continued)

FOREIGN PATENT DOCUMENTS

EP    2852121        3/2015
KR    2018/0060044   6/2018
WO    WO 2018/209222 11/2018

OTHER PUBLICATIONS

Buterin, Vitalik, "A Next Generation Smart Contract and Decentralized Application Program", Ethereum White Paper, available at: https://blockchainlab.com/pdf/Ethereum_white_paper-a_next_generation_smart_contract_and_decentralized_application_platform-vitalik-buterin.pdf (Year: 2013).

(Continued)

*Primary Examiner* — Shawnchoy Rahman
(74) *Attorney, Agent, or Firm* — Knobbe, Martens, Olson & Bear, LLP

(57) ABSTRACT

The various embodiments described herein relate to systems, methods, and devices associated with distributed ledger systems (e.g., distributed ledger technology implemented on a decentralized network) that can be used to handle and manage the distribution and access of data in a manner that preserves the benefits of distributed ledger (Continued)

technology while enabling the private sharing of data. More specifically, the distributed ledger systems contemplated herein involve distributed ledger technology (DLT)-based data management platforms that can be implemented on nodes of a data management network.

19 Claims, 26 Drawing Sheets

Related U.S. Application Data

(60) Provisional application No. 62/833,502, filed on Apr. 12, 2019.

(51) Int. Cl.
  H04L 9/06 (2006.01)
  H04L 9/32 (2006.01)
  H04L 9/00 (2022.01)

(52) U.S. Cl.
  CPC ............ *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 9,569,771 | B2 | 2/2017 | Lesavich et al. |
| 9,722,790 | B2 | 8/2017 | Ebrahimi |
| 10,135,607 | B1 | 11/2018 | Roets |
| 10,146,792 | B1 | 12/2018 | Dobrek et al. |
| 10,320,843 | B1 | 6/2019 | Dobrek et al. |
| 10,476,847 | B1 | 11/2019 | Smith et al. |
| 2005/0038732 | A1 | 2/2005 | Sweeting et al. |
| 2005/0204128 | A1 | 9/2005 | Aday et al. |
| 2006/0265259 | A1 | 11/2006 | Diana et al. |
| 2007/0129958 | A1 | 6/2007 | Wu et al. |
| 2009/0182667 | A1 | 7/2009 | Parkes et al. |
| 2014/0156534 | A1 | 6/2014 | Quigley et al. |
| 2015/0262176 | A1 | 9/2015 | Langschaedel et al. |
| 2016/0210710 | A1 | 7/2016 | Glennon |
| 2016/0342994 | A1 | 11/2016 | Davis |
| 2016/0379013 | A1 | 12/2016 | Ganesan et al. |
| 2017/0005804 | A1 | 1/2017 | Zinder |
| 2017/0011460 | A1* | 1/2017 | Molinari ............... G06Q 40/06 |
| 2017/0017954 | A1 | 1/2017 | McDonough et al. |
| 2017/0046689 | A1 | 2/2017 | Lohe et al. |
| 2017/0046698 | A1 | 2/2017 | Haldenby et al. |
| 2017/0075941 | A1 | 3/2017 | Finlow-Bates |
| 2017/0085555 | A1 | 3/2017 | Gisikalo et al. |
| 2017/0104731 | A1 | 4/2017 | Baudoin et al. |
| 2017/0116693 | A1 | 4/2017 | Rae et al. |
| 2017/0124556 | A1 | 5/2017 | Seger |
| 2017/0161829 | A1 | 6/2017 | Mazier |
| 2017/0177898 | A1 | 6/2017 | Dillenberger |
| 2017/0213221 | A1 | 7/2017 | Kurian et al. |
| 2017/0230189 | A1 | 8/2017 | Toll et al. |
| 2017/0236104 | A1 | 8/2017 | Biton |
| 2017/0243193 | A1 | 8/2017 | Manian et al. |
| 2017/0243209 | A1 | 8/2017 | Johnsrud et al. |
| 2017/0279774 | A1 | 9/2017 | Booz et al. |
| 2017/0289111 | A1 | 10/2017 | Voell et al. |
| 2017/0330159 | A1 | 11/2017 | Castinado et al. |
| 2017/0344988 | A1* | 11/2017 | Cusden .................. H04L 63/12 |
| 2017/0352012 | A1 | 12/2017 | Hearn et al. |
| 2017/0352116 | A1 | 12/2017 | Pierce et al. |
| 2018/0018738 | A1 | 1/2018 | Bernauer |
| 2018/0075686 | A1 | 3/2018 | Campero et al. |
| 2018/0089641 | A1 | 3/2018 | Chan et al. |
| 2018/0089761 | A1 | 3/2018 | Stradling et al. |
| 2018/0101848 | A1 | 4/2018 | Castagna et al. |
| 2018/0117447 | A1 | 5/2018 | Tran et al. |
| 2018/0183768 | A1 | 6/2018 | Lobban |
| 2018/0253702 | A1 | 9/2018 | Dowding |
| 2018/0254898 | A1 | 9/2018 | Sprague et al. |
| 2018/0262493 | A1 | 9/2018 | Andrade |
| 2018/0268386 | A1 | 9/2018 | Wack et al. |
| 2018/0294966 | A1 | 10/2018 | Hyun et al. |
| 2018/0375847 | A1 | 12/2018 | Schropfer |
| 2019/0012662 | A1 | 1/2019 | Krellenstein et al. |
| 2019/0013943 | A1 | 1/2019 | Maim |
| 2019/0013948 | A1 | 1/2019 | Mercuri |
| 2019/0052458 | A1 | 2/2019 | Wright et al. |
| 2019/0073666 | A1 | 3/2019 | Ortiz et al. |
| 2019/0114706 | A1 | 4/2019 | Bell et al. |
| 2019/0147532 | A1 | 5/2019 | Singh et al. |
| 2019/0166095 | A1 | 5/2019 | Tobin |
| 2019/0191293 | A1 | 6/2019 | Nelson et al. |
| 2019/0305935 | A1 | 10/2019 | Qiu |
| 2019/0373137 | A1 | 12/2019 | Krukar et al. |
| 2020/0112545 | A1 | 4/2020 | Smith et al. |

OTHER PUBLICATIONS

"Is Blockchain the Answer to E-voting? Nasdaq Believes So", Market Insite, Jan. 23, 2017, availabe at https://business.nasdaq.com/marketinsite/2017/Is-Blockchain-the-Answer-to-E-voting-Nasdaq-Believes-So.html.

Bessani, Alysson "State Machine Replication for the Masses with BFT-SMaRt", Jun. 23-26, 2014 IEEE Computer Society Washington, DC, USA.

Cecchetti, Ethan, et al. "Solidus: Confidential distributed ledger transactions via PVORM." Proceedings of the 2017 ACM SIGSAC Conference on Computer and Communications Security. ACM, 2017. (Year: 2017).

"Counterparty introduces truly trustless games on the blockchain", Jul. 2014, available at http://counterparty.io/news/introducing-fully-trustless-games-on-block.

Demirgas, M. and K. Kulkarni, Beyond True Time: Using Augmented Time for Improving Spanner, available at www.cse.buffalo.edu/~demirbas/publications/augmentedTime.pdf.

Dodis, Y., "Introduction of Cryptography—Lecture 14", Apr. 25, 2012, pp. 1-14.

Egelund-Muller, B., Elsman, M., Henglein, F., and 0. Ross, 2016, "Automated Execution of Financial Contracts on Blockchains", Working Paper, University of Copenhagen.

Eha, Brian Patrick, "Who owns what, really? In securities, Delaware may soon clear things up", Jul. 5, 2017, available at https://www.americanbanker.com/news/who-owns-what-really-in-securities-delaware-may-soon-clear-things-up.

Ethereum Homestead Documentation, Release 0.1, Dated Mar. 1, 2017, Downloaded from: https://media.readthedocs.org/pdf/ethereum-homestead/latest/ethereum-homestead.pdf on Aug. 20, 2017. (Year: 2017).

Finra, Distributed Ledger Technology: Implications of Blockchain for the Securities Industry, 2017, available at http://www.finra.org/sites/defualt/files/FINRA Blockchain Report.pdf.

Harvey, C., "Cryptofinance", 2016, available at SSRN: https://ssrn.com/abstract=2438299.

International Search Report and Written Opinion issued in PCT App. No. PCT/US2018/041052, dated Nov. 16, 2018.

Irrera, Anna, "Norther Trust users blockchain for private equity record-keeping", Feb. 21, 2017 available at https://www.reuters.com/article/nthern-trust-ibm-blockchain-idUSL1N1G61TX.

Irrera, Anna and Kelly, Jemima, "London Stock Exchange Group tests blockchain for private company shares", Jul. 19, 2017, available at https://www.reuters.com/article/us-lse-blockchain/london-stock-exchange-group-tests-blockchain-for-private-company-shares-idUSKBN1A40ME.

Kharpal, Arjun, "Nasdaq to trial blockchain voting for shareholders", Feb. 12, 2016, available at https://www.cnbc.com/2016/02/12/nasdaq-to-trial-blockchain-voting-for-shareholders.html.

Klayman, Joshua Ashley, Pexk, Geoffrey R., and Wojciechowski, Mark S., "Why The Delaware Blockchain Initiative Matters to All Dealmakers", Sep. 20, 2017, available at https://www.forbes.com/sites/groupthink/2017/09/20/why-the-delaware-blockchain-initiative-matters-to-all-dealmakers/#724fa5b67550.

(56) References Cited

OTHER PUBLICATIONS

Klems, Markus, et al. "Trustless intermediation in blockchain-based decentralized service marketplaces." International Conference on Service-Oriented Computing. Springer, Cham, 2017. (Year: 2017).
International Search Report and Written Opinion issued in PCT App. No. PCT/US2020/027798, dated Jul. 24, 2020.
Lamport, Leslie, "Time, Clocks, and the Ordering of Events in a Distributed System", Jul. 1978, available at https://www.microsoft.com/en-us/research/wp-content/uploads/2016/12/Time-Clocks-and-the-Ordering-of-Events-in-a-Distributed-System.pdf.
Metz, Cade, "SEC Approves Plan to Issue Stock via Bitcoin's Blockchain", Dec. 15, 2015, available at https://www.wired.com/2015/12/sec-approves-plan-to-issue-company-stock-via-the-bitcoin-blockchain.
Mullin, Shepperd, "Taking Stock in Blockchains", Venture Law Blog, Jun. 9, 2017, available at https://www.venturelawblog.com/other/blockchain.
Nakamoto, S., A Peer-to-Peer Electronic Cash System, White Paper, 2008, available at https://bitcoin.org/bitcoin.
The National Institute of Standards and Technology's (NIST) 2015 SHA-3 release http://nvlpubs.nist.gov/nistpubs/FIPS/NIST.FIPS.202.pdf, the entirety of which is herein expressly incorporated by reference for all purposes.
Neisse, Ricardo, Gary Steri, and Igor Nai-Fovino. "A blockchain-based approach for data accountability and provenance tracking." Proceedings of the 12th International Conference on Availability, Reliability and Security. ACM, 2017. (Year: 2017).
Noether, Shen, "Ring Confidential Transactions", Feb. 2016, Monero Research Lab, Research Bulletin.
Pinea, A and W. Ruttemberg, "Distributed ledger technologies in securities post-trading: Revolution or evolution?" Apr. 2016, Occasional Paper Series of the European Central Bank, available at https://www.ecb.europa.eu/pub/pdf/scpops/ecbopll 72.en.pdf.
R. Tonelli, M. I. Lunesu, A. Pinna, D. Taibi and M. Marchesi, "Implementing a Microservices System with Blockchain Smart Contracts," 2019 IEEE International Workshop on Blockchain Oriented Software Engineering (IWBOSE), Hangzhou, China, 2019, pp. 22-31, (Year: 2019).
Rizzo, Pete, "Hands on With Linq, Nasdaq's Private Markets Blockchain Project", Nov. 21, 2015, available at https://www.coindesk.com/hands-on-with-linq-nasdaqs-private-markets-blockchain-project.
Solidity Documentation, Release 0.4.4 dated Feb. 13, 2017, retrieved from: https://solidity.readthedocs.io/en/v0.4.4/ introduction-to-smart-contracts.html on Aug. 15, 2018. (Year: 2017).
Tinianow, Andrea and Long, Caitlin, "Delaware Blockchain Initiative: Transforming the Foundational Infrastructure of Corporate Finance", Mar. 16, 2017, available at https://corpgov.law.harvard.edu/2017/03/16/delaware-blockchain-initiative-transforming-the-foundational-infrastructure-of-corporate-finance.
Tinianow, Andrea, Smith, Mark, Long, Caitlin, and Santori, Marco, "Delaware's 2017 Resolution: Make Blockchain a Reality", Jan. 3, 2017, available at https://www.coindesk.com/what-expect-delaware-blockchain-initiative-2017.
Udris, Jonas, "Using Blockchain Technology for Limited Company Shares Management", Miner One, Jan. 18, 2018, available at https://medium.com/@minerone.io/using-blockchain-technology-for-limited-company-shares-management-cd8c344c2954.
UK Government Office for Science, 2016, Distributed Ledger Technology: Beyond the Block Chain, available at https ://www.gov.uk/government/... data/.. ./gs-16-1-di stributed-1 edgertechnology. Pdf.
Yermack, David, "Corporate Governance and Blockchains", National Bureau of Economic Research, Dec. 2015, available at https://www.nber.org/papers/w21802.pdf.
Zhang, Peng, et al. "Metrics for assessing blockchain-based healthcare decentralized apps." 2017 IEEE 19th International Conference on e-Health Networking, Applications and Services (Healthcom). IEEE, 2017. (Year: 2017).
Christidis et al., "Blockchains and Smart Contracts for the Internet of Things", IEEE Access 4, 2016, vol. 4, pp. 2292-2303.

\* cited by examiner

Node A and Node B are in Channel X
Node C alone is in Channel Y

| | Node A | Node B | Node C |
|---|---|---|---|
| Distributed Log | $\sum TX_x = \sum TX_x + TX_y + ... =$ $TX_1, TX_2, TX_3, TX_4, TX_5, TX_6, ...$ | $\sum TX_x = \sum TX_x + TX_y + ... =$ $TX_1, TX_2, TX_3, TX_4, TX_5, TX_6, ...$ | $\sum TX_x = \sum TX_x + TX_y + ... =$ $TX_1, TX_2, TX_3, TX_4, TX_5, TX_6, ...$ |
| StateDB (Channel X) | $State_j = Execute(\sum_j TX_x = TX_1, TX_4, TX_5, ..., TX_y)$ | $State_j = Execute(\sum_j TX_x = TX_1, TX_4, TX_5, ..., TX_y)$ | Null |
| StateDB (Channel Y) | Null | Null | $State_j = Execute(\sum_j TX_y = TX_3, TX_5, TX_6, ..., TX_x)$ |

FIG. 16A

SYSTEMS, DEVICES, AND METHODS FOR DLT-BASED DATA MANAGEMENT PLATFORMS AND DATA PRODUCTS

CROSS-REFERENCE TO RELATED APPLICATIONS

This application claims is a continuation of U.S. patent application Ser. No. 16/845,838, filed Apr. 10, 2020, and titled "SYSTEMS, DEVICES, AND METHODS FOR DLT-BASED DATA MANAGEMENT PLATFORMS AND DATA PRODUCTS," which claims the benefit of U.S. Provisional Patent Application No. 62/833,502, filed Apr. 12, 2019, and titled "SYSTEMS, DEVICES, AND METHODS FOR DLT-BASED DATA MANAGEMENT PLATFORMS AND DATA PRODUCTS," which is hereby incorporated by reference in its entirety.

FIELD OF THE DISCLOSURE

This disclosure relates to computer systems, devices, and methods for distributed ledger systems, and in particular, to computer systems, devices, and methods for data management networks that utilize distributed ledger technology (DLT)-based data management platforms.

BACKGROUND

Distributed ledger technology, such as blockchains, can be used in decentralized networks for transferring, verifying, and storing data across an electronic network. For example, users of cryptocurrency can keep track of transactions by storing transaction data in a distributed ledger system maintained across a network of computing systems that are not under the central command of a single server and/or authority. Without a central command server and/or authority, the computing systems operating within the network can be considered "trustless" in the sense that the computing systems are acting independently. Generally speaking, to ensure the consistency of the data in the distributed ledger system and across the network, all the computing systems operating within the network must process and store the data received by the network in a manner such that the data is accessible to all participants.

However, distributed ledger technology has not yet been used for data management networks to provide digital data management and distribution services due to certain technical shortcomings, despite the existence of various use cases where obtaining and providing access to accurate, complete, and authenticated data can be critical. For instance, accurate, complete, and authenticated data can be critical to the daily functioning of automated systems and the decision making process within much of the financial services sector, and a data management network that leverages distributed ledger technology and that addresses existing technical shortcomings could offer numerous benefits to those entities that are engaged in financial services. As a non-limiting example of such technical shortcomings, trust and consistency in a decentralized network is often at odds with privacy under existing decentralized network frameworks and technologies; since distributed ledger systems require that all the computing systems operating within the network must be able to access and process all available data to ensure consistency, there may not be technical processes or mechanisms in place for the private sharing of data or data access and rights management.

Accordingly, there exists a need for data management networks that utilize distributed ledger technology (e.g., on a decentralized network), such as distributed ledger technology (DLT)-based data management platforms, which can be used to handle and manage the distribution, access, and even generation, of data in a manner that preserves the benefits of distributed ledger technology while enabling the private sharing and/or management of data throughout its course of existence. Embodiments of the present disclosure address these technical issues and more.

SUMMARY OF THE DISCLOSURE

The various embodiments described herein relate to systems, methods, and devices associated with distributed ledger systems, and more specifically, to data management networks that utilize distributed ledger technology (DLT)-based data management platforms, that can be used to handle and manage the distribution, access, and even generation, of data in a manner that preserves the benefits of distributed ledger technology while enabling the private sharing and/or management of data throughout its course of existence.

In particular, in some embodiments, the data management network may consist of one or more nodes run by independent parties (including data providers, data subscribers, third parties, and the like), in contrast to a traditional distributed system, in which it is assumed that the network is managed by a single entity. In some embodiments, a data management platform may operate on each node of the data management network, and the data management platform may implement distributed ledger technology, such as blockchain. The data management platform may allow for data from a node to be distributed over the entire data management network (e.g., to all the nodes) by publishing that data to a distributed log or distributed ledger, which may involve broadcasting the data to all the nodes where it can be stored locally by each node. Thus, each node in the data management network may record and keep track of all the data that has been communicated over the entire data management network and be capable of using that data to replicate any changes in state that have occurred.

In some embodiments, private communications between a set of nodes can be implemented by establishing one or more private communications or distribution channels, in which all the nodes (alternatively, user/network identities which may be associated with nodes) that are part of a private channel are provided with the same cryptography key (e.g., encryption and/or decryption key). A node may "privately" distribute data to other nodes in a private channel by encrypting the data with the key associated with the channel prior to publishing that data to the distributed log. In some embodiments, although encrypted data is publicly accessible once published to the distributed log, only the nodes and/or the user/network identities that are part of the private channel will have the key needed to decrypt and read (e.g., make sense of) the data. In some embodiments, the key needed to decrypt and read the data can be changed or rotated by one or more members or users of a private data channel, for example to remove a member from the private data channel or for other purposes as described herein.

In some embodiments, one or more "smart contracts" may be deployed and integrated into the data management platform. Smart contracts can refer to computer programs that can be executed by nodes in the data management network, automatically for example upon a certain predetermined condition(s) being met, in order to carry out various functions, such as to produce shared states from a set of inputs. In some embodiments, the smart contracts deployed on the data management platform may enable the nodes to perform numerous functions associated with handling and managing the distribution, access, and generation of data. For example, in some embodiments, one or more smart contracts can be used to allow nodes to search and demonstrate datasets that are offered across the data management network, which can be published or otherwise made available by one or more data publishers on the data management network. Further, in some embodiments, one or more smart contracts can be used to manage the subscription and licensing of the datasets, and nodes that subscribe to a particular dataset can be added to a private channel associated with the dataset in order to be provided access to the dataset. In addition, in some embodiments, one or more smart contracts can be used to facilitate quality control and error correction for the data in a datasets, by allowing one or more nodes, such as for example those nodes that subscribe and/or otherwise have access to the data, to broadcast any errors that have been spotted in the data and propose corrections to the data to address those errors. Furthermore, in some embodiments, one or more smart contracts can be used by the nodes to design or generate new data products, which can consist of various outputs that the smart contract can compute based on a set of input data that the node has access to. An example of a new data product in the financial services context is an index that is based on a list of securities and their weightings, for which a smart contract can be used to automatically and/or dynamically compute the index value from the weightings and the values of the individual securities in the list.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

Various aspects of the novel systems, techniques, and user interfaces are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, methods, and user interfaces disclosed herein, whether implemented independently of or combined with any other aspect. For example, a system may be implemented or a method may be practiced using any number of the aspects set forth herein. In addition, the scope is intended to encompass such a system or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

In various embodiments, a computer-implemented method is contemplated for providing a distributed ledger technology-based database configured to control and manage one or more private data subscriptions to data stored on the distributed ledger technology-based database. The method may include providing a platform for generation of a subscription of a user identity registered on a first trustless decentralized network node of a trustless decentralized network node system to a dataset on the distributed ledger technology-based database, wherein generation of the subscription is based at least in part on a first plurality of predetermined electronic actions deployed on the distributed ledger technology-based database, wherein the first plurality of predetermined electronic actions are configured to direct a subscription process, wherein the dataset is provided to the distributed ledger technology-based database by a second trustless decentralized network node of the trustless decentralized network node system, wherein the subscription process results in a codified joint agreement establishing a right of the user identity registered on the first trustless decentralized network node to receive the dataset from the second trustless decentralized network node over the trustless decentralized network node system, wherein generation of the subscription of the user identity registered on the first trustless decentralized network node of the trustless decentralized network node system to the dataset on the distributed ledger technology-based database is initiated based at least in part by the user identity registered on the first trustless decentralized network node initiating subscription to the dataset among a plurality of datasets stored on the distributed ledger technology-based database by executing a second plurality of predetermined electronic actions deployed on the distributed ledger technology-based database, wherein the second plurality of predetermined electronic actions are configured to initiate the subscription, wherein the dataset comprises one or more financial index data, wherein the distributed ledger technology-based database is formed by the first trustless decentralized network node and the second trustless decentralized network node of the trustless decentralized network node system, and wherein each of the first trustless decentralized network node and the second trustless decentralized network node of the trustless decentralized network node system comprises a computer processor and an electronic storage medium.

In some embodiments, a single smart contract deployed on the distributed ledger technology-based database comprises the first plurality of predetermined electronic actions and the second plurality of predetermined electronic actions. In some embodiments, a first smart contract deployed on the distributed ledger technology-based database comprises the first plurality of predetermined electronic actions, wherein a second smart contract deployed on the distributed ledger technology-based database comprises the second plurality of predetermined electronic actions, wherein the first smart contract and the second smart contract are separate. In some embodiments, the dataset provided to the distributed ledger technology-based database by the second trustless decentralized network node is broadcast to all trustless decentralized network nodes of the trustless decentralized network node system.

In some embodiments, each trustless decentralized network node of the trustless decentralized network node system maintains a local copy of the distributed ledger technology-based database. In some embodiments, the dataset is encrypted with a key before the dataset is provided to the distributed ledger technology-based database by the second trustless decentralized network node, wherein the subscription process further results in the user identity registered on the first trustless decentralized network node being provided with the key, and wherein the key enables the first trustless decentralized network node to decrypt the encrypted dataset. In some embodiments, the provision of the key to the user identity registered on the first trustless decentralized network node provides access to the user identity to a private channel for accessing the dataset.

In some embodiments, the user identity registered on the first trustless decentralized node is permissioned to execute the second plurality of predetermined electronic actions deployed on the distributed ledger technology-based database. In some embodiments, the second trustless decentralized node is permissioned to execute the first plurality of predetermined electronic actions deployed on the distributed ledger technology-based database.

In some embodiments, the method may further include deploying a third plurality of predetermined electronic actions configured to direct an index generation process for calculating an index value based on at least the one or more financial index data. In some embodiments, the platform may be further configured for the generation of a data product by the first trustless decentralized network node, wherein generation of the data product is based at least in part on a third plurality of predetermined electronic actions configured to direct a data product generation process based at least in part on the dataset and the subscription of the first trustless decentralized network node of the trustless decentralized network node system to the dataset.

In some embodiments, the one or more financial index data comprises a list of constituent securities and weightings for the list of constituent securities. In some embodiments, the distributed ledger technology-based database comprises a blockchain. In some embodiments, the platform is operated on each trustless decentralized network node of the trustless decentralized network node system, including the first trustless decentralized network node and the second trustless decentralized network node. In some embodiments, the plurality of datasets stored on the distributed ledger technology-based database are datasets broadcast as available for distribution over the trustless decentralized network node system.

In various embodiments, a trustless decentralized network node system is contemplated that comprises: a plurality of trustless decentralized network nodes each comprising a computer processor and an electronic storage medium, wherein the plurality of trustless decentralized network nodes includes a first trustless decentralized network node and a second trustless decentralized node; a platform operating on the plurality of trustless decentralized network nodes; and a distributed ledger technology-based database maintained by the plurality of trustless decentralized network nodes through the platform, wherein the platform is configured for generation of a subscription of a user identity registered on the first trustless decentralized network node to a dataset on the distributed ledger technology-based database, wherein generation of the subscription is based at least in part on a first plurality of predetermined electronic actions deployed on the distributed ledger technology-based database, wherein the first plurality of predetermined electronic actions are configured to direct a subscription process, wherein the dataset is provided to the distributed ledger technology-based database by the second trustless decentralized network node, wherein the subscription process results in a codified joint agreement establishing a right of the user identity registered on the first trustless decentralized network node to receive the dataset from the second trustless decentralized network node over the trustless decentralized network node system, wherein generation of the subscription of the user identity registered on the first trustless decentralized network node to the dataset on the distributed ledger technology-based database is initiated based at least in part by the user identity registered on the first trustless decentralized network node initiating subscription to the dataset among a plurality of datasets stored on the distributed ledger technology-based database by executing a second plurality of predetermined electronic actions deployed on the distributed ledger technology-based database, wherein the second plurality of predetermined electronic actions are configured to initiate the subscription, and wherein the dataset comprises one or more financial index data.

In some embodiments, the dataset is encrypted with a key before the dataset is provided to the distributed ledger technology-based database by the second trustless decentralized network node, wherein the subscription process further results in the user identity registered on the first trustless decentralized network node being provided with the key, and wherein the key enables the first trustless decentralized network node to decrypt the encrypted dataset. In some embodiments, the platform is further configured for the generation of a data product by the first trustless decentralized network node, wherein generation of the data product is based at least in part on a third plurality of predetermined electronic actions configured to direct a data product generation process based at least in part on the dataset and the subscription of the first trustless decentralized network node of the trustless decentralized network node system to the dataset. In some embodiments, the one or more financial index data comprises a list of constituent securities and weightings for the list of constituent securities. In some embodiments, the distributed ledger technology-based database comprises a blockchain.

BRIEF DESCRIPTION OF THE DRAWINGS

The following drawings and the associated description herein are provided to illustrate specific embodiments of the disclosure and are not intended to be limiting.

FIG. 16A is a schematic diagram illustrating an example embodiment(s) of controlled sharing of information on a distributed ledger;

DETAILED DESCRIPTION

Figure 1:
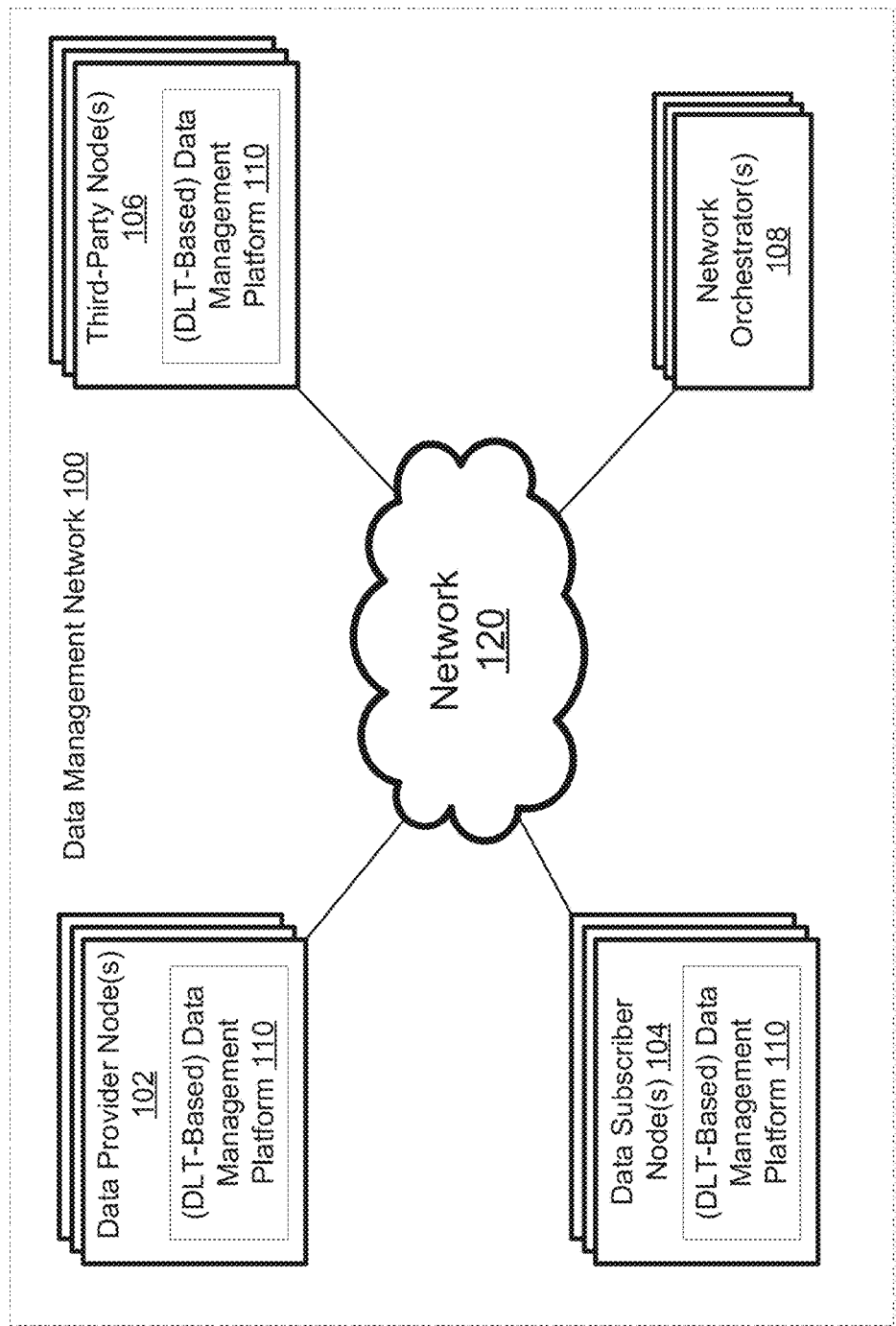
FIG. 1 is a system diagram illustrating the components of a data management network, in accordance with some embodiments of the present disclosure.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Terms

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), mass storage devices, and/or the like. Another example of a data store is a hosted storage environment that includes a collection of physical data storage devices that may be remotely accessible and may be rapidly provisioned as needed (commonly referred to as "cloud" storage). Additional examples of data stores may include non-transitory memory that stores data, such as dynamic random access memory (DRAM) device, a static random access memory (SRAM) device, flash memory or some other memory devices.

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

As used herein, a data provider (which may also be referred to herein as a data publisher or a publisher) may refer to any entity associated with a node on the data management network (e.g., the entity operating the node) that serves as a primary source of data that is published and distributed by the data provider over the data management network. However, it should be noted that the use of the term data provider may be context-dependent and its application can depend on the dataset being distributed (e.g., an entity can be a data provider with respect to some datasets and a data subscriber with respect to other datasets) or an evaluation of the activity that the entity is primarily engaged in.

As used herein, a data subscriber (which may also be referred to herein as a data consumer or a consumer) may refer to any user (e.g., entity/firm) associated with a node on the data management network (e.g., the entity operating the node) that receives data published and distributed over the data management network, and particularly an entity that has subscribed to data offered by a data provider through the data management network. However, it should be noted that the use of the term data subscriber may be context-dependent and its application can depend on the dataset being distributed (an entity can be a data provider with respect to some datasets and a data subscriber with respect to other datasets) or an evaluation of the activity that the entity is primarily engaged in.

As used herein, a third party may refer to any user (e.g., entity/firm) associated with a node on the data management network (e.g., the entity operating the node) that may be engaged in providing additional services to participants of the data management network and is not readily classified as strictly a data provider or a data subscriber. For example, third parties may include redistributors or aggregators, who may license primary source data (e.g., from data providers) for the purposes of redistribution and aggregation (e.g., by distributing their value-added data products to the data management network in separate distribution channels, or via API streaming to those participants that do not host a node on the network).

As used herein, a network identity (also referred to herein as a user identity) may be a unique identity in the data management network that is assigned to a particular user or entity. The network identity may include a unique identifier on the data management network. The network identity may be involved in controlling access and permissions (e.g., to smart contract functionality), as well as in subscriptions (e.g., to datasets). When a user of a node performs actions within the data management platform, such as publishing messages to the distributed log, the network identity of the user may be used to provide user authenticity (e.g., by signing messages with keys associated with the network identity or a unique identifier associated with the network identity). Thus, in some embodiments, through the use of network identities and private channels, it is possible to both share information privately between users/nodes and also verify the authenticity of any messages published by a user of a node.

However, it should be noted that, in some embodiments, a single node may have multiple users, and thus, also have multiple network identities in a multi-tenant deployment. Each network identity on a node may represent a different user (e.g., entity/firm), and each of those users may be treated as a separate party that is provided access by the node host (which can be an independent third party). Each user may be given access in accordance with their network identity, in a manner where all of the privacy provided to the different network identities of the node is maintained. For example, one network identity cannot see private data visible to another network identity on the same node.

As used herein, a smart contract may include one or more predetermined sets of instructions, logic, or electronic actions (also referred to herein as smart contract logic or smart contract functionality) that can be deployed and integrated into the data management platform to be executed by nodes in the data management network (e.g., like predefined computer code or computer programs)—for example automatically and/or dynamically upon one or more predetermined conditions being met.

Overview

Generally speaking, a data management network can be used to connect various entities and manage how data between the entities can be discovered, accessed, and/or distributed. This disclosure contemplates a data management network that is based on distributed ledger technology, such as blockchain. In some embodiments, the data management network may comprise one or more nodes operated by the various entities that participate in use of the data management network (including data providers, data subscribers, third parties, and the like), in contrast to a traditional distributed system, in which it is assumed that the network is managed and/or controlled by a single entity.

In some embodiments, a data management platform may simultaneously operate on each of the nodes of the data management network and link them together, and the data management platform may implement distributed ledger technology, such as blockchain. In some embodiments, through the data management platform, a distributed log or distributed ledger (e.g., a consensus version of all the data in the network) can be maintained across all the nodes. In some embodiments, the data management platform may allow for data from a node to be distributed over the entire data management network (e.g., to all the nodes) by publishing that data to the distributed log, which may involve broadcasting the data to all the nodes where it can be stored locally by each node. Thus, each node in the data management network may record and keep track of all the data that has been communicated over the entire data management network and be capable of using that data to replicate any changes in state that have occurred.

In some embodiments, the data management platform may allow for private communications or the private sharing of data between nodes (or, alternatively, users of those nodes) in the data management network. For example, private communications between a set of nodes can be implemented by establishing private communications or distribution channels, in which all the nodes (or, alternatively, the users of those nodes) that are part of a private channel are provided with the same cryptographic key (e.g., encryption and/or decryption key). A node may "privately" distribute data to other nodes via a private channel by encrypting the data with the key associated with the channel prior to publishing that data to the distributed log. In some embodiments, although encrypted data is publicly accessible once published to the distributed log, only the nodes that are part of the private channel will have the key needed to decrypt and read (e.g., make sense of) the data.

Furthermore, the data management platform may allow any such private communications to be verified. Each user (e.g., entity) of a node may be provided with a network identity serving as a unique identifier on the data management network, and the network identity may be stored by the node. When a user of a node performs actions within the data management platform, such as publishing messages to the distributed log, the node may carry out the action using the network identity of the user (e.g., signing messages with keys associated with the network identity). Thus, in some embodiments, through the use of network identities and private channels, it is possible to both share information privately between users/nodes and also verify the authenticity of any messages published by a user of a node.

In some embodiments, the data management platform may allow for one or more nodes to execute one or more "smart contracts," which can refer to predefined computer code or computer programs that can be executed by nodes in the data management network, for example automatically and/or dynamically upon one or more predetermined conditions being met. Smart contracts may comprise one or more predetermined sets of instructions, logic, and/or electronic actions that can be deployed and integrated into the data management platform. In some embodiments, one or more specific user identities registered on a specific node of a distributed ledger technology system can be permissioned to execute one or more specific smart contracts, or permissioned to execute one or more predetermined sets of instructions, logic, and/or one electronic actions. As an example, in a basic form, a smart contract can be used to produce shared states from a set of inputs. Having said this, in some embodiments, a wide variety of smart contracts can be deployed and integrated into the data management platform that expand the functionality of the data management network for its participants. For example, in some embodiments, there may be one or more smart contracts that the nodes can execute in order to perform functions associated with managing the creation, maintenance, discovery, distribution, access, aggregation, redistribution, and/or generation of data.

As some additional examples, in some embodiments, there could be one or more smart contracts that may allow nodes to search and evaluate datasets that are offered (e.g., by data providers) across the data management network. Smart contracts can be used to manage the subscription and licensing of the datasets, and users of nodes that subscribe to a particular dataset can be added to a private channel associated with the dataset in order to be provided access to the dataset. Smart contracts can be used to facilitate quality control and error correction for the data in a dataset, by allowing nodes to broadcast any errors that have been spotted in the data and propose corrections to the data to address those errors. Smart contracts can also be used by the nodes to design or generate new data products, which can comprise various outputs that the smart contract can compute based on a set of input data that the node has access to. In some embodiments, network identities of nodes can be permissioned based on roles (e.g., data provider, data subscriber) of their associated users/entities and smart contracts may enforce access control rules based on roles. Thus, a network identity (and the node hosting the network identity) can be permissioned via one or more smart contracts, or the one or more predetermined sets of instructions among the smart contracts, to act in a predefined capacity based on its role. For instance, smart contract functionality (e.g., predetermined sets of instructions among smart contracts) for searching and evaluating datasets that are offered across the data management network may be accessed and executed by a data subscriber node since that functionality is important to data subscribers.

Smart contracts can also be deployed and integrated into the data management platform in order to add functionality that is tailored to specific business purposes or industries. For example, the data management network may be used by entities involved in financial services for the distribution of financial data, and smart contracts can be deployed that are specific to that context. For example, in the financial services context, an example of a new custom data product that can be generated from existing financial data being distributed over the network is a financial index, comprising a list of securities and their weightings. In some embodiments, one or more smart contracts can be deployed and used to compute the index value from the weightings and the values of the individual securities in the list. Thus, an entity in the data management network could design a new index that can be generated based on a smart contract, and any other participant with access to the smart contract and the necessary input data used in the index calculation could execute the smart contract to recreate the same index for validation purposes.

To summarize, in some embodiments, a number of entities, such as data providers (e.g., publishers) and/or data subscribers (e.g., consumers) may host one or more nodes that operate a distributed ledger technology (DLT)-based data management platform as part of a data management network, which can serve as a marketplace of data that connects data providers to data subscribers) and allows third parties (redistributors, aggregators, etc.) to provide additional services to network participants. There may be many practical and technical benefits that are associated with this approach.

For instance, in some embodiments, this approach provides a higher degree of data consistency and transparency while maintaining each data provider's ownership of their data and/or intellectual property. Since distributed ledger technology serves as a single source of truth for all data distributed over it, using it in a data management network in the manner described allows for data providers to push data via private distribution channels, permission specific data subscribers with access to the distribution channels, and/or guarantee consistency of their data across all nodes on the network—eliminating any potential for variation or discrepancies introduced by using more traditional technologies.

In addition, in some embodiments, through the use of smart contracts that expand the functionality of the DLT-based data management platform, the data management platform can be used as an integrated end-to-end solution for executing the workflows associated with the creation, maintenance, distribution, aggregation, and/or redistribution of data and/or the generation of secondary/new datasets. Whereas multiple programs and scripts may have been required previously to handle the different parts of these workflows (e.g., a web browser for discovering and downloading datasets, a software for viewing and reformatting the data, a custom script for processing or aggregating the data, an email client for communicating with the data provider and submitting a support ticket upon identifying an error in the data, etc.), network participants can singularly rely on the data management platform which in comparison may allow for reduced expenditures of computing resources, such as processing and memory, as well as processing time. By having a data management platform that serves as a shared model for subscribing to and distributing datasets, each data provider would not be required to use their own unique integration/solution for on-boarding data subscribers and distributing the data.

To illustrate this example, consider a typical scenario in which data can be acquired and errors addressed without the data management network described herein. A consumer may use a web browser to purchase and download a dataset (e.g., financial data) from a website of a data provider. Or the consumer may subscribe to the dataset through standard sales processes (e.g., engagement, CRM tools), then gets permissioned within the data provider's proprietary solution (in comparison, the data management platform described herein is a shared model so each data provider does not require a unique integration). If the consumer identifies errors in the dataset, the consumer could send an email (e.g., via an email client) to the data provider that describes the problem. If the consumer is lucky enough, the website of the data provider may have forums on which consumers can share identified errors in the dataset and discuss potential corrections to those errors. The consumer could alternatively use their web browser again to start a thread in the forum that describes the problem. Once the data provider has learned of the problem, either through email or from reading the thread, the data provider can correct the data. Once the data provider has corrected the data, the data provider may issue an email to all consumers which purchased and subscribed to the data that there is an updated dataset available which corrects the error. Each consumer may then go back to the website and download the updated dataset through their respective web browsers. The updated dataset could be quite large despite having very few changes from the initial dataset, in which case each consumer has basically downloaded the dataset twice and is in possession of multiple copies of the dataset, which is a waste of bandwidth and hard drive space, as well as computer processing. In this case, between all the consumers and the data provider, there were many different software collectively used and resources collectively expended in order to: obtain and distribute data; identify and notify of errors in the data; and push out the corrected data. Instead, in some embodiments described herein, all of this could be done through the data management platform, which would allow for faster overall processing and less processing power, memory, time, and data storage to be used among the collective parties.

Additionally, in some embodiments described herein, use of the data management platform in a data management network as an end-to-end solution provides network participants with the convenience of a single software platform without sacrificing power and flexibility. Various smart contracts can be used to introduce novel capabilities to the data management platform that can be tailored for specific business purposes and the type of data being shared through the data management network. Thus, the data management networks could be used by participants to share and process any kind of data, including financial and non-financial data of varying types, such as security masters, index data, various market data, credit ratings, environmental/social/governance, sector information, as well as arbitrary other data (which may be proprietary in some cases).

In some embodiments, the described approach also provides benefits in the realm of network security and authentication, as well as data integrity and data redundancy. In some embodiments, the data management platform handles identity and access management. In some embodiments, data published to the distributed log is cryptographically signed by the network identity of the user publishing the data to ensure the authenticity and integrity of the data. The distributed log can also serve as an immutable record that can be used for data versioning or provenance and to catalog any changes made to the data, providing transparency to all changes made to the data and tracking of the entire history of the data. It also makes the data more secure, since it prevents data providers from making secretive changes to the data without the data subscribers being able to find out. Furthermore, data can be validated through the use of one or more smart contracts (e.g., smart contracts can be used to calculate index values to ensure they match what an index provider is reporting). In some embodiments, data redundancy is maintained by having nodes locally store copies of the distributed log; a node can be able to access data published to the distributed log, even if many nodes in the network (including the node that is the primary source of the data) fail. Also, data may be encrypted prior to publishing to ensure that only the authorized network identities (e.g., consumers who have subscribed to the data and are part of the private channel for the data) are able to view and make use of the data.

Data Management Networks

With respect to the figures, FIG. 1 is a system diagram that illustrates the components of a data management network 100.

As shown in FIG. 1, the data management network 100 may include one or more data provider nodes 102 that are each running a distributed ledger technology (DLT) based data management platform 110; one or more data subscriber nodes 104 that are each running the DLT-based data management platform 110; one or more third-party nodes 106 that are each running the DLT-based data management platform 110, and one or more network orchestrators 108. For the purposes of simplicity and facilitating understanding, many of the figures and their accompanying descriptions within this disclosure may refer to a single data provider node 102, data subscriber node 104, third-party node 106, and/or network orchestrator 108; however, it should be understood that there can be numerous data provider nodes 102, data subscriber nodes 104, third-party nodes 106, and/or and network orchestrators 108. In some embodiments, on each of the one or more data provider nodes 102, one or more data subscriber nodes 104, one or more third-party nodes 106, and one or more network orchestrators 108, there can be one or more network identities registered thereon. For example, in some embodiments, such as in a multi-tenant deployment, a single node may have multiple network identities, each of which may be associated with a different user (e.g., entity/firm) that has been provided access to, and use of, the node by the node host (which can be third party that is independent from those users).

The components of the data management network 100, including the data provider nodes 102, the data subscriber nodes 104, the third-party nodes 106, and the network orchestrators 108, may be communicatively coupled via a network 120. The network 120 can be of a conventional type, wired or wireless, and may have numerous different configurations including a star configuration, token ring configuration or other configurations. Furthermore, the network 120 may include a local area network (LAN), a wide area network (WAN) (e.g., the Internet), and/or other interconnected data paths across which multiple devices may communicate. In some implementations, the network 120 may be a peer-to-peer network. The network 120 may also be coupled to or include portions of a telecommunications network for sending data in a variety of different communication protocols. In some implementations, the network 120 includes Bluetooth communication networks or a cellular communications network for sending and receiving data including via short messaging service (SMS), multimedia messaging service (MMS), hypertext transfer protocol (HTTP), direct data connection, WAP, email, etc.

The network orchestrators 108 may be one or more entities that may provide the data management platform 110 (e.g., the software and technology associated with the data management platform 110) and maintain the data management platform 110, such as by helping troubleshoot any bugs or issues that arise during operation of the data management platform 110 by the nodes 102, 104, and 106. In some embodiments, the network orchestrators 108 may also author and update smart contracts that can be deployed and integrated into the data management platform 110 in order to expand the functionality of the data management platform 110. However, in some embodiments, the nodes 102, 104, and 106 may also be able to author and update smart contracts that can be executed within the data management platform 110, such as smart contracts configured to implement custom terms for contractual agreements, and so forth.

The data provider nodes 102 may be nodes or computing systems that are each hosted by a respective data provider (e.g., entities that serve as a primary source of data distributed over the data management network 100). The data subscriber nodes 104 may be nodes or computing systems that are each hosted by a respective data subscriber (e.g., entities that subscribe to and receive data distributed over the data management network 100).

The third-party nodes 106 may be nodes or computing systems that are each hosted by a respective third party (e.g., entities that may be engaged in providing additional services, such as redistribution and/or aggregation of primary source data, to the other participants of the data management network 100). Examples of third parties include redistributors and aggregators, which may act as hubs for licensing primary source data for redistribution and aggregation, then distributing their resulting value added products to the network in separate distribution channels, or via API streaming to those participants that do not host a node on the network. In general, these data redistributors and aggregators may include parties that get data from a primary source data provider. They may optionally modify, cleanse, aggregate, and validate that data. They may then re-distribute the full set of data or one or more subsets of the data to other consumers, who can be either on the network or off the network. In some cases, the end consumers receiving the redistributed data will be required to have licenses provided by the primary source data providers to access the redistributed data.

In the process of aggregating data received from multiple primary source data providers, data aggregators may encounter contradictions or differences between the same data points (such as the price of a given security) reported by different data providers. In these cases, each data aggregator can have their own set of rules governed by a smart contract that defines how they will resolve differences in the reported value of the data point. These can include approaches such as throwing out outliers (e.g., if two out of three providers agree on the value, then use that number), average all of the values received for each data point, always trust a specific provider for a given value, and so forth.

In some embodiments, the data provider nodes 102, data subscriber nodes 104, and/or third-party nodes 106 may each operate on one or more hardware servers that are communicatively coupled to network 120 and include a processor, a memory and network communication capabilities. In some embodiments, the data provider nodes 102, data subscriber nodes 104, and/or third-party nodes 106 may each operate on a system of one or more computers, one or more virtual machines executing on a system of one or more computers, as a cloud computing service (e.g., on a cluster of computing devices), and so forth.

Thus, the data management network 100 may be used to connect data providers (e.g., publishers) operating the data provider nodes 102 to data subscribers (e.g., consumers) operating the data subscriber nodes 104, while allowing third-parties (e.g., redistributors, aggregators, etc.) operating the third-party nodes 106 to provide additional services to network participants.

DLT-Based Data Management Platforms

Figure 2:
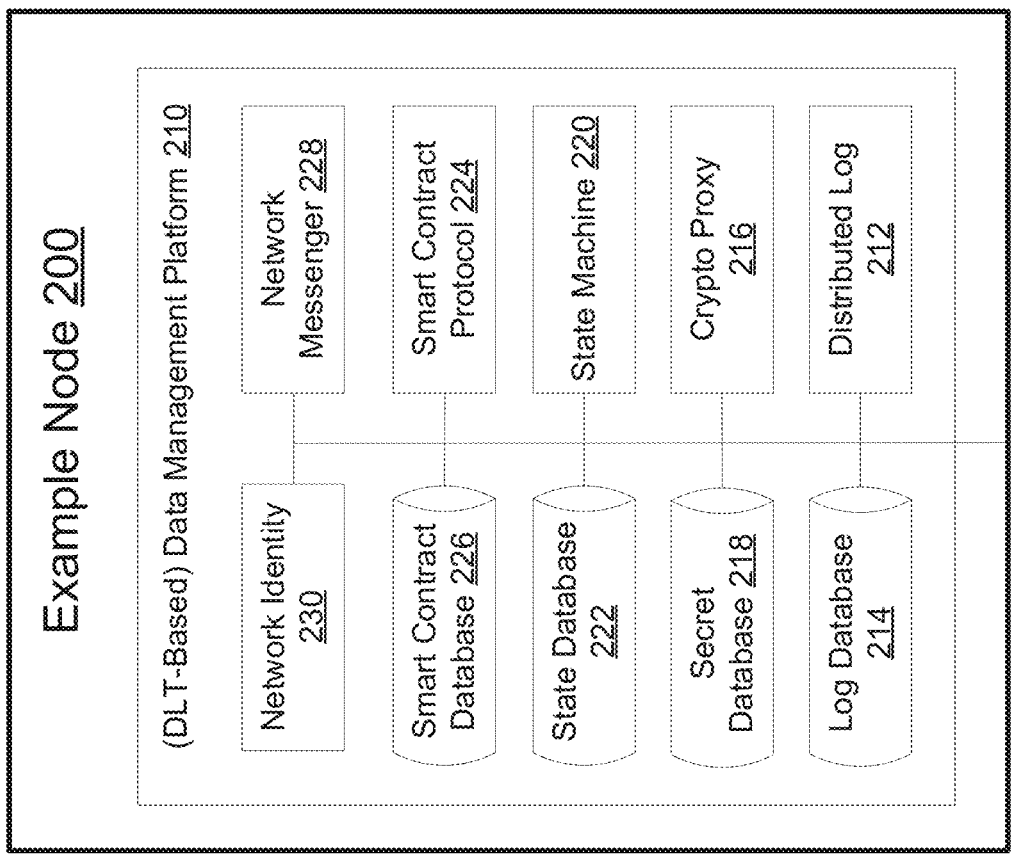
FIG. 2 is a block diagram illustrating components of a DLT-based data management platform running on a node of a data management network, in accordance with some embodiments of the present disclosure.

FIG. 2 is a block diagram illustrating components of a DLT-based data management platform 210 running on an example node 200.

As shown in FIG. 2, the DLT-based data management platform 210 running on the example node 200 may include a distributed log 212, a log database 214, a crypto proxy 216, a secret database 218, a state machine 220, a state database 222, a smart contract protocol 224, a smart contract database 226, a network messenger 228, and a network identity 230. In some embodiments, these components of the DLT-based data management platform 210 may be locally stored on the example node 200 and/or executable by the example node 200. It should be understood that the example node 200 is shown to provide a general overview of nodes in the data management network. For instance, any of the data provider nodes 102, the data subscriber nodes 104, or the third-party nodes 106 from FIG. 1 may resemble example node 200. Accordingly, in some embodiments, each and every node in the data management network may comprise a distributed log 212, log database 214, crypto proxy 216, secret database 218, state machine 220, state database 222, smart contract protocol 224, smart contract database 226, network messenger 228, and network identity 230. However, the contents of some of the components may vary from node to node. In other embodiments, each and every node on the system can comprise at least one or more of the foregoing components, but not necessarily all of them.

As contemplated herein, the nodes of a data management network may use distributed ledger technology (DLT) to store data in a decentralized manner. The data management network may have a global distributed log (alternatively, the distributed ledger), which is a term used herein to refer to a consensus of all of the data collectively recorded across the data management network using DLT. For example, the global distributed log may include every transaction recorded by the data management network.

Furthermore, each node of the data management network may locally store a distributed log, the contents of which may depend on how the global distributed log is implemented. For example, in some embodiments, each node may locally store a distributed log that aims to replicate the global distributed log (e.g., by including a copy of all or a majority of the recorded transactions). In other embodiments, each node may locally store a distributed log that reflects a chunk of the global distributed log (e.g., data is distributed across the nodes in a piecewise manner). This feature is represented in the figure by the distributed log 212 (shown as a component of the DLT-based data management platform 210), which is locally stored on the example node 200.

In some embodiments, the example node 200 may comprise a locally-stored distributed log 212 that includes every arbitrary transaction or a set thereof ("Σ TXi") recorded by the data management network. In some embodiments, one or more and/or all of the nodes on the data management network may each have a distributed log 212, and in some of such embodiments, the distributed log 212 of each of those nodes may be identical. For example, every arbitrary transaction in the global distributed log or a set thereof ("Σ TXi") can be logged in the same order in the distributed log 212 of example node 200 and every other node in the data management network. In other words, each and every node of the data management network may individually store a copy of the same data in the identical order, and the same sequence of operations, and how one operation depends upon the previous operation(s) can be tracked by every node on the data management network to guarantee and maintain data/information consistency. In some embodiments, every arbitrary transaction in the distributed log 212 (e.g., "Σ TXi") can be encrypted.

In some embodiments, the example node 200 may comprise a log database 214 that stores the contents of transactions recorded in the distributed log 212, such as Σ TXi. In some embodiments, one or more and/or all of the nodes on the data management network may each have a log database 214. In some of such embodiments, the log database 214 of each of those nodes may be identical, such that the contents for the same encrypted set of arbitrary transactions ("Σ TXi") can be stored in the log database 214 of each of those nodes.

In some embodiments, the example node 200 may comprise a crypto proxy 216 for encrypting and/or decrypting one or more transactions (e.g., recorded in the distributed log 212) using an encryption key, such as a symmetric key or asymmetric key. In some embodiments, the example node 200 may comprise a secret database 218 that stores one or more encryption keys for the private communication channels that the network identity 230 is permissioned for. The crypto proxy 216 may be configured to retrieve an appropriate encryption key from the secret database 218 for encrypting and/or decrypting a particular transaction for a particular channel. For example, if the example node 200 is generating a new transaction and/or a new channel, the crypto proxy 216 can encrypt the new transaction using an encryption key for that channel, and that encryption key can be stored in the secret database 218. Furthermore, if the secret database 218 contains the applicable encryption key for an encrypted transaction (e.g., corresponding to a particular channel) in the distributed log 212, the crypto proxy 216 may retrieve the encrypted transaction from the distributed log 212 (or the log database 214), retrieve the applicable encryption key from the secret database 218, and then decrypt the transaction.

In some embodiments, one or more and/or all of the nodes on the data management network may each have a crypto proxy 216 and a secret database 218. However, in some cases, the secret database 218 of each or some nodes may have different encryption keys stored thereon depending on the channels that the nodes are permissioned for. For example, the secret database 218 on Node A can have stored thereon an encryption key for Channel X but not for Channel Y (e.g., if Node A is a member of Channel X but not Channel Y), whereas the secret database 218 on Node B can have stored thereon an encryption key for Channel Y but not for Channel X (e.g., if Node B is a member of Channel Y but not Channel X).

In some embodiments, the example node 200 may comprise a state machine 220 for executing one or more transactions that have been decrypted. In some embodiments, the example node 200 may comprise a state database 222 for storing state information obtained by executing one or more decrypted transactions. The state machine 220 and the state database 222 may be some of the features of the DLT-based data management platform 210 that enable the use of state machine replication or a modified version thereof, whether in connection with independent or dependent channels, for the controlled and private sharing of data and information while maintaining data and information consistency on a distributed ledger.

In some embodiments, one or more and/or all of the nodes on the data management network may each have a state machine 220 and a state database 222 for storing state information obtained by executing one or more decrypted transactions. However, in some cases, the state database 222 of each or some nodes may have different states stored thereon for one or more channels (e.g., due to the differences in the channels that the nodes have access to). For example, a state database 222 on Node A can have stored thereon up-to-date state information for Channel X but not for Channel Y (e.g., if Node A is a member of Channel X but not Channel Y), whereas a state database 222 on Node B can have stored thereon up-to-date state information for Channel Y but not for Channel X (e.g., if Node B is a member of Channel Y but not Channel X). In some embodiments, the state machine 220 on each or some nodes of the data management network can be configured to receive a decrypted transaction from its respective crypto proxy 216 and execute the decrypted transaction for a particular channel. In some instances, if a transaction is not encrypted in the first place (e.g., if there is no reason to privately share that transaction among only a select number of nodes), the state machine 220 on every node can be configured to execute the transaction to reach the same state without need for decryption.

As such, in some embodiments, the data management network or system can be configured to utilize a state machine replication scheme or process, in which two inputs are inputted into the state machine on each or some of the nodes on the system. More specifically, in some embodiments, one or more encrypted transactions from a distributed log 212 or log database 214 can be inputted into a crypto proxy 216, which can use an encryption key retrieved from a secret database 218 to decrypt the one or more encrypted transactions (if the particular node has the applicable encryption key stored in its secret database 218). In some embodiments, the decrypted one or more transactions can be inputted into the state machine 220 for execution to obtain the resulting state information (e.g., changes to a state stored in the state database 222). As such, in some instances, only those nodes with an applicable encryption key for an encrypted transaction (and/or on the particular channel for that transaction) in the distributed log 212 will be able to execute the transaction and obtain the resulting state information for that channel (e.g., based on changes to the state associated with that transaction). Other nodes that are not on the channel and do not possess the applicable encryption key may have different state information for the same channel as they are not able to execute the transaction. However, for transactions that were never encrypted in the first place, the state machine 220 on each and every node may be configured to execute such transactions without having the crypto proxy 216 decrypt such transactions. As such, for such transactions that were not previously encrypted, all nodes on the system (and state machines thereon) can have the same state information for that transaction or public channel. In some embodiments, transactions that were not previously encrypted prior to broadcasting to the distributed log 212 can be deemed to be on a public channel without any encryption.

In some embodiments, the log database 214 on each and every node in the data management network can comprise the same data/information in the same order. However, in some embodiments, the secret database 218 on at least some of the nodes in the system can comprise a set of different encryption key data if these nodes are on a different set of channels. At the same time, the secret database 218 on at least some of the nodes in the system can share at least some of the same encryption key data if these nodes are on at least one common channel. Also, in some embodiments, the state database 222 on at least some of the nodes in the system can comprise different state information if these nodes are on a different set of channels. At the same time, the state database 222 on at least some of the nodes in the system can share at least some of the same state information for at least one channel if these nodes are on at least one common channel.

In some embodiments, the example node 200 may comprise a smart contract protocol 224 for interpreting and executing one or more smart contracts. A smart contract may be integrated into the DLT-based data management platform 210 and may comprise a predetermined set of computer code agreed upon between the users of the DLT-based data management platform 210 (e.g., the nodes in the data management network). A smart contract can be used as a program that adheres to its code in order to perform predetermined functions within the data management network, to generate an output when a set of predefined rules or conditions are met, to automatically perform tasks that are commonly associated with contractual agreements (e.g., negotiating, establishing, facilitating, verifying, and enforcing the terms and conditions of an underlying agreement), and so forth. For example, some terms in a contractual agreement may be captured within the lines of code in a smart contract and made to be partially or fully self-executing and/or self-enforcing by the nodes of the data management network. In some embodiments, the example node 200 may comprise a smart contract database 226 for storing smart contracts that have been added to the DLT-based data management platform 210 and agreed upon between the users of the DLT-based data management platform 210 (e.g., all the nodes in the data management network).

In some embodiments, one or more and/or all of the nodes on the data management network may each have a smart contract protocol 224 and a smart contract database 226 for storing smart contracts. However, in some embodiments, the smart contract database 226 of each or some nodes may have different smart contracts and/or different predetermined set of logic or electronic actions stored thereon based on the network identity 230 associated with that node. Different types of users (e.g., network identities and/or nodes) of the data management network may have different roles that require different kinds of functionality provided by smart contracts and/or sets of predetermined logic or electronic actions; the role of each node may be captured by its network identity 230 and used to determine which smart contracts are provided to and accessible by that node. For example, a smart contract database 226 on Node A may have stored thereon or have permission to execute smart contract X but not smart contract Y (e.g., if Node A is of a type that would utilize smart contract X but not smart contract Y) or a predetermined set of logic X but not a predetermined set of logic Y, whereas a smart contract database 226 on Node B may have stored thereon or have permission to execute smart contract Y but not smart contract X (e.g., if Node B is of a type that would utilize smart contract Y but not smart contract X) or a predetermined set of logic Y but not a predetermined set of logic X. In other embodiments, the smart contract database 226 of each or some nodes may store all the smart contracts or predetermined sets of logic implemented within the platform. However, the network identity 230 associated with a user and present on a node may restrict which smart contracts and/or which predetermined sets of logic within the smart contract database 226 that user may access or the node may execute on behalf of the sure, and some smart contracts and/or predetermined sets of logic may be configured to be executable only by certain types of network identities or nodes based on the functionality associated with those smart contracts and the needs of those types of network identities or nodes. For example, Node A may be able to execute (e.g., on behalf of a network identity A) a smart contract X but not smart contract Y from within a smart contract database 226 (e.g., if Node A is of a type that would utilize smart contract X but not smart contract Y) or a predetermined set of logic X but not a predetermined set of logic Y, whereas Node B may be able to execute (e.g., on behalf a network identity B) a smart contract Y but not smart contract X from within a smart contract database 226 (e.g., if Node B is of a type that would utilize smart contract Y but not smart contract X) or a predetermined set of logic Y but not a predetermined set of logic X.

In some embodiments, the example node 200 may comprise a network messenger 228 for communicating with other nodes in the data management network. In some embodiments, the example node 200 may comprise a network identity 230 indicating the identity of the example node 200 and/or a user registered on the node 200 on the data management network (e.g., the entity associated with the node, the type of entity, the type of node, and so forth). In some embodiments, the network identity 230 may be used to identify the example node 200, and/or a user registered thereon, in communications over the data management network or to dictate which smart contracts are available to the example node 200 and/or user registered thereon for execution.

In some embodiments, one or more and/or all of the nodes on the data management network may each have a network messenger 228 and a network identity 230. A network identity 230 (also referred to herein as a user identity) may be a unique identity in the data management network that is assigned to a particular user or entity, and it can be saved by a node that the user has registered with. The network identity may include a unique identifier on the data management network. The network identity may be involved in controlling access and permissions (e.g., to smart contract functionality), as well as in subscriptions (e.g., to datasets). When a user of a node performs actions within the data management platform, such as publishing messages to the distributed log, the network identity 230 of the user may be used to provide user authenticity (e.g., by signing messages with keys associated with the user's network identity 230 or a unique identifier associated with the network identity 230).

However, in some embodiments (e.g., in a multi-tenant deployment), a single node may have multiple users, and thus, also have multiple network identities 230 stored thereon. Each network identity 230 on the node may represent a different user (e.g., entity/firm), and each of those users may be treated as a separate party that is provided access by the node host (which can be an independent third party). Each user may be given access in accordance with their corresponding network identity 230, in a manner where all of the privacy provided to the different network identities of the node is maintained. For example, one network identity may be unable to see private data visible to another network identity on the same node.

Thus, the network identities 230 on each or some nodes may depend on the users registered on that node, and those network identities 230 may differ from node to node depending on the role and identity of those users within the data management network that the network identities 230 correspond to. In some embodiments, a node in the data management network may cryptographically sign any data it publishes to the distributed log (e.g., on behalf of a user registered on the node) with the network identity 230 corresponding to the user seeking to publish the data in order to ensure the authenticity and integrity of the data.

In some embodiments, the network identity 230 for a user that is stored on a node can be provisioned based on roles (e.g., data provider, data subscriber) associated with the user and access to smart contracts or predetermined sets of logic may be based at least in part on those roles. In other words, a network identity 230 for a user (and by extension, the node accessing the data management platform on behalf of the user) can be permissioned via the smart contracts or predetermined sets of logic to act in a predefined capacity based on the role(s) of the user. In some embodiments, specific smart contracts, predetermined sets of logic, and the states created by those smart contracts or predetermined sets of logic may be shared with and made accessible only to a subset of network identities 230 on the network.

Figure 3A:
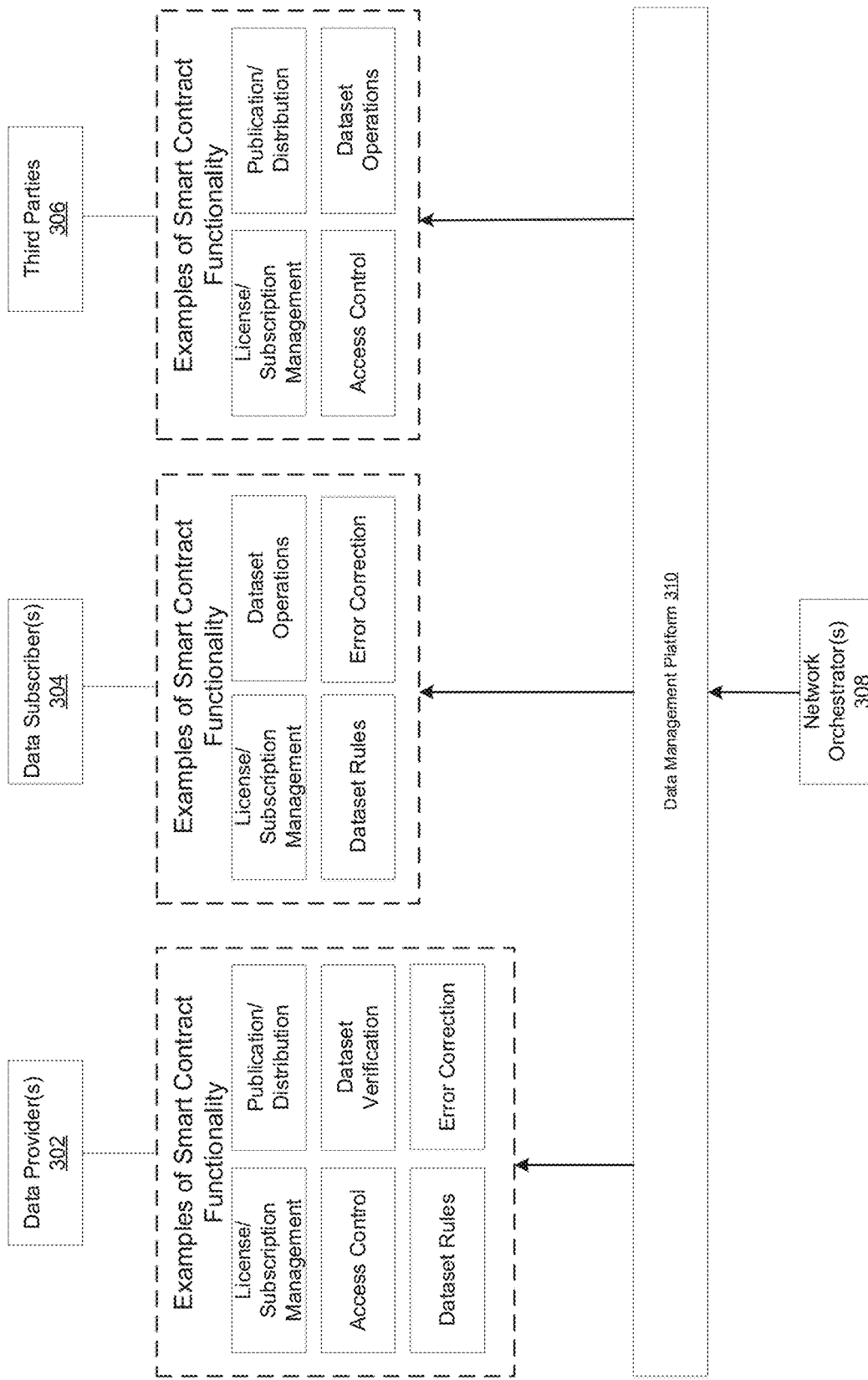
FIG. 3A is a block diagram illustrating example functions performed by one or more smart contracts deployed on the DLT-based data management platform, in accordance with some embodiments of the present disclosure.

This feature of providing access to different smart contracts based on role is may be better understood from FIG. 3A, which is a block diagram illustrating example functions performed by smart contracts deployed on the DLT-based data management platform and executed by the network participants of the data management network.

In some embodiments, the network orchestrators 308 may author and update any smart contracts to be deployed and integrated into the data management platform 310. The smart contracts, which are lines of code that essentially serve as computer programs, can be used to expand the functionality of the data management platform 310. The network orchestrators 308 may configure some of the smart contracts such that they can only be accessed and executed by certain network identities or roles within the data management network. For example, the network participants in the data management network that are of a certain role may be provided one set of smart contracts, and the network participants that are of another role may be provided a different set of smart contracts. In another embodiment, a single set of smart contracts is used by all participants, and specific smart contract functionality is enabled and disabled based on the role of a user executing the smart contract.

This can be seen in the figure, as the nodes of the data providers 302 may be provided access to a set of smart contracts for handling license/subscription management (e.g., broadcasting the availability of their datasets over the network, providing sample data for consumers to evaluate, providing various subscription offerings and terms to consumers, negotiating terms with a consumer to establish a subscription agreement, viewing the consumers subscribed to a particular dataset, etc.); publication/distribution (e.g., distributing data by publishing it to the distributed log); access control (e.g., establishing private channels and cryptography keys associated with datasets, adding or removing consumers to private channels associated with datasets, providing cryptography keys to consumers of a private channel, etc.), dataset verification (e.g., verifying data in a dataset, determining consistency of the dataset among the network participants, etc.), dataset rules (e.g., defining rules associated with a dataset or the generation of data product, etc.), and error correction (e.g., defining rules for identifying when an error exists in the data, viewing reconciliation inquiries identifying errors in the data, correcting errors in the data, updating datasets with error corrections, etc.).

The nodes of data subscribers 304 are provided access to a set of smart contracts for handling license/subscription management (e.g., searching and browsing the available datasets offered over the network, evaluating sample data from available datasets, selecting among the various subscription offerings and terms provided by a data provider, negotiating terms with a data provider to establish a subscription agreement, viewing a list of all the subscribed-to datasets, etc.), dataset operations (e.g., verifying data in a dataset, generating states associated with new data products, etc.), dataset rules (e.g., maintaining configurations associated with new data products, etc.), and error correction (e.g., defining rules for identifying when an error exists in the data, drafting and submitting reconciliation inquiries identifying errors in the data, updating datasets with error corrections, etc.).

The nodes of third parties 306 are provided access to a set of smart of contracts for handling license/subscription management (e.g., selecting among the various subscription offerings and terms provided by a data provider, negotiating terms with a data provider to establish a subscription agreement, etc.), publication/distribution (e.g., distribution of modified or aggregated data to subscribers over the network), access control (e.g., e.g., establishing private channels and cryptographic keys associated with the distribution of modified/aggregated data, checking that subscribers have the appropriate licenses provided by primary source data providers to allow them to receive redistributed data, etc.), and dataset operations (e.g., modifying, cleansing, aggregating, and validating data for distribution, etc.).

Figure 3B:
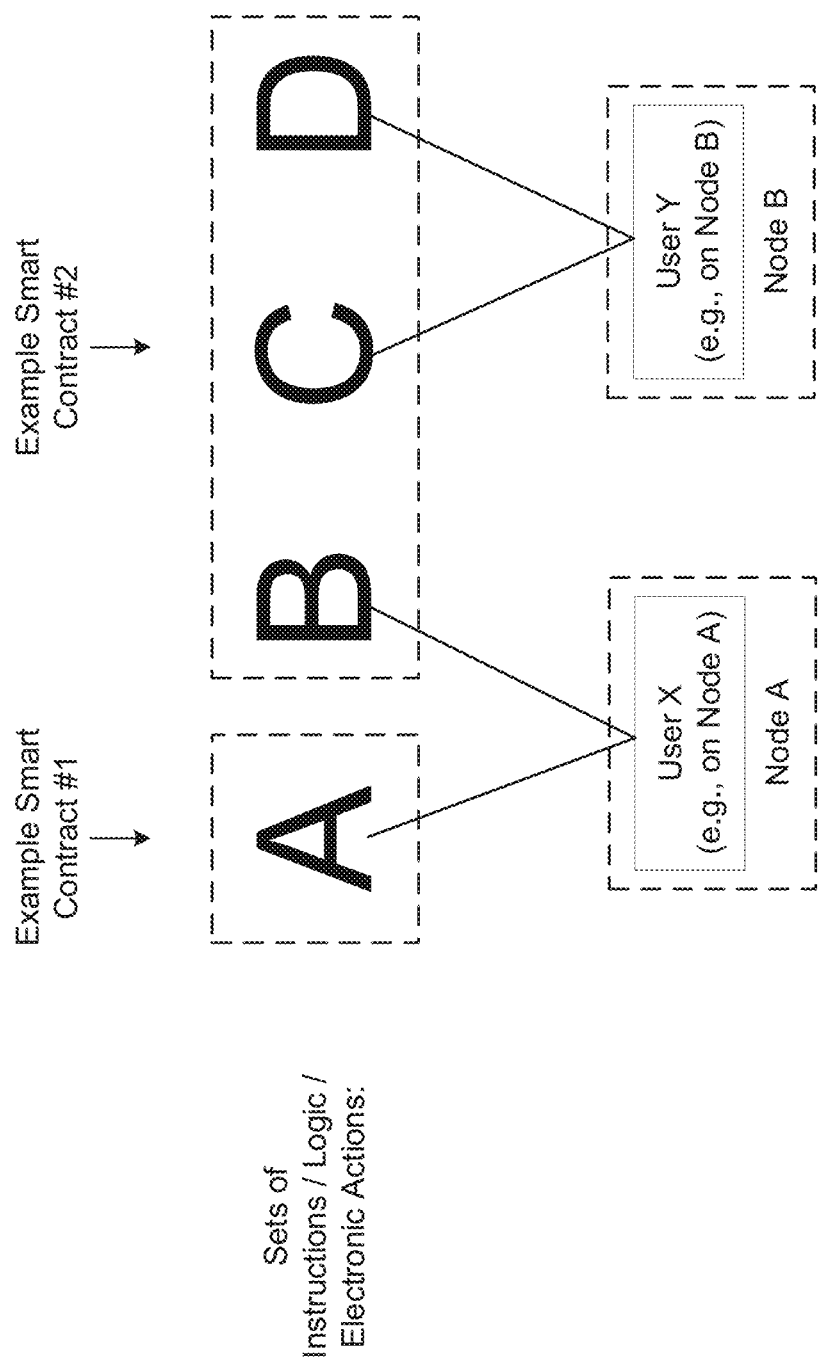
FIG. 3B illustrates an example of how sets of instructions, logic, or electronic actions can be grouped into smart contracts, in accordance with some embodiments of the present disclosure.

FIG. 3B illustrates an example of how sets of instructions, logic, or electronic actions can be grouped into smart contracts.

In FIG. 3B, a User X is shown to be associated with Node A, and a User Y is shown to be associated with Node B. In some embodiments, a user may be represented by or associated with a user identity or a network identity available on a node. For instance, in the illustrated example, a network identity for User X may be available on Node A and a network identity for User Y may be available on Node B. However, it should be understood that, in some embodiments, there can be any number of users associated with a particular node. For instance, both User X and User Y could be associated with Node A. Accordingly, there may be a network identity for User X available on Node A and a network identity for User Y available on Node B.

"A", "B", "C", and "D" represent predetermined sets of instructions, logic, or electronic actions (e.g., associated with smart contract functionality, such as the examples mentioned in connection with FIG. 3A). These predetermined sets of instructions, logic, or electronic actions may be grouped into one or more smart contracts in any suitable way. For example, all four sets of instructions could be grouped into a single smart contract, the four sets of instructions may be split up into two different smart contracts, there may be four separate smart contracts corresponding to each of the four sets of instructions, and so forth. In the illustrated example, "A" is in a first smart contract and "B", "C", and "D" are all in a second smart contract.

In some embodiments, user identity or network identity may control subscriptions (e.g., access to datasets). Similarly, in some embodiments, user identity or network identity may control individual permissions to the predetermined sets of instructions, logic, or electronic actions (e.g., smart contract functionality). For instance, in the illustrated example, the network identity associated with User X may allow access to the "A" and "B" predetermined sets of instructions, despite "A" and "B" being part of two separate smart contracts. Similarly, the network identity associated with User Y may allow access to the "C" and "D" predetermined sets of instructions, which are part of the second smart contract.

In some embodiments, the predetermined sets of instructions, logic, or electronic actions themselves may also play a role in access and permissioning. In other words, access and permissioning to a predetermined set of instructions may be based on at least the network identity associated with the user and the predetermined set of instructions. For example, the "A" and "B" predetermined sets of instructions may each be configured to be accessible by network identities that are of a first type, and the network identity associated with User X may be of that first type, which allows User X to access "A" and "B". Similarly, the "C" and "D" predetermined sets of instructions may each be configured to be accessible by network identities that are of a second type, and the network identity associated with User Y may be of that second type, which allows User Y to access "C" and "D."

Network Topology of an Example Data Management Network

Figure 4:
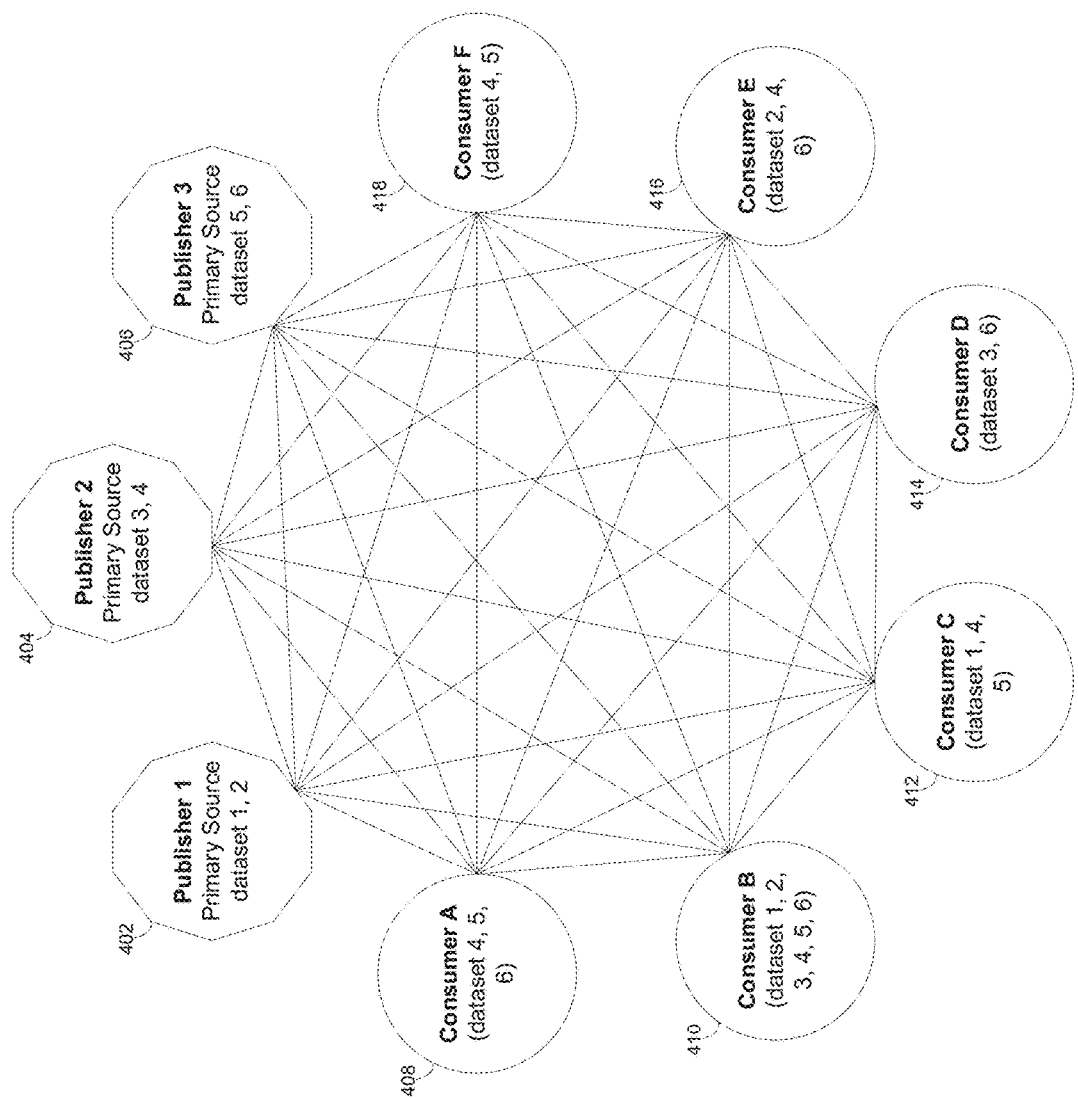
FIG. 4 illustrates a network topology of an example data management network, in accordance with some embodiments of the present disclosure.

FIG. 4 illustrates a network topology of an example data management network. This network topology shows how data from all Publishers may be broadcast to all the nodes in the network during publication to the distributed log, eliminating any potential for variation or discrepancies in the data and guaranteeing consistency of data across all nodes on the network. However, at the same time, a Publisher may be able to restrict who has effective access to their data by publishing their data through private distribution channels that specific Consumers have been permissioned with access to.

The decagons 402, 404, and 406 in the figure represent the nodes of an example data management network that are associated with data publishers (e.g., data provider nodes). Decagon 402 represents the node of Publisher 1, which is the primary source of datasets 1 and 2 in the network. Decagon 404 represents the node of Publisher 2, which is the primary source of datasets 3 and 4 in the network. Decagon 406 represents the node of Publisher 3, which is the primary source of datasets 5 and 6 in the network.

The circles 408, 410, 412, 414, 416, and 418 in the figure represent the nodes in the example data management network that are associated with data consumers (e.g., data subscriber nodes). Circle 408 represents the node of Consumer A, which is subscribed to receive datasets 4, 5, and 6. Circle 410 represents the node of Consumer B, which is subscribed to receive datasets 1, 2, 3, 4, 5, and 6. Circle 412 represents the node of Consumer C, which is subscribed to receive datasets 1, 4, and 5. Circle 414 represents the node of Consumer D, which is subscribed to receive datasets 3 and 6. Circle 416 represents the node of Consumer E, which is subscribed to receive datasets 2, 4, and 6. Circle 418 represents the node of Consumer F, which is subscribed to receive datasets 4 and 5.

As shown by the lines in the figure, the Publishers (e.g., Publisher 1, Publisher 2, and Publisher 3) may be able to distribute their datasets across the network by publishing their datasets to the distributed log maintained by all the nodes in the network. In some embodiments, each node may maintain a local copy of the distributed log and continuously update that copy with any new data from all of the datasets that are published. However, while each node may receive data associated with all the datasets published to the distributed log, not all nodes may be able to make use of all the data. More specifically, Publishers are able to distribute their datasets across the network in a cryptographically encrypted form via the distributed log, then share decryption keys (e.g., for a private channel) with only the Consumers that have subscribed to the data in those datasets. Thus, while all the datasets provided by the Publishers may be published to the distributed log in some form, a node may only be able to actually make use of the data for a particular dataset if the Publisher that is the primary source for that dataset has shared the decryption key for that dataset with the node.

For example, each of the datasets 1, 2, 3, 4, 5, and 6 may be published to the distributed log maintained by all the nodes in the network, with each node maintaining a local copy of the distributed log. Consumer F is subscribed to datasets 4 and 5, for which the primary sources are Publisher 2 and Publisher 3, respectively. When Consumer F subscribed to dataset 4, Publisher 2 may provide Consumer F with the encryption/decryption key (e.g., for a private channel) that it has associated with dataset 4. Similarly, when Consumer F subscribed to dataset 5, Publisher 3 may provide Consumer F with the encryption/decryption key (e.g., for a private channel) that it has associated with dataset 5. Consumer F may store these keys locally (e.g., within a secret database).

Publisher 2 may use the encryption/decryption key it associated with dataset 4 to encrypt any data associated with dataset 4 that it publishes to the distributed log. Similarly, Publisher 3 may use the encryption/decryption key that it associated with dataset 5 to encrypt any data associated with dataset 5 that it publishes to the distributed log. Consumer F may then use the encryption/decryption key associated with dataset 4 (that was provided by Publisher 2) to decrypt any data associated with dataset 4 within its local copy of the distributed log. Similarly, Consumer F may use the encryption/decryption key associated with dataset 5 (that was provided by Publisher 3) to decrypt any data associated with dataset 5 within its local copy of the distributed log. Thus, while each of the Consumers may receive all the datasets provided by the Publishers by way of their publication to the distributed log, a particular Consumer may only be able to "see" the datasets that the Consumer has subscribed to and possesses the encryption/decryption keys for.

Subscription and License Management

Figure 5:
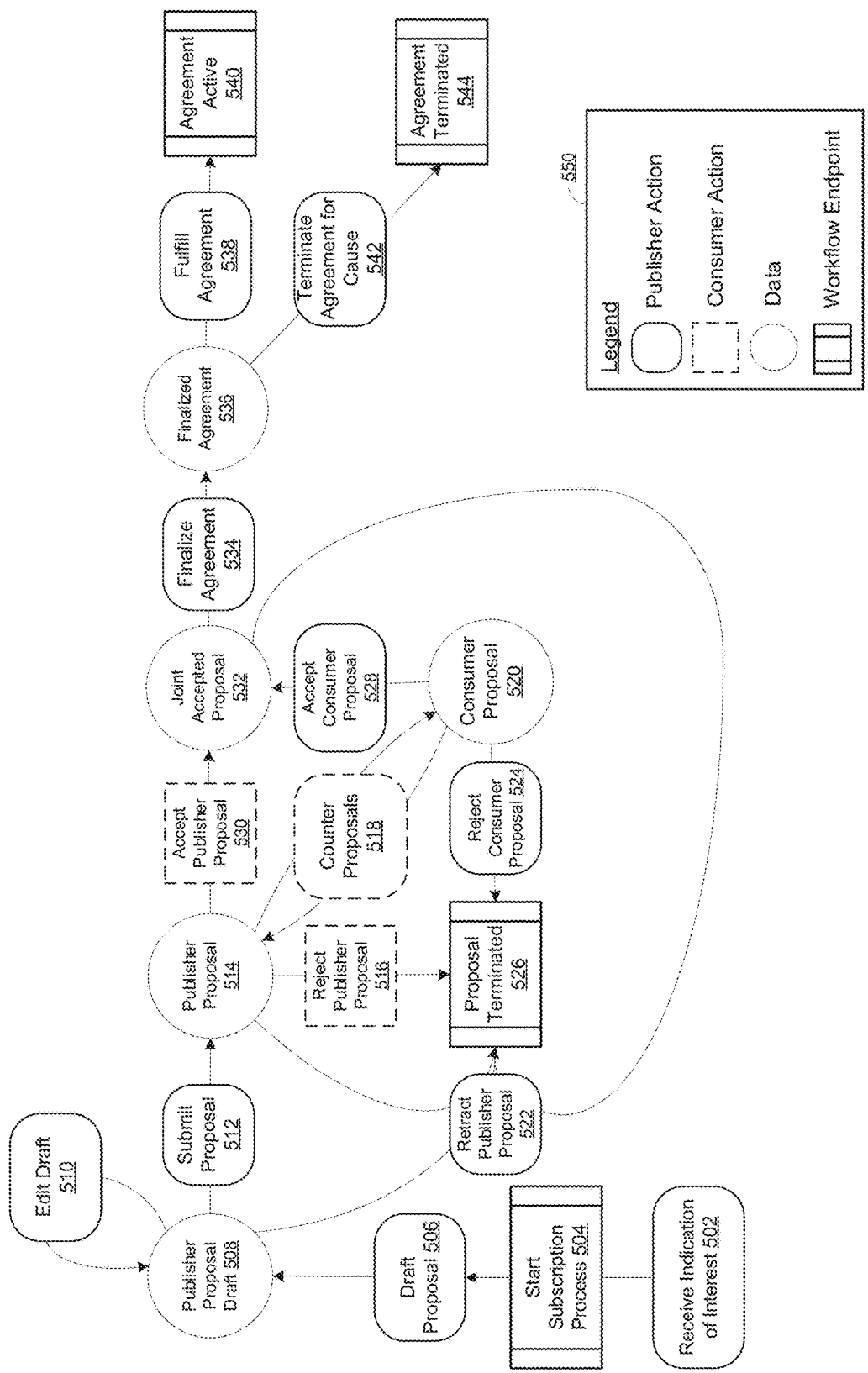
FIG. 5 is a flow diagram illustrating an example negotiated subscription workflow that is facilitated by features of the DLT-based data management platform, in accordance with some embodiments of the present disclosure.

FIG. 5 is a flow diagram that illustrates an example of a negotiated subscription workflow facilitated by features of the DLT-based data management platform. The workflow is an example of just one of the ways that data subscription and license management can be implemented on the data management network using the DLT-based data management platform.

More specifically, subscription and license management of primary data sources (e.g., datasets published to the distributed log by data providers) can be handled using smart contracts implemented on the data management network (e.g., via deployment within the DLT-based data management platform running on each node), which can be configured to automate the data provider's access control responsibilities in addition to providing various supporting functions for the users of the data management network. Although Publishers and Consumers may handle the entire subscription and licensing process off the data management network, there are benefits to enabling the subscription and license management of datasets over the data management itself. A variety of smart contracts can be used to facilitate various functions associated with subscription and license management, such as the discovery of new datasets and the sale of subscriptions to datasets.

For example, there can be smart contracts deployed onto the data management network that allow Publishers to openly broadcast what datasets they have available on the network and provide fixed price subscription offerings and/ or negotiated terms. There can be smart contracts that allow Consumers to perform a search on the network for the available datasets offered by the various data sources (e.g., Publishers), and the search can factor in various attributes associated with the datasets, such as: title/name, descriptions, contact information for further details, availability of sample data, and so forth. Consumers may then initiate the subscription process to a dataset via a smart contract, which may be a back-and-forth process (e.g., involving the negotiating of terms) that ends in either the codification of a joint agreement that establishes the rights of the Consumer to access the Publisher's data or the dissolution of the agreement. Each step in this back-and-forth process may be cryptographically verifiable with an auditable history. A copy of the finalized agreement may be exported (e.g., off the distributed ledger or blockchain) and distributed for any off-ledger business or legal requirements as needed. If an agreement is accepted, the Publisher may perform a final step to use the codified agreement details to manually or automatically provide the Consumer access to the appropriate data (such as by providing an encryption/decryption key to the Consumer that can be used to decrypt the subscribed data that has been published to the distributed log).

This back-and-forth subscription process between a Consumer and a Publisher can be better understood from the example negotiated subscription workflow shown in FIG. 5, which can be interpreted based on the included legend 550. Rounded blocks represent actions performed by the Publisher, dashed blocks represent actions performed by the Consumer, circles represent data (e.g., documents), and solid rectangular blocks represent endpoints or milestones within the workflow.

At block 502, the Publisher may receive an indication of interest from a Consumer regarding subscription to a dataset that the Publisher is providing over the data management network. For example, the Publisher may have published, to the distributed log of the data management network, some sample data for the dataset and fixed price licenses associated with the dataset. A Consumer may be able to search among the datasets offered by the data providers (e.g., Publishers) in the data management network and see the types of datasets made available on the network and their subscription options, both fixed and negotiated. The Consumer may be able to review the sample data that was published over the data management network to determine if the data will suit their needs. The Consumer may be able to choose a subscription option among the subscription options offered by the Publisher of the dataset, such as a fixed subscription option or a subscription bundle that better meets the needs of the Consumer. Thus, upon the Consumer selecting a subscription option or otherwise indicating interest in their desired data portfolio to be received through the data management network, the subscription process will begin (block 504).

At block 506, the Publisher may draft a proposal for an agreement for subscribing to the Publisher's dataset based on the Consumer's indication of interest, thereby resulting in the generation of a publisher proposal draft 508. At block 510, the Publisher may edit the publisher proposal draft 508 iteratively until the Publisher is satisfied with the draft, and then at block 512, the Publisher may submit the publisher proposal draft 508 as a publisher proposal 514 to the Consumer for review. In some embodiments, the submission of the publisher proposal draft 508 as a publisher proposal 514 to the Consumer may be facilitated by the data management platform; the Publisher may submit the publisher proposal draft 508 within the platform (e.g., on the node of the Publisher) to be provided to the Consumer via the data management network, and the resulting publisher proposal 514 may be presented to the Consumer for review by the platform (e.g., on the node of the Consumer).

Upon reviewing the publisher proposal 514, the Consumer may reject the proposal (block 516), make a counter proposal (block 518), or accept the proposal (block 528). In the first case (block 516), the Consumer may reject the publisher proposal 514 through the platform, which will result in the proposal being terminated (block 526). Similarly, at any time between the generation of the publisher proposal draft 508 or a proposal being accepted, the Publisher may, at block 522, retract the publisher proposal 514 to result in the proposal being terminated (block 526). In the second case, if the Consumer decides to make a counter proposal, then at block 518, the Consumer may submit a consumer proposal 520 through the platform for the Publisher to review. At block 524, the Publisher may reject this consumer proposal 520 through the platform, which will result in the proposal being terminated (block 526). Alternatively, at block 518, the Publisher may respond with their own counter proposal, and the Publisher and Consumer may go back-and-forth until either the Consumer accepts the publisher proposal 514 at block 530 or the Publisher accepts the consumer proposal at block 520, with the accepted proposal serving as the joint accepted proposal 532.

Once a proposal has been accepted, at block 534, the Publisher may finalize an agreement based on the accepted proposal and initiate any connected on-chain processes (e.g., via smart contracts) or off-chain processes required. The result is the finalized agreement 536. After all the requirements have been satisfied (e.g., payment verification, exported legal documents, and so forth), at block 538, the Publisher may trigger the fulfillment of the terms of the agreement via smart contracts that manage/automate access controls based on the subscription terms and the agreement becomes active (block 540). However, if at block 542, the Publisher determines that not all of the requirements have been satisfied, the Publisher can terminate the agreement for cause which will result in a terminated agreement (block 544).

Figure 6:
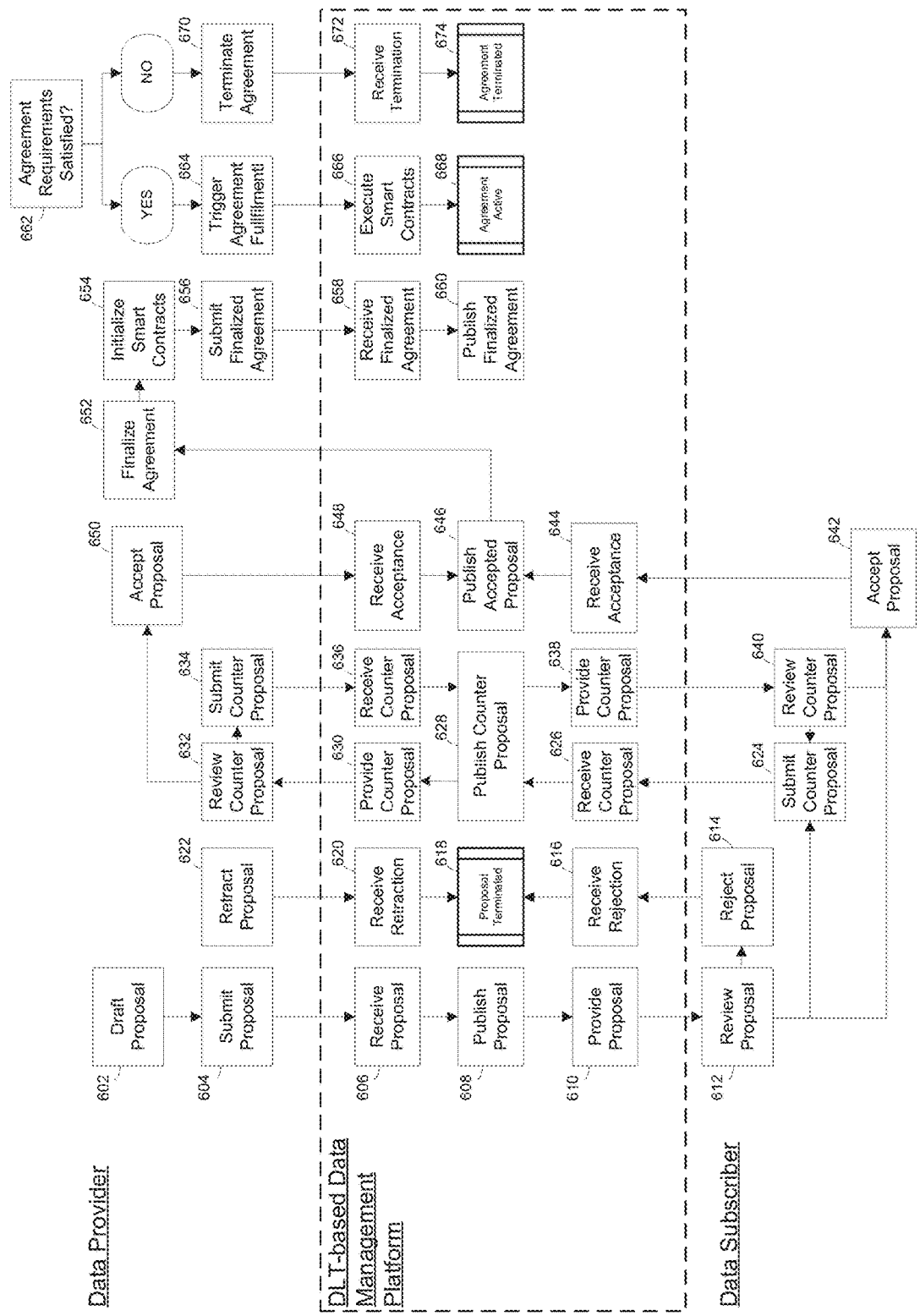
FIG. 6 is a flow diagram illustrating the example negotiated subscription workflow similar to the one shown in FIG. 5 and emphasizes the role of the DLT-based data management platform, in accordance with some embodiments of the present disclosure.

FIG. 6 is a flow diagram that illustrates an example of a negotiated subscription workflow, which is associated with an example implementation of subscription and license management on the data management network via the DLT-based data management platform. The illustrated workflow is similar to the one shown in FIG. 5, but it emphasizes the role of the DLT-based data management platform in order to demonstrate how execution of the workflow can be carried out within the data management platform by using smart contracts and distributed ledger technology. The functions described as being performed by the data management platform may be implemented through the use of smart contracts or integrated directly into the data management platform itself.

At block 602, a data provider (e.g., publisher) may draft a proposal for an agreement between the data provider and a data subscriber (e.g., consumer) that outlines the terms for the data subscriber to subscribe to the data provider's dataset that the data subscriber is interested in. The data provider may draft the proposal in response to receiving an indication of interest from a data subscriber regarding a subscription to the dataset that the data provider is distributing over the data management network (e.g., the data subscriber selected the dataset within the data management platform).

At block 604, the data provider may submit the draft of the proposal within the DLT-based data management platform running on the node hosted by the data provider. For instance, the data management platform may have a user interface that allows the data provider to enter the proposal or to identify a file containing the proposal. Once the data provider has submitted the proposal, the data provider may be able to retract the proposal at block 622 through the data management platform. For example, may have a user interface with a button that the data provider can select to retract a submitted proposal. At block 620, the data management platform may receive the retraction and terminate the proposal at 618.

At block 606, the data management platform may receive the submitted proposal, and assuming that the submitted proposal checks out and meets certain requirements (e.g., it is actually a proposal and in an acceptable form), then at block 608, the data management platform may publish the proposal to the distributed log maintained by all the nodes of the data management network. In some embodiments, the data management platform may broadcast data for the proposal to all the nodes in the network and the nodes may save that data to their locally stored copy of the distributed log.

At block 610, the data management platform running on the node of the data subscriber may provide the proposal to the data subscriber for review. For instance, the data management platform may be able to display the proposal to the data subscriber via a user interface or allow the data subscriber to export the proposal data for viewing in another software. At block 612, the data subscriber may review the proposal.

Upon reviewing the proposal, the data subscriber has a variety of choices. For example, at block 614, the data subscriber may reject the proposal through the data management platform. For instance, their data management platform may have a user interface with a button that the data subscriber can select to reject the proposal. At block 616, the data management platform will receive the rejection, and at block 618 the proposal will be terminated.

As an alternative, at block 624, the data subscriber could submit a counter proposal through the data management platform running on the node hosted by the data subscriber, such as by entering the counter proposal through a user interface of the data management platform. At block 626, the data management platform will receive the counter proposal, and at block 628, the data management platform may publish the counter proposal to the distributed log maintained by all the nodes of the data management network. At block 630, the data management platform operating on the node hosted by the data provider may obtain the counter proposal from the distributed log and provide the counter proposal to the data provider for review, such as by displaying the counter proposal to the data provider within a user interface. At block 632, the data provider may review the counter proposal. In some cases, the data provider may decide to submit their own counter proposal through the data management platform running on the node hosted by the data provider. That data management platform may receive the counter proposal at block 636 and publish that counter proposal to the distributed log at block 628, where the data management platform operating on the data subscriber's node can retrieve it and, at block 638, provide it to the data subscriber to review at block 640. If the data subscriber is unsatisfied, the data subscriber may submit a counter proposal at block 624 and the cycle may repeat until a proposal is accepted by either the data provider at block 650 or by the data subscriber at block 642.

When the data subscriber reviews either a proposal at block 612 or a counter proposal at block 640, the data subscriber may choose to accept a proposal at block 642. For example, the data management platform running on the data subscriber's node may have a user interface with a button that can be selected by the data subscriber in order to accept a proposal. Once the data management platform receives the acceptance at block 644, the data management platform may publish the accepted proposal to the distributed log at block 646. Similarly, if the data provider wants to accept a counter proposal of the data subscriber at block 650, the data provider may select a button in a user interface of the data management platform running on the data provider's node and the data management platform may receive the acceptance at block 648 before publishing the accepted proposal to the distributed log at block 646.

Once an accepted proposal has been published, the data provider may, at block 652, finalize an agreement based on the accepted proposal. Finalizing the agreement may involve the data provider initializing on-chain processes (e.g., via smart contracts) that may be used to execute the terms of the agreement, as well as any off-chain processes that may be required. At block 656, the data provider may submit the finalized agreement to the data management platform running on the data provider's node, which will receive the finalized agreement at block 658 and publish the finalized agreement to the distributed log at block 660.

At block 662, the data provider may check to see if all the requirements in the agreement are satisfied, such as payment verification, the exportation of legal documents outside of the data management platform, and so forth. If the requirements have been satisfied, then at block 664, the data provider may trigger the fulfillment of the terms of the agreement via smart contracts that manage/automate access controls based on the subscription terms. For instance, the data provider may provide a user input to the data management platform, which will execute the smart contracts for the agreement on the data provider's node and result in an active agreement at block 668. If instead, at block 662, the data provider determines that all the agreement requirements are not satisfied, then at block 670 the data provider may be able to terminate the agreement for cause such as through a user interface of the data management platform. The data management platform may receive the termination at block 672 and terminate the agreement at block 674.

Custom Data Products Generation

As contemplated herein, custom data products can be generated and distributed over the data management network. More specifically, custom data products can be generated based on data provided by one or more primary data sources (e.g., Publishers) and published to the data management network. The generation of these custom data products can be facilitated by smart contracts deployed on the network, which can take in published/visible datasets as inputs for generating the custom data products.

In some embodiments, the generation of custom data products may involve Publishers pushing primary source data onto the network in a private/permissioned manner via a distribution channel in order to share the data with Consumers that have a subscription for the data. "Primary source data" in this context refers to the original form of the data published to the data management network, regardless of any upstream sources and processes involved prior to publishing.

Smart contracts deployed on the data management network may contain logic for producing entirely new custom data products based on the data provided by these data sources. For instance, smart contracts can be used to combine the data obtained from multiple sources, to perform calculations on the data, to filter and applying transformations to the data, and so forth. These smart contracts can be made available to all parties on the network, or in a permissioned manner to a subset of parties that have a license for the specific smart contracts. Participants with access are guaranteed to produce identical resulting datasets (e.g., a custom data product) given the same primary sources are used as inputs. These datasets can be generated in real-time as the data is published to the network, or in an event driven manner by the Consumers.

By using the data management network to generate custom data products in this fashion, Publishers are ensured that all Consumers with access to a particular custom data product will have consistency for that product, since the smart contracts will produce accurate, matching data for all the Consumers. Furthermore, this approach provides transparency since there is visibility into the logic and process (e.g., the smart contracts) by which the custom data product is produced. The input data sources may be provided by multiple Publishers, allowing for Consumers to get the same level of consistency and transparency without any dependence on a single Publisher. Furthermore, a Publisher or a third party may need to provide additional inputs or set specific configurations to be used by the smart contract logic, and this flexibility of the smart contracts enables the Publisher or third party to perform maintenance and other management aspects for their custom data product.

One example of a custom data product is an Index (e.g., of securities). In some embodiments, Index Providers may be able to leverage the distributed log (e.g., blockchain) and other features of the data management network contemplated herein in order to create, calculate, distribute, maintain, and rebalance their indices while providing a higher degree of consistency and transparency guarantees to their clients.

More specifically, an Index Provider may publish the configurations associated with a custom index (e.g., index specific configurations), such as the constituents of the index and their respective weights in the index, via private communications channels. The Index Provider may also have the role of a Publisher on the network, and it may publish all the primary source data required to construct the custom index (e.g., market data, security data, supplementary/miscellaneous data, and so forth) to the distributed log of the data management network. However, Index Providers may make use of other available primary source data (e.g., market & security data) that has been published to the distributed log of the data management network by other data providers.

Smart contracts can then be used make use of the constituents and weighting (the index specific configurations) to filter on the appropriate datasets provided by the relevant primary data sources and produce the resulting custom index and any associated metrics. The communication channel can then be shared with clients (e.g., Consumers) on the data management network, which would allow them to also dynamically generate the custom Index in its current state or any previous states. As new primary source data gets published to the network, all Consumers in the communication channel are notified of its availability and can immediately generate the updated index.

In some embodiments, smart contracts can also be deployed that codify the rules by which the index will operate and perform outlier detection by highlighting when the index or its specific constituents are approaching a predefined extreme or violating a rule of the index. These smart contracts can be used to ensure that each security conforms to the index theme. This may be used as a method of validating the work performed by the Index Provider in making adjustments to their tracked Index. For some passive indices, these smart contracts may be used to automatically update the constituents and weighting while allowing for human intervention and control where required.

Thus, the Index Provider can handle the maintenance and rebalancing of the custom index by pushing out updated constituents and weighting (and any other index specific configurations). The history of changes are tracked and maintained (e.g., in the distributed log), allowing for Consumers to then generate the current and historical perspectives on the custom index and the entire change history. The process of managing the custom index is reduced to just these updates, and the generation and distribution process is automatically handled on the network without the need for additional processes from the Index Provider and/or any of the Publishers (e.g., the primary source data providers).

Figure 7:
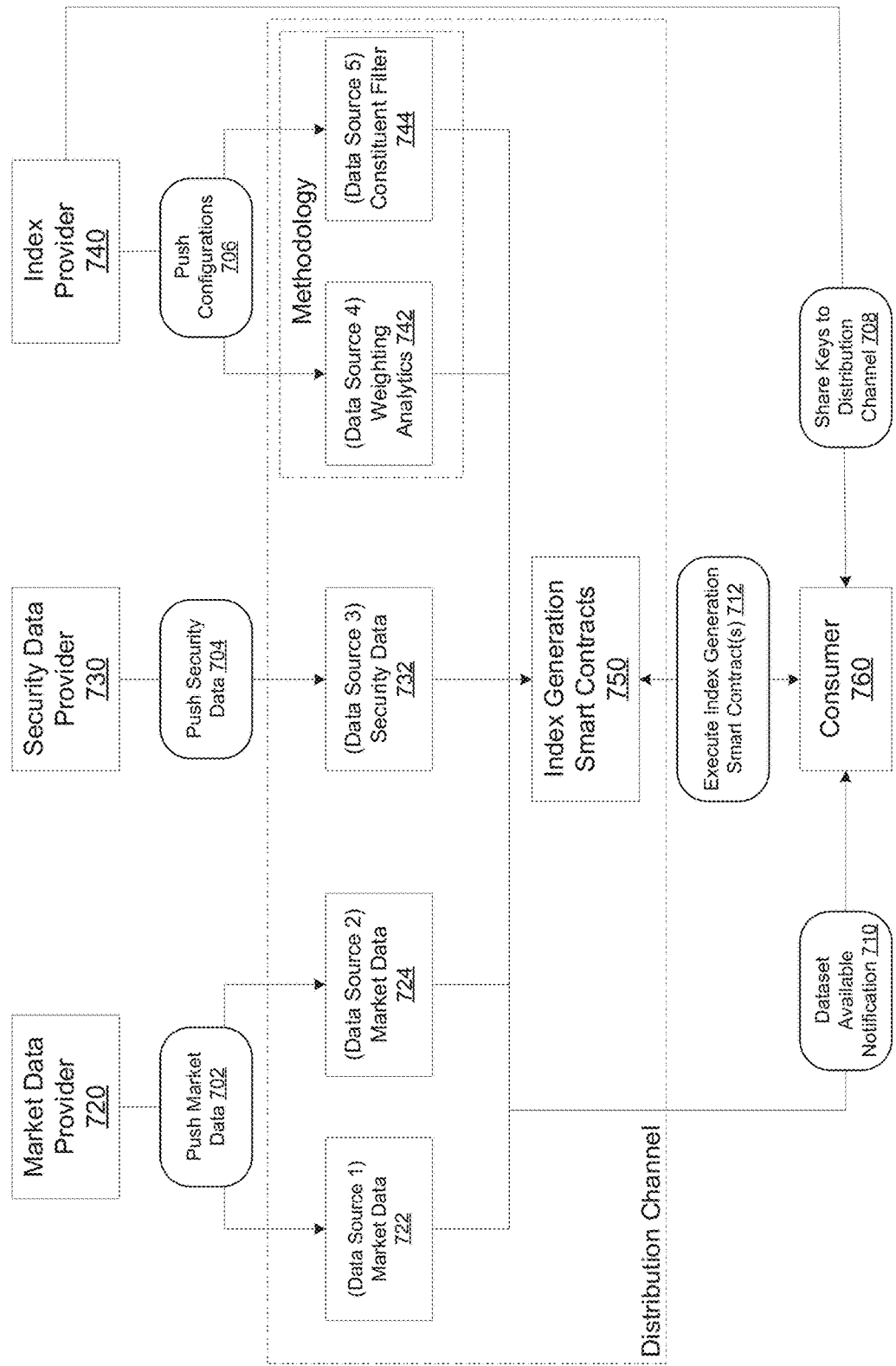
FIG. 7 is a flow diagram illustrating an example workflow associated with the generation of a new custom data product that is facilitated by features of the DLT-based data management platform, in accordance with some embodiments of the present disclosure.

FIG. 7 is a flow diagram that illustrates an example workflow associated with the generation of a new custom data product that is facilitated by features of the DLT-based data management platform. The workflow is an example of just one of the ways that data products can be generated by nodes on the data management network using the DLT-based data management platform.

More specifically, FIG. 7 illustrates the creation of a new custom index under the context in which the distribution channel is created and managed by the index provider 740, but the required data for the index may come from other parties (e.g., the index provider 740 is not the sole primary source of data for the index). All data is within a single distribution channel in this example, but data may be distributed across multiple distribution channels and shared with Consumers with the appropriate subscription.

The index provider 740 can design an index and define index specific configurations, such as the constituents of the index (e.g., which securities are to be included in the index) and their respective weights in the index. The index provider 740 can publish and deploy the index generation smart contracts 750 on the data management platform, and the index generation smart contracts 750 can be used to automatically generate the index by any party executing the smart contracts, provided that the party is in possession of all the data required to generate the index. In some embodiments, the index generation smart contracts 750 can be made public, while in other embodiments, the index generation smart contracts 750 may be used by parties with access to the distribution channel (e.g., subscribers to the index that have been provided encryption/decryption keys).

At block 706, the index provider 740 may push the weighting analytics 742 and the constituent filter 744 (and any other index specific configurations associated with the index) to the distribution channel. For instance, the index provider 740 may push the index specific configurations out to subscribers via private communications channels (e.g., the index provider 740 may publish the index specific configurations to the distributed log, but in a way that only subscribers to the index can make use of the information). The index provider 740 may allow parties to subscribe to this index through the data management platform, and it may provide any party that has subscribed to the index (e.g., Consumers) with the appropriate keys to the distribution channel (e.g., the encryption/decryption keys associated with a private communications channel). In this specific example, the consumer 760 has subscribed to the index, and at block 708, the index provider 740 will share the keys to the distribution channel with consumer 760.

In this example, data used to generate the index, such as market data and securities data for the constituents of the index, may come from other primary data sources besides the index provider 740. For instance, at block 702, the market data provider 720 may push out market data 722 and market data 724 used in the index generation to the distribution channel. Similarly, at block 704, the security data provider 730 may push out security data 704 used in the index generation to the distribution channel. As any datasets or configurations are published to the network, all consumers with access to the distribution channel (e.g., subscribers to the index) can receive event notifications from the data management platform, such as via the distributed log or blockchain. For instance, at block 710, a notification may be sent (e.g., over the data management platform) to the consumer 760 and any other subscribers to the index, indicating that the market data 722 and market data 724 (or any other dataset) is published to the distributed log and available.

In this case, since the index provider 740 has shared the necessary cryptographic keys with the consumer 760, the consumer 760 can use the published index generation smart contracts 750 within a private channel (although it is noted that the smart contracts may be made public as well if desired). At block 712, the consumer 760 may execute the index generation smart contracts 750, which will use the distributed index specific configurations, market data, securities data, and any other relevant datasets, in order to automatically generate the index or any analytics associated with the index. In some embodiments, the consumer 760 may trigger calls to the smart contracts via their exposed APIs in order to generate the index, index change reports, and any other smart contract based products that use these published sources of data.

A similar workflow (not shown) can be used by the index provider 740 in order to maintain and rebalance their index. For instance, the index provider 740 may update the constituents 744 and change the weightings 744, then push the updated index-specific configurations out to the distribution channel using the data management platform. The data management platform may maintain and track a history of these changes, such as by publishing the changes to the distributed log, which can allow the consumer 760 to generate the current and historical perspectives on the index and the entire change history associated with the index using the index generation smart contracts 750. Thus, the process of managing and updating the index (and any other new data product) can be reduced to just these updates (e.g., updated index-specific configurations pushed out to the distribution channel by the index provider 740), and the distribution of these updates and the generation of the updated index (e.g., through the use of smart contracts) can be handled automatically over the data management network with the need for additional processes to be performed by the index provider 740.

Error Notification and Correction

In a general scenario involving data distribution, there is a minimum of one publisher (e.g., data provider) and multiple consumers of the data. Typically, errors in the data are identified and corrected either by a quality assurance team at the data publisher or identified by a consumer of the data who then notifies the publisher to correct the data. After the data publisher has identified and corrected the data, either a completely new data set or a corrections file will have to be made available for the consumer to access (e.g., such as via FTP or an API).

However, as contemplated herein, the data management platform and data management network can be used for purposes beyond the distribution of data, such as identifying, collecting, sharing, notifying and acting on data errors and corrections. For instance, a method of error notification can be integrated into the data management network, in which consumers that identify errors in published datasets can publish these identified errors on the data management platform (e.g., to the distributed log or blockchain), where other consumers and/or the original data provider can be notified of the presence of an error.

Thus, the original distributor or publisher of a dataset (e.g., a data provider has a consistent platform for collecting errors from their subscribed client base and fixing the errors (e.g., by updating the original datasets or files). They also have the ability to collect proposals for the data corrections, potentially simplifying the remediation process.

Consumers (e.g., data subscribers) have the option of sharing their notifications with other consumers, allowing even those consumers who previously were unaware of data issues to share in the most recent info. Consumers can decide which parties they want to share notifications with and which parties' data issues they will be notified of. In some cases, notifications of identified errors can be broadcast to the entire network (e.g., through the data management platform), but in other cases it can be selectively sent to only a subset of the nodes or participants on the network (e.g., via a private communications channel). This is a tremendous advantage of enabling error identification and correction via the data management network described herein; currently, data consumers have only one place to go to find out if there are any problems with the data (e.g., they must bring up the issue with the original source of the data, the data provider), but the integration of error identification and correction into the data management platform (the same platform involved in data distribution) allows consumers to easily rely on identified issues and proposed corrections which have been submitted by other data consumers on the network.

Figure 8:
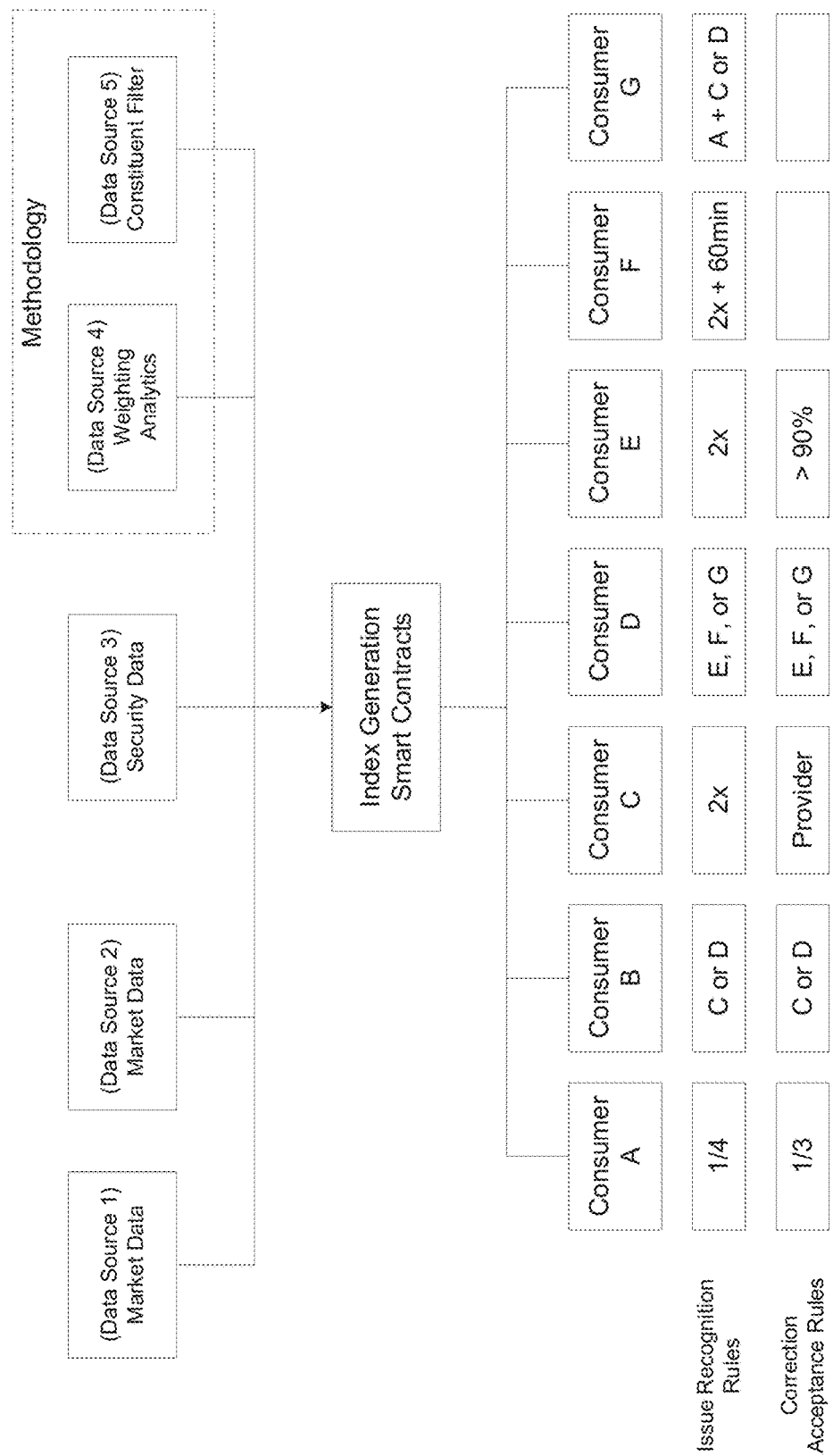
FIG. 8 is a block diagram illustrating different examples of approaches to error identification and correction that can be used by nodes in the data management network, in accordance with some embodiments of the present disclosure.

Furthermore, consumers are provided enormous flexibility since they have the ability to decide for themselves when to implement an error correction or if an error even exists. This can be seen in FIG. 8, which is a block diagram illustrating a scenario in which different examples of approaches to error identification and error correction that can be used by consumers. As shown in the figure, individual data consumers can have different rules about when they recognize that an error exists, or when they accept a proposed correction. These can be rules such as "any 2 participants have recognized the issue", "one or more of a set of three specific participants have recognized the issue", or any other rule based on the actions of other participants on the network.

With an error identification and correction solution that is integrated into a data management platform with a distributed log (such as blockchain, which is immutable), it is also possible to track the reliability of identified errors or corrections proposed by each data consumer. This can be done by looking at the historical track record of identified issues or proposed corrections being accepted as correct in the past. This facilitates creating an objective rating for the reliability of any identified error or proposed correction, which can be used by other consumers in making the decision of whether or not to accept the new information.

Figure 9:
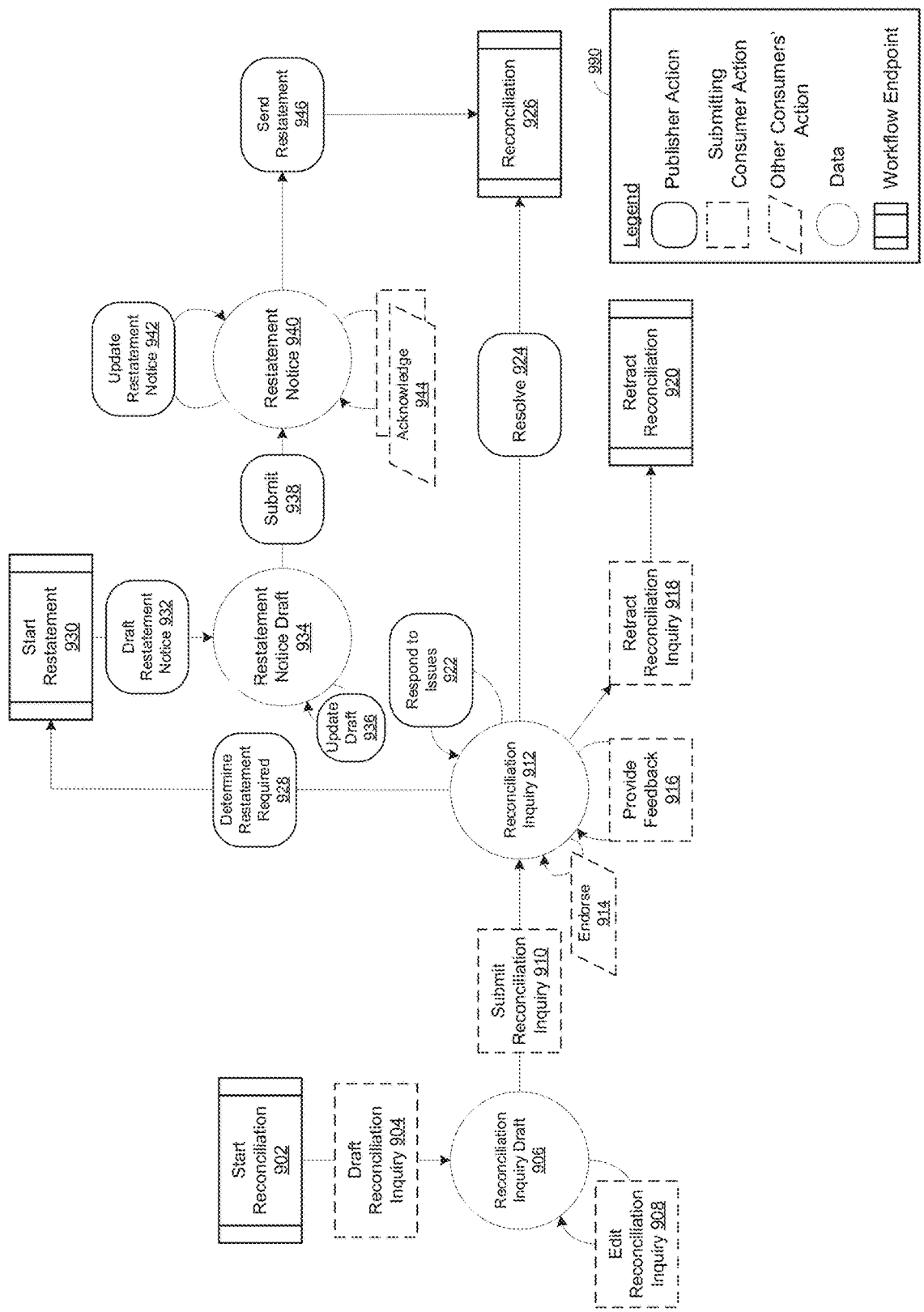
FIG. 9 is a flow diagram that illustrates an example workflow associated with error notification and correction that is facilitated by features of the DLT-based data management platform, in accordance with some embodiments of the present disclosure.

FIG. 9 is a flow diagram that illustrates an example workflow associated with error notification and correction that is facilitated by features of the DLT-based data management platform. In particular, a variety of smart contracts can be used to carry out the various functions associated with error notification and correction depicted in the figure, such as the submission of a reconciliation inquiry that identifies an error in the data, the notification of subscribers, the correction of data, and so forth. As shown in legend 990, the rounded blocks represent actions performed by the Publisher, dashed blocks represent actions performed by the Consumer submitting a reconciliation inquiry, dashed rhombuses represent actions performed by other consumers (e.g., subscribed to the dataset provided by the Publisher), circles represent data (e.g., documents), and solid rectangular blocks represent endpoints or milestones within the workflow.

At block 902, a Consumer subscribed to a dataset provided by a Publisher may identify an error in a dataset and start the reconciliation workflow. At block 904, the Consumer may draft a reconciliation inquiry through the data management platform, thereby resulting in the reconciliation inquiry draft 906 which can include a note or communication (e.g., by the Consumer to the Publisher and/or other consumers) identifying the specific data records that the Consumer believes to be erroneous, explaining what the Consumer believes to be wrong with data, how the Consumer believes the data can be corrected, and so forth. In some embodiments, the Consumer may also provide a corrected version of the data.

At block 908, the Consumer may edit the reconciliation inquiry draft 906 iteratively until the Consumer is satisfied with the draft, and then at block 910, the Consumer may submit the reconciliation inquiry draft 906 through the data management platform as a formal reconciliation inquiry for anyone with access to the dataset to review (e.g., the Publisher providing the dataset and other consumers subscribed to the dataset). For example, the Consumer may submit the reconciliation inquiry draft 906 within the platform (e.g., on the node of the Consumer) to be published in the distributed log as the reconciliation inquiry 912, which can be accessed by the respective nodes of the Publisher and other consumers and presented to them for review through the data management platform.

In some embodiments, the reconciliation inquiry draft 906 and/or the published reconciliation inquiry 912 may include various kinds of metadata, such as metadata associated with the dataset or file containing the erroneous data, the date on which the issue is being raised, the type of reconciliation inquiry (e.g., is it a correction, a misunderstanding, just a question, identifying a useful set of information), and so forth. Thus, the reconciliation inquiry draft 906 and/or the reconciliation inquiry 912 may include well-structured data that can be useful for the Publisher to quickly and specifically identify the problem within the dataset, and also include the unstructured note or communication drafted by the Consumer.

Once the reconciliation inquiry 912 is published within the data management platform, at block 914, other consumers are able to review the reconciliation inquiry 912 and endorse it if they believe it to be correct. For instance, other consumers may be able to indicate that they have reviewed the reconciliation inquiry 912 and agree with it, that they accept the corrected version of the data offered by the submitting Consumer, how they have corrected the data (e.g., if their correction is different from the one offered by the submitting Consumer or if no correction was offered by the submitting Consumer), and so forth. As a specific example, another Consumer could indicate that they agree that there is an error in the data raised in a submitted reconciliation inquiry and that they are applying an overlay to the dataset that overrides the original dataset to add two data points that are missing to a particular row of data. These endorsements can be published to the distributed log and made public for all other parties to look when reviewing the reconciliation inquiry 912. By publishing this information to the network, all other parties can look to see if they agree with others and make a better determination of whether to accept a corrected version of the data over the primary source. Thus, this approach allows for multiple consumers to use their own methodology internally to verify if the data is correct, notify the network of their findings, see the findings and corrections proposed by others, and be confident in the dataset as a source of truth once it has been vetted by multiple parties and not just the data provider.

At block 916, the submitting Consumer may provide any feedback they may have regarding the reconciliation inquiry 912, such as providing any additional information that has been requested from them or answering any questions that have been raised by other parties. The Consumer may also be able to update the reconciliation inquiry 912, and the updated version may be seen by the Publisher and other consumers once the updates have been published to the distributed log. For example, another party may notify the submitting Consumer that there is a better way to correct the data than what was initially proposed, and the submitting Consumer can update the reconciliation inquiry 912 based on that information. At any time after publication of the reconciliation inquiry 912, the submitting Consumer may, at block 918, retract the reconciliation inquiry 912 to result in the reconciliation being retracted (block 920).

At block 922, the Publisher may review the reconciliation inquiry 912 and respond to any issues raised therein. The Publisher may provide requested information, answer questions raised in the reconciliation inquiry 912, and so forth. The responses can be published to the distributed log and made public for all other parties to look when reviewing the reconciliation inquiry 912.

In some cases, upon reviewing the reconciliation inquiry 912, the Publisher may decide that it agrees with the reconciliation inquiry 912, and at block 924, the Publisher may decide to resolve the error simply by making the correction to the dataset, which will fix the problem for subscribers to the dataset when the corrected dataset is published to the distributed log, thereby resulting in reconciliation of the erroneous data (block 926). Immediately, all consumers in the network that subscribe to that dataset will receive the corrected dataset and can have automated processes for corrections running on their end to then correctly represent this incorrect data whatever applications the data is being used for.

In other cases, at block 928, upon reviewing the reconciliation inquiry 912, the Publisher may decide that a restatement will be needed and start the restatement workflow (block 930). At block 932, the Publisher may draft a restatement notice through the data management platform, thereby resulting in the restatement notice draft 934, which can include a note or communication (e.g., to subscribers of the dataset) indicating the issue with the dataset, that the Publisher is aware of the issue with the dataset, and that they expect to have a correction or replacement data available within a certain time period. At block 936, the Publisher may edit the restatement notice draft 934 iteratively until the Publisher is satisfied with the draft, and then at block 938, the Publisher may submit the restatement notice draft 934 through the data management platform where it becomes a formal restatement notice 940 that is made visible to all parties with access to the dataset (e.g., Consumers and other subscribers to the dataset) to review. At block 942, the Publisher may update the published restatement notice 940 as needed.

At block 944, each subscriber to the dataset (including the submitting Consumer and/or other consumers) may independently acknowledge receipt of the notice through the platform. With the notification, each subscriber can immediately know to stop using any erroneous data that has been identified in the dataset. Each subscriber can independently choose how they would like to proceed. For instance, subscribers can disregard the entire data or just a subset of the data for which concerns have been identified, and then wait for updated, corrected data from the Publisher. Or the subscribers can decide to apply their own correction to the data.

Once the Publisher has determined an appropriate correction to the data, then at block 946, the Publisher can send out a restatement of the data through the data management platform, thereby resulting in reconciliation of the erroneous data (block 926).

Figure 10:
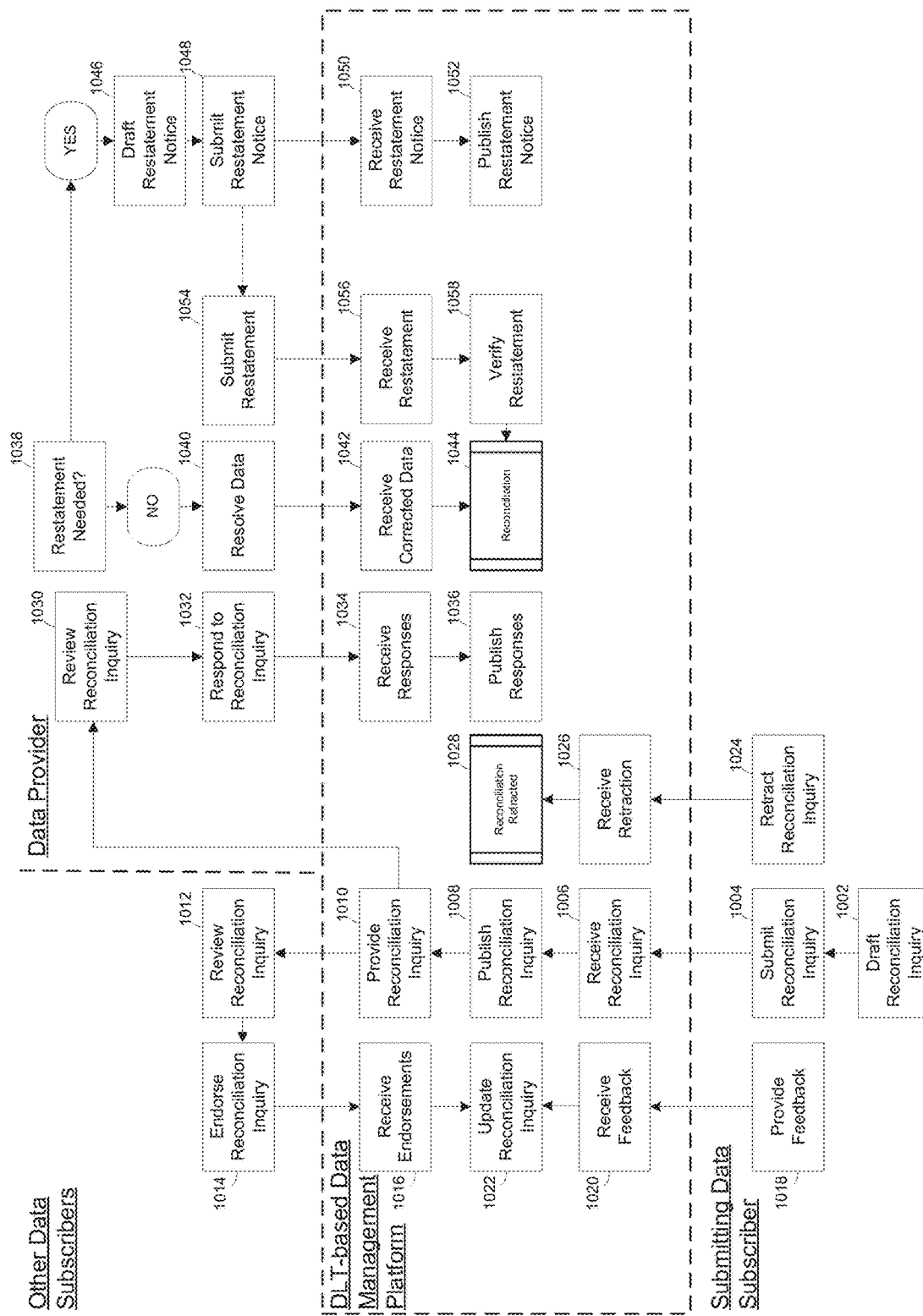
FIG. 10 is a flow diagram illustrating the example workflow for error notification and correction similar to the one shown in FIG. 9 and emphasizes the role of the DLT-based data management platform, in accordance with some embodiments of the present disclosure.

FIG. 10 is a flow diagram illustrating the example workflow for error notification and correction similar to the one shown in FIG. 9, but emphasizes the role of the DLT-based data management platform in order to demonstrate how execution of the workflow can be carried out within the data management platform by using smart contracts and distributed ledger technology. The functions described as being performed by the data management platform may be implemented through the use of smart contracts or integrated directly into the data management platform itself.

A data subscriber that is subscribed to a dataset provided by a data provider and distributed over the data management network may identify an error in the dataset and wish to bring it to the attention of the data provider. In some cases, the data subscriber may have questions for the data provider regarding the dataset. At block 1002, the data subscriber may draft a reconciliation inquiry, which can include a note or communication identifying the specific data records believed to be erroneous, explanations of the data error or how the error can be corrected, the questions that the data subscriber has for the data provider, and so forth. In some embodiments, the data subscriber may also provide a corrected version of the data records. At block 1004, the data subscriber may submit the reconciliation inquiry within the DLT-based data management platform running on the node hosted by the data subscriber. For instance, the data management platform may have a user interface that allows the data subscriber to select the specific erroneous data records in the dataset, identify the error, enter in the note or communication, and so forth. Once the data subscriber has submitted the reconciliation inquiry, the data subscriber may be able to retract it at block 1024 by issuing a retraction request through the data management platform operating on its node. Once the data management platform receives the retraction request at block 1026, the data management platform can retract the reconciliation inquiry and stop the illustrated workflow.

At block 1006, the data management platform may receive the submitted reconciliation inquiry from block 1004, and assuming that the submitted reconciliation inquiry checks out (e.g., it adheres to an accepted format), then at block 1008, the data management platform may publish the reconciliation inquiry to the distributed log maintained by all the nodes of the data management network. In some embodiments, the data management platform may broadcast data for the reconciliation to all the nodes in the network and the nodes may save that data to their locally stored copy of the distributed log. The reconciliation inquiry may be available for any network participant with access to the dataset to review through their data management platform. In some embodiments, the data management platform may also notify any data subscribers subscribed to the dataset that this reconciliation inquiry was published and is available to be viewed.

At block 1010, the data management platforms running on the nodes of the other data subscribers subscribed to the dataset may provide the reconciliation inquiry to those data subscribers for review at block 1012. For instance, the data management platform of one of those data subscribers may be able to display the reconciliation inquiry to that data subscriber via a user interface, in which that data subscriber may review the reconciliation inquiry. The other data subscribers can review the reconciliation inquiry and if any of them agree with the reconciliation inquiry, then at block 1014 they can endorse it through the data management platform to show their support, so that it can be seen by the other data subscribers that they believe the reconciliation inquiry to be correct. At block 1016, the data management platform may be able to receive the endorsements for the reconciliation inquiry, and at block 1022, the data management platform may update the reconciliation inquiry with the endorsements. For instance, the data management platform may publish the endorsements to the distributed log in a way that the endorsements can also be retrieved and viewed when a data subscriber retrieves and views the reconciliation inquiry. By publishing the endorsements to the distributed log, they are made public for other parties, who can use the information to make a better determination (e.g., there can be wisdom in crowds) of whether to go along with the reconciliation inquiry. Thus, this approach allows for data subscribers to use their own methodology internally to verify if the data is correct, notify the network of their findings, see the findings and corrections proposed by others, and be confident in the dataset as a source of truth once it has been vetted by multiple parties and not just the data provider.

Once the reconciliation inquiry has been published, at block 1018, the submitting data subscriber may provide any feedback they may have regarding the reconciliation inquiry, such as providing any additional information that has been requested from them or answering any questions that have been raised by other parties. The submitting data subscriber may be able to provide this feedback through a user interface of the data management platform operating on its node, and at block 1020, the data management platform may receive the feedback and use it to update the reconciliation inquiry at block 1022. For instance, the data management platform may publish the provided feedback to the distributed log in a way that the feedback can also be retrieved and viewed when a data subscriber retrieves and views the reconciliation inquiry. By publishing the feedback to the distributed log, it is made public for other parties, who can use the information to make a better determination of whether to go along with the reconciliation inquiry.

Furthermore, once the reconciliation inquiry has been published, then at block 1010, the data management platform may provide the reconciliation inquiry to the data provider for review at block 1030. More specifically, the data management platform running on the node of the data provider may be notified of the reconciliation inquiry, retrieve the data for the reconciliation inquiry from the distributed log, and then display it to the data provider through a user interface of the data management platform. At block 1032, the data provider may respond to the reconciliation inquiry in order to provide requested information or to address any issues or questions raised in the reconciliation inquiry. The data provider may submit the response through the data management platform running on the data provider node, which can receive the response at block 1034. At block 1036, the data management platform can publish the response to the distributed log so that it is available for data subscribers to review when reviewing the published reconciliation inquiry.

Based on review of the reconciliation inquiry itself and any information associated with it (e.g., endorsements, feedback, and so forth), the data provider may make a determination at block 1038 regarding whether a restatement is needed. Restatement may involve the distribution of a restatement notice, which the data provider uses to notify all the data subscribers that are subscribed to the dataset at the same time that there is an error in the dataset. If the data provider agrees with the reconciliation inquiry and decides that a restatement is not needed, then the data provider may resolve the error at block 1040 by submitting the correction to the data management platform. The data management platform may receive the correction at block 1042 and publish it to the distributed log, thereby resulting in reconciliation of the erroneous data (block 1044) and the distribution of the corrected data to the data subscribers in the network that subscribe to that dataset.

If at block 1038, the data provider instead makes a determination that a restatement will be needed, then at block 1046, the data provider may draft a restatement notice which can include a note or communication (e.g., to subscribers of the dataset) indicating the issue with the dataset, that the data provider is aware of the issue with the dataset, and that they expect to have a correction or replacement data available within a certain time period. At block 1048, the data provider may submit the restatement notice through their data management platform, which can receive the restatement notice at block 1050 and, at block 1052, publish the restatement notice to the distributed log so it is visible to all data subscribers of the dataset. Data subscribers can independently acknowledge receipt of the restatement notice through the platform and determine how to handle the existence of the errors in the data.

After the restatement notice has been published, the data provider may figure out the appropriate correction to the data and, at block 1054, the data provider may submit a restatement of the data through their data management platform. However, in order to submit the restatement, the data provider may need to provide a valid identifier (e.g., cryptographically sign off on the restatement using the network identifier for the data provider) with the restatement. The data management platform may receive the restatement at block 1056 and verify the restatement at block 1058 using the provided identifier. If the restatement passes successful validation, the data management platform may distribute the restatement to reconcile the erroneous data (block 1044).

Private Data Sharing on a DLT Platform

In some embodiments, systems, methods, and devices disclosed herein enable trusted sharing of private data and/or transactions via a distributed ledger, while maintaining data consistency properties. Some embodiments described herein provide and utilize one or more independent and/or dependent channels. In particular, in some embodiments, one or more independent and/or dependent channels can exist on a single distributed ledger, wherein the participants or nodes that are members of a particular channel can view and access the information in a given network transaction. To other participants or nodes not on the particular channel, however, only an encrypted or redacted version of the information can be viewable, thereby not disclosing the transaction information to such participants or nodes. In some embodiments, consistency properties may be preserved even in the presence of this selective sharing of transaction information with proofs of validity, such as transaction replay from a shared log containing encrypted or redacted versions of the same information, or built on cryptographic techniques.

In some embodiments, the systems disclosed herein utilize state machine replication, which is a general method for implementing fault-tolerant services in a distributed system/network. The replicated state machine (RSM) model can guarantee that any two nodes in the network that access the same set of data, process the same set of transactions and run the same deterministic code will reach the same state. However, the RSM model can break down in the presence of privacy in a decentralized network, where individual nodes may access different sets of data, process different sets of transactions, and reach different states (hence inconsistent view of the states). Accordingly, there can be a conflict between consistency and privacy in a decentralized network.

To address this possible conflict, some embodiments of the systems disclosed herein are configured to be a modification to the RSM model to achieve both consistency and privacy in a decentralized network and on a distributed ledger. As such, some embodiments described herein comprise certain features of both an RSM model and distributed ledgers.

In some embodiments, the systems, methods, and devices disclosed herein are configured to enable trusted sharing of private data and/or transactions via a distributed ledger technology. In some embodiments, the distributed ledger technology can be a public and/or a private distributed ledger technology. In some embodiments, the systems disclosed herein are configured to utilize encryption to encrypt data and/or transactions before storing the information within the distributed ledger technology. In some embodiments, the systems disclosed herein are configured to utilize other mechanisms for securing the data and/or transactions before storing the information within the distributed ledger technology. In some embodiments, some network participants that can access the distributed ledger technology will be able to see the existence of the data/transaction but will not be able to read the actual data/transaction stored in the distributed ledger technology because the actual data/transaction is encrypted (or otherwise obscured or hidden or made inaccessible) before it is stored in the distributed ledger technology. In some embodiments, participants that have access to the encryption key used for encrypting the transaction data can access and read the encrypted transaction data that is stored in the distributed ledger technology. In some embodiments, the foregoing encryption key or pair of encryption keys for encrypting transaction data before storing such data on the distributed ledger enables the trusted sharing of private data on a distributed ledger technology, whether the distributed ledger is a public or a private distributed ledger.

For example, a first participant can utilize the systems disclosed herein to encrypt data and/or transaction using an encryption key and publish and/or store the encrypted data on a distributed ledger, such as a blockchain. In this example, a second participant with access to the encryption key can be configured to access the encrypted data/transaction stored on the distributed ledger and use the encryption key to decrypt the transaction data in order to read the private data/transaction information. By publishing the encrypted transaction data, participants of the systems disclosed herein can take advantage of the ability to ensure that the data/transaction is consistent across the entire distributed ledger system. As such, in some embodiments, the systems disclosed herein provide a technical solution to allow private and/or controlled sharing of data/information among certain nodes and/or identities on a distributed ledger with data/information consistency.

In some embodiments, the use of the systems disclosed herein can create one or more secure and/or private channels within the distributed ledger. In some embodiments, such secure channels can be utilized for trusted sharing of private data between selected participants that have access to the encryption key used for encrypting and decrypting the transaction data that is stored in the distributed ledger. Further, such secure channels can also be used for preventing participants that do not have access to the encryption key from accessing the encrypted transaction information stored on the distributed ledger. Additionally, such secure channels can also be used for allowing the encrypted transaction data to be published throughout the entire distributed ledger thereby ensuring the consistency and/or accuracy of the data throughout the distributed ledger system and allowing the transaction data to be accessed by other authorized participants at a later time. In some embodiments, the systems disclosed herein can generate secure channels, also known as encrypted channels, that comprise one or more transactions that are encrypted using the same encryption key. In some embodiments, participants with access to the same encryption key can create a secure channel and access all the data/transactions stored in the secure channel by using the systems disclosed herein.

In some embodiments, the systems disclosed herein can comprise secure channels that can be independent channels and/or interdependent or dependent channels. In some embodiments, an independent channel can comprise transaction data that does not depend upon any data and/or transaction stored in a second secure channel, and/or does not affect any data and/or transaction stored in a second secure channel. In some embodiments, an interdependent or dependent channel can comprise a transaction that relies upon data and/or a transaction stored in a second secure channel, and/or can affect data and/or a transaction stored in a second secure channel.

In some embodiments, the systems disclosed herein can be configured to create a secure channel by generating an identity for a particular participant, wherein the identity is a network-wide unique identifier that can map to a set of cryptographic keys that the identity is associated with. In some embodiments, a first identity can create a secure channel by generating an encryption key, and provide the encryption key to a second identity. By sending the encryption key to the second identity, the first and second identities can use the secure channel to store and/or access encrypted data/transaction by utilizing the encryption key. In some embodiments, the first identity can generate data/transactions and encrypt such data/transactions using the encryption key in order for the system to store such encrypted data/transactions in the distributed ledger. Subsequently, the second identity can utilize the encryption key to access and read the transaction data stored in the distributed ledger. In some embodiments, a third identity, which does not have access to the encryption key, can only determine that the encrypted data/transactions exist in the distributed ledger but cannot access and/or read the transaction data.

In some embodiments, the secure channel is a dependent or an interdependent channel wherein an identity can access a first data/transaction in the first secure channel that is stored on the distributed ledger by using the encryption key of the first secure channel but also needs to access a second secure channel stored on the same distributed ledger in order to process the first data/transaction, which is dependent on one or more data/transactions stored in the second secure channel. In some embodiments, the first data/transaction comprises a second encryption key that enables the identity to access the one or more data/transactions stored in the second secure channel.

In some embodiments, the systems disclosed herein can be configured to implement an identity feature in the network. In some embodiments, an identity is a network-wide unique string identifier that maps to a set of cryptographic keys. In some embodiments, the set of cryptographic keys include at least a key pair for encryption and a key pair for signature.

In some embodiments, the systems disclosed herein can be configured to process a first type of transaction, also referred to as RegisterIdentity. In some embodiments, the RegisterIdentity transaction is a transaction message that contains the string representing the identity and the set of cryptographic key pairs associated with this identity, where each cryptographic key pair consists of a public key and a corresponding private key In some embodiments, RegisterIdentity establishes an identity in the network, and in some embodiments, the identity can execute other types of transactions and/or validate transactions posted by other identities.

In some embodiments, all smart-contract level matters (including identity, privacy, and the like) are completely independent of network topology. In some embodiments, an identity is the role that executes various actions/transactions in the network, and there can be multiple identities on a single node. In some embodiments, a node, when processing an action of a given identity, that can originate from another node, cannot tell from what node that action originated or which node hosts a particular identity, and in some embodiments, there may be no way to find out within the protocol. In some embodiments, the system may be configured to potentially sniff network traffic with the appropriate instrumentation in SmartLog etc. to determine what node that action originated or which node hosts a particular identity.

In some embodiments, identities can create encrypted channels, which can be referred to as secure channels as discussed above. In some embodiments, a channel is a sequence of states. In some embodiments, a secure channel is a namespace for executing a set of transactions among a group of identities. In some embodiments, the transactions in a single channel are encrypted with the same key. In some embodiments, independent channels are independent insofar as a transaction in one channel has no effect on any other channel on the distributed ledger. In some embodiments, the set of independent channels can be viewed as a set of independent replicated state machines.

In some embodiments, the systems disclosed herein can be configured to process one, two, three or more transactions for establishing a new secure channel. In some embodiments, the systems disclosed herein can be configured to distribute or electronically transmit the channel encryption key to various identities or participants that are authorized to join (or be part of) the channel. In some embodiments, an identity or participant that is authorized to join a secure channel has the permission and ability to access and/or read data/transactions within the secure channel and/or be able to or be permitted to write transactions to the secure channel.

In some embodiments, the systems disclosed herein can be configured to execute another type of transaction referred to as MakeNewChannel. In some embodiments, the MakeNewChannel transaction is configured to create each new secure channel. In some embodiments, the channel creator is referred to as the owner of the channel. In some embodiments, the owner generates the initial channel encryption key (for example, a symmetric key) and uses this key to encrypt the MakeNewChannel transaction.

In some embodiments, the systems disclosed herein can be configured to execute another type of transaction referred to as SendKey. In some embodiments, the SendKey transaction is configured to allow the owner of a channel to send or electronically transmit the current channel encryption key to an identity or participant that the owner wants to invite to join the channel. In some embodiments, the systems disclosed herein can be configured to use the transaction message to include the channel information (for example, channel name) and/or the channel key. In some embodiments, the systems disclosed herein are configured to encrypt the transaction message using the public encryption key of the identity (which in some embodiments has already been provided in the RegisterIdentity transaction).

In some embodiments, the systems disclosed herein can be configured to generate a public channel wherein all participants in the network can access the data/transactions stored in the channel. In some embodiments, the systems disclosed herein are configured to use RegisterIdentity and SendKey transactions, which can both be posted in the public channel.

In some embodiments, the systems disclosed herein can be configured to establish an identity on a particular node of the network. Therefore, in some embodiments, only that node stores the secrets for the identity, wherein such secrets include the private keys of the identity (for signing and for decryption and/or encryption) and/or the channel keys for all the channels that the identity has joined. In some embodiments, it can be said that a node is able to decrypt a transaction posted in channel A to refer to the fact that the node has a registered identity that belongs to channel A. In some embodiments, the systems disclosed herein are configured such that each node keeps track of which identities have which channel access rights, as many different identities may be registered on a single node. In some embodiments, the systems disclosed herein can be configured such that a node controls which identity's credentials to use for which transaction in the network.

In some embodiments, the systems disclosed herein can be configured such that each transaction is signed by the identity that posts the transaction using its private signing key. In some embodiments, the systems disclosed herein can be configured to omit the signing step. In some embodiments, the systems disclosed herein can be configured to require that each transaction be signed by the identity that posts the transaction using the identity's signing key.

In some embodiments, the systems disclosed herein can be configured to allow for a set of identities associated with a channel A to overlap with a set of identities associated with a channel B.

In some embodiments, the systems disclosed herein can be configured to allow an identity to directly or indirectly correspond to a real-world participant. In some embodiments, the systems disclosed herein can be configured to allow an identity to typically correspond to a real-world participant.

In some embodiments, the systems disclosed herein can be configured to implement independent secure channels, wherein the transactions in different channels are completely independent of each other. However, in certain real application scenarios, it can be possible that in order to process a transaction in a given channel, information about another channel is needed. For example, for managing share ownership in a company, one can want shareholder workflows to be dependent on the information about the company as a whole (for example, total shares outstanding), but such information about particular shareowners' positions should be private. Without channel interdependencies, either every shareholder could see everyone else's positions, or a stock split at the company-level would not be able to affect the shareholder positions.

In some embodiments, the systems disclosed herein can be configured to allow transactions posted in any of the secure channels to depend on the data in a public channel, since information in the public channel is accessible by all members.

In some embodiments, the systems disclosed herein can be configured to allow execution of a transaction that only results in the modification of data associated with a single channel, which can be referred to as a write channel.

In some embodiments, the systems disclosed herein can be configured to process a transaction using data in other channels, which can be referred to as a read channel, so long as the data carries a proof of validity.

In some embodiments, the systems disclosed herein can be configured to provide the proof of validity through a set of channel encryption keys for each of the dependent read channels. This can be sufficient to prove the validity of the data since the keys allow us to decrypt past transactions in the dependent channels and verify the transactions. In some embodiments, the foregoing process is called replay. In some embodiments, a proof of validity can take different forms, such as a zero-knowledge proof (ZKP), verifiable computation, authenticated data structures, and the like.

In some embodiments, the systems disclosed herein can be configured to perform another type of transaction referred to as Execute. In some embodiments, the Execute transaction is configured to take all necessary inputs from the read channels and the corresponding channel keys, verify the inputs and execute the code embedded in the transaction. In some embodiments, the transaction message is encrypted using the current channel key.

In some embodiments, the systems disclosed herein can be configured to change channel membership. In some embodiments, the systems disclosed herein can be configured to store a set of identities associated with a particular secure channel wherein the set of identities can be dynamic. In some embodiments, the systems disclosed herein can be configured to allow new identities to be added, and/or to allow existing identities to be removed. In some embodiments, the systems disclosed herein can be configured to revoke an identity's access to future transactions in the channel, which can be accomplished by key rotation.

In some embodiments, the systems disclosed herein can be configured to use key identifiers also referred to as keyId, which can be a string that uniquely identifies each channel key. In some embodiments, security properties can be associated with a key identifier in order to protect the key identifier from being impermissibly modified and/or used and/or transmitted and/or accessed.

In some embodiments, the systems disclosed herein can be configured to implement key rotation using the FreezeChannel transaction and/or the RotateKey transaction.

In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel is the link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This allows the recovery of all past channel keys—when an identity receives the current channel key, it can replay and/or execute all past transactions posted in the channel by retrieving all past channel keys that are stored (in encrypted form) in the RotateKey transactions.

In some embodiments, the systems disclosed herein can be configured to allow for changing channel ownership. In some embodiments, the systems disclosed herein can be configured to allow ownership of a channel to be dynamic or changeable. In some embodiments, the systems disclosed herein can be configured to change channel ownership by utilizing the AddOwner transaction and/or the RemoveOwner transaction.

In some embodiments, the systems disclosed herein can be configured to utilize the AddOwner transaction, wherein the transaction can include the channel name and/or the identity of the owner to be added.

In some embodiments, the systems disclosed herein can be configured to utilize the RemoveOwner transaction, wherein the transaction can include the channel name and/or the identity of the owner to be removed.

In some embodiments, the systems disclosed herein can be configured to allow each transaction to be posted by one of the owners of the channel and/or encrypted with the channel key. In some embodiments, the systems disclosed herein can be configured to allow the creator of the channel to add other identities as an owner; however, such actions can potentially result in the creator losing control of the channel if one of the other owners removes the channel creator from the list of owners and/or rotates the channel key. In some embodiments, the foregoing can be an advantageous feature of the systems disclosed herein.

In some embodiments, the systems disclosed herein can be configured to allow for the reserving of channel names. In some embodiments, the systems disclosed herein can be configured to allow for the use the ReserveIdentifier transaction to avoid the issue of channel name collision, wherein more than one identity desires to use the same channel name.

In some embodiments, the systems disclosed herein can be configured to utilize the ReserveIdentifier transaction, wherein the transaction can be executed together with the MakeNewChannel transaction. In some embodiments, when a channel is created, the state name needs to be reserved so that there cannot be two different channels with the same channel name.

In some embodiments, the systems disclosed herein can utilize the following specifications and/or definitions:

Asymmetric Encryption:
ASym.Gen( )→(pk_enc, sk_enc)
ASym.Encrypt(pk_enc, m)=c
ASym.Decrypt(sk_enc, c)=m In some embodiments, the systems disclosed herein can be configured to allow posting encrypted channel keys on the distributed log. In some embodiments, the systems disclosed herein can be configured to use other mechanisms.

Symmetric Encryption:
Sym.Gen( )→(key)
Sym.Encrypt(key, m)→c
Sym.Decrypt(key, c)→m Signature:
Sig.Gen( )→(pk_sig, sk_sig)
Sig.Sign(sk_sig, m)→s
Sig.Verify(pk_sig, s, m)→{0,1}

In some embodiments, the systems disclosed herein can use one or more of the following crypto algorithms, among others:

Asymmetric encryption: RSA, Elliptic Curve based asymmetric encryption
Symmetric encryption: AES
Signature: ECDSA, RSA
Hash function: SHA256

In some embodiments, it can be specified how the transaction is composed for each type of transaction (for example, through the generation process mechanism) and/or how transaction is parsed and/or verified by each node (for example, through a verification process mechanism). Some example transaction types and/or algorithm details are provided below.

In particular, to help parse the algorithm specifications below, certain steps that can be common in all the transactions, which may not necessarily be the case, are highlighted.

For example, the transaction message format can be written as follows (note: "x||y" can be used to denote concatenation of the two messages x and y):

m=requestId||identity||specific_message||nonce,
where requestId is a job identifier from a contract and nonce is a (pseudo)random string of length 32 bytes that is unique to each transaction.

For signing, in some embodiments, each transaction message can be signed by the identity who posts the transaction using its private signing key.

For encryption, in some embodiments, for a transaction posted in a secure channel, the signed message can be encrypted using the current channel key, and a key identifier can be attached to the encrypted message so that the key can be easily identified and retrieved during the verification process.

Further, in some embodiments, for SendKey, the payload can be encrypted using the recipient's public key.

In addition, in some embodiments, for a transaction posted in the public channel, the message can be encrypted using the public key of the public channel. In some embodiments, RegisterIdentity, ReserveIdentifier, SendKey are posted in the public channel, and/or all the other transactions are posted in a secure channel. In some embodiments, there can be a special public/private key pair for the public channel.

For owner-only posting, in some embodiments, anyone can post RegisterIdentity, Execute, and SendKey. In some embodiments, all other types of transactions can only be posted by the owner of a channel.

Figure 12:
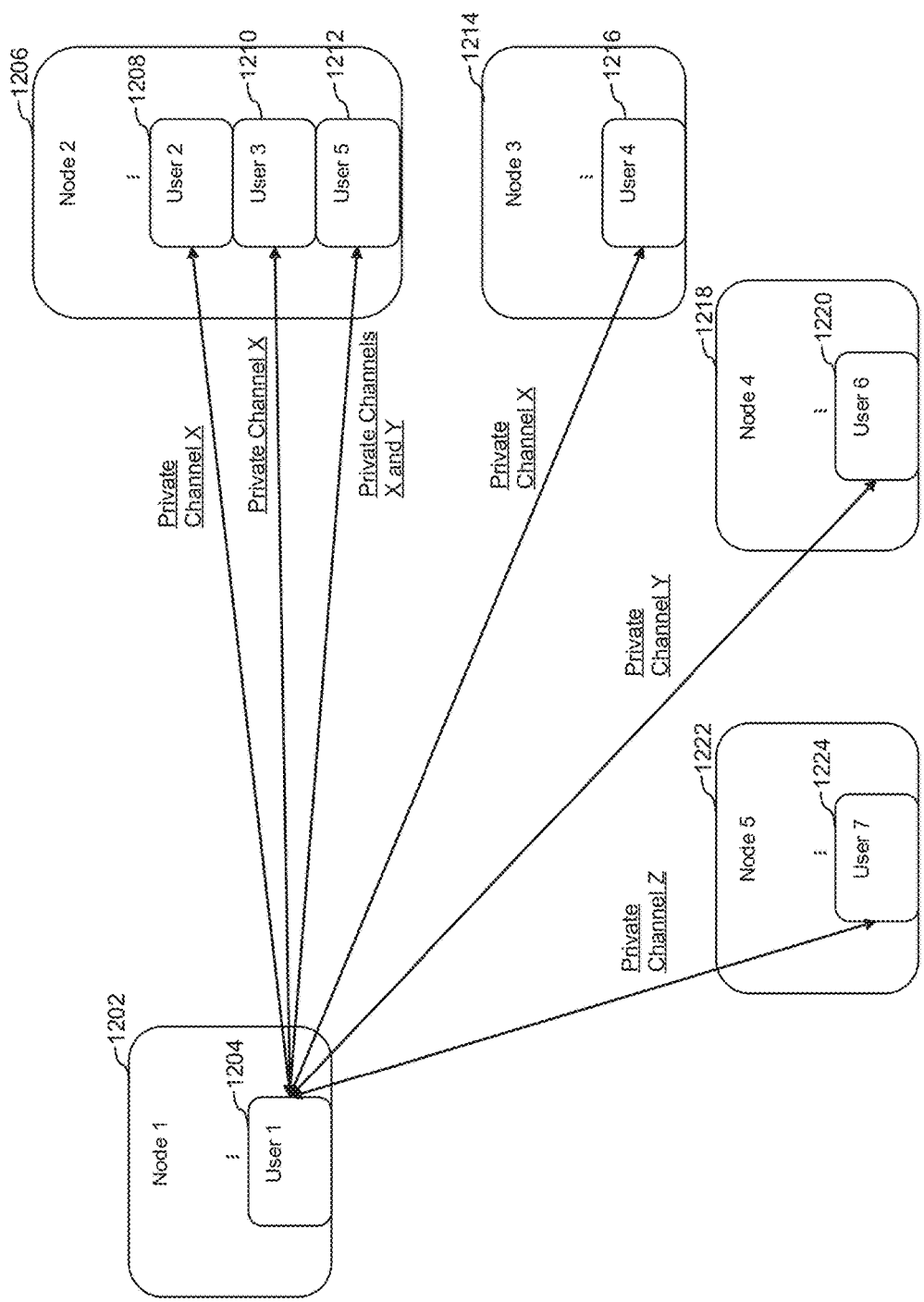
FIG. 12 is a schematic diagram illustrating an example embodiment(s) of private or controlled sharing of information on a distributed ledger through one or more secure, private channels.

FIG. 12 is a schematic diagram illustrating an example embodiment(s) of private or controlled sharing of information on a distributed ledger through one or more secure, private channels. As discussed herein, in some embodiments, sharing of information and/or data on a DLT can be controlled, such that only certain nodes and/or users on the DLT have access to certain information or data. In some embodiments, controlled or private sharing of data on a DLT can be based on a particular node(s) and/or user(s). For example, one or more users can be on a single node; however, even if on the same node, different users thereon can be given different levels of access to information, such as through utilization of network identities as described herein.

As illustrated in FIG. 12, in some embodiments, a DLT platform, such as a smart UCC platform or smart company DLT platform as discussed herein, can comprise one or more nodes, such as Node 1 1202, Node 2 1206, Node 3 1214, Node 4 1218, Node 5 1222, and/or any additional nodes. Each of the nodes can comprise one or more users on different private channels with access to different information. For example, in the illustrated embodiment, User 1 1204 on Node 1 1202 and User 2 1208 on Node 2 1206 can be on Private Channel X, sharing certain information privately on a DLT. Further, User 3 1210 on Node 2 1206, the same as User 2 1208, can also be on Private Channel X, as well as User 4 1216, which can be on a different node, Node 3 1214. Similarly, User 6 1220 on Node 4 1218 can be on a different private channel, Private Channel Y, with User 1 1204, sharing different information. Further, User 5 1212 on Node 2 1206 can be on both Private Channels X and Y, thereby having access to information on both private channels. Furthermore, there can be a third private channel, Private Channel Z on which only User 1 1204 of Node 1 1202 and User 7 1224 of Node 5 1222 can be members of, thereby sharing certain information only between such two users and/or nodes.

State Machine Replication

In some embodiments, the systems, methods, and devices described herein are configured to utilize state machine replication or a modified version thereof, whether in connection with independent or dependent channels. In other words, in some embodiments, one or more features/processes described herein for state machine replication can be used for and/or in combination with one or more features/processes described herein for independent channels and/or dependent or interdependent channels. In some embodiments, one or more processes described herein relating to state machine replication can allow for and/or facilitate controlled and private sharing of data and information while maintaining data and information consistency on a distributed ledger.

Figure 13A:
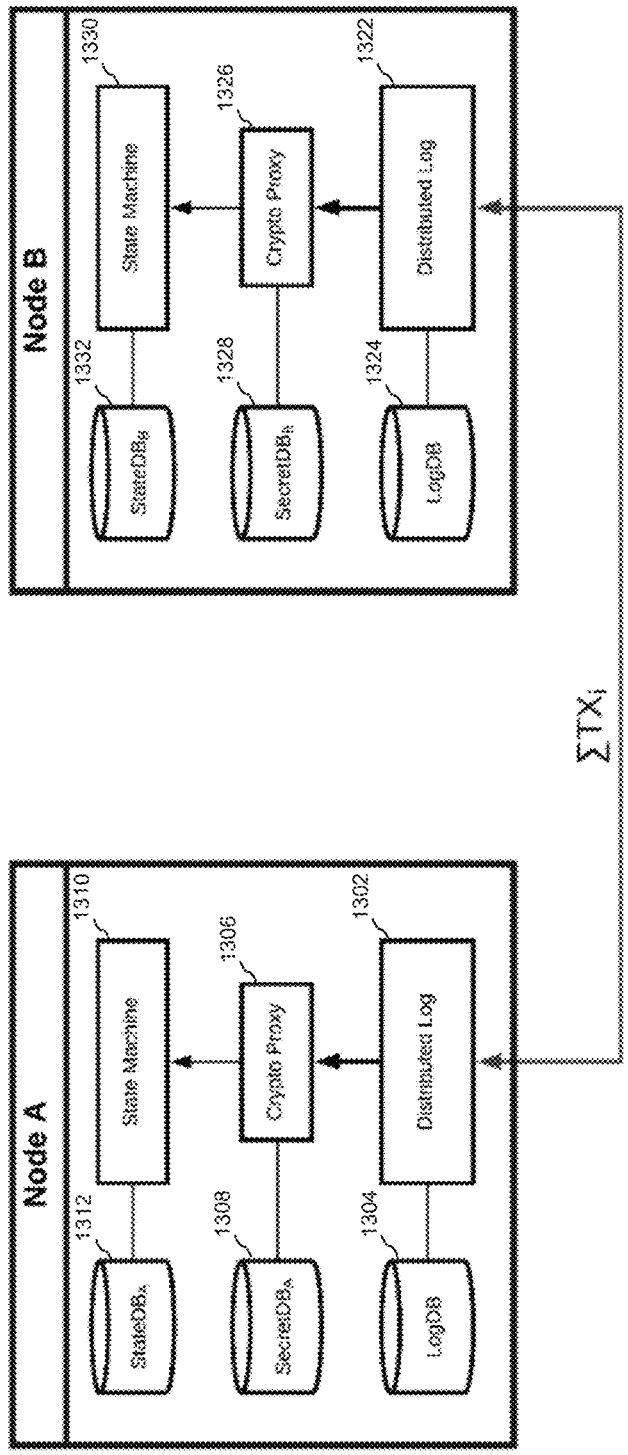
FIG. 13A is a schematic diagram illustrating an example embodiment(s) of nodes in the network and state machine replication.

FIG. 13A illustrates an example embodiment(s) of nodes in the network and state machine replication. As illustrated in FIG. 13A, in some embodiments, each of the nodes on the system can comprise a Distributed Log 1302, 1322. In other words, the same Distributed Log 1302, 1322 can exist on every node on the system, which can include Nodes A and B in the illustrated example. Nodes A and B can be the same node and/or different nodes. In some embodiments, one or more identities can be present on each node.

In some embodiments, the Distributed Log 1302, 1322 can be shared and ordered identically among one or more and/or all of the nodes on the system. In other words, in some embodiments, the same sequence of operations and how one operation depends upon the previous operation(s) can be tracked by every node on the distributed ledger system or network to guarantee and maintain data/information consistency. For example, every arbitrary transaction in the Distributed Log or a set thereof ("$\Sigma\ TX_i$") can be logged in the Distributed Log 1302, 1322 in the same order on every node in the system, including Node A and Node B. In some embodiments, every arbitrary transaction in the Distributed Log ("$\Sigma\ TX_i$") can be encrypted.

In some embodiments, each or some nodes on the system, such as Node A and Node B, can comprise a Log Database 1304, 1324 for storing the contents or transactions logged in the Distributed Log, such as $\Sigma\ TX_i$. In some embodiments, the same encrypted set of arbitrary transactions ("$\Sigma\ TX_i$") can be stored in the Log Database 1304, 1324 of every node on the system, including Nodes A and B.

In some embodiments, each or some nodes on the system, comprises a Crypto Proxy 1306, 1326 for encrypting and/or decrypting one or more transactions using an encryption key, such as a symmetric key or asymmetric key. In some embodiments, each or some nodes on the system, comprises a Secret Database 1308, 1328 for storing one or more encryption keys. The Secret Databases 1308, 1328 of each or some nodes on the system may have different encryption keys stored thereon. For example, in some embodiments, a Secret Database on Node A 1308 ("SecretDB$_A$") can have stored thereon an encryption key for Channel X but not for Channel Y, for instance if Node A is a member of Channel X but not Channel Y. However, a Secret Database on Node B 1328 ("SecretDB$_B$") can have stored thereon an encryption key for Channel Y but not for Channel X, for instance if Node B is a member of Channel Y but not Channel X.

In some embodiments, the Crypto Proxy 1306, 1326 on each or some nodes on the system can be configured to retrieve an appropriate encryption key from its respective Secret Database 1308, 1328 for encrypting and/or decrypting a particular transaction for a particular channel. For example, if a node is generating a new transaction and/or a new channel, a Crypto Proxy 1306, 1326 on that node can encrypt the new transaction using an encryption key for that channel, which can be stored on the Secret Database 1308, 1328 of that node. Further, in some embodiments, a Crypto Proxy 1306, 1326 on a node may decrypt an encrypted transaction on the Distributed Log 1302, 1322 if the node has stored in its Secret Database 1308, 1328 the applicable encryption key for that transaction and channel. If so, then a Crypto Proxy 1306, 1326 on the node may retrieve an encrypted transaction from the Distributed Log 1302, 1322 or Log Database 1304, 1324 and also retrieve the applicable encryption key from the Secret Database 1308, 1328 on that node and decrypt the transaction.

In some embodiments, each or some nodes on the system, comprises a State Machine 1310, 1330 for executing one or more transactions that have been decrypted. In some embodiments, each or some nodes on the system, comprises a State Database 1312, 1332 for storing state information obtained by executing one or more decrypted transactions. The State Databases 1312, 1332 of each or some nodes on the system may have different states stored thereon for one or more channels. For example, in some embodiments, a State Database 1312 on Node A ("StateDB$_A$") can have stored thereon up-to-date state information for Channel X but not for Channel Y, for instance if Node A is a member of Channel X but not Channel Y. However, a State Database 1332 on Node B ("StateDB$_B$") can have stored thereon up-to-date state information for Channel Y but not for Channel X, for instance if Node B is a member of Channel Y but not Channel X.

In some embodiments, the State Machine 1310, 1330 on each or some nodes on the system can be configured to retrieve a decrypted transaction from its respective Crypto Proxy 1306, 1326 and execute the decrypted transaction for a particular channel. In some instances, if a transaction is not encrypted in the first place, for example because there is no reason to privately share that transaction among only a select number of nodes, the State Machine 1310, 1330 on every node on the system can be configured to execute the transaction to reach the same state without need for decryption.

As such, in some embodiments, the system can be configured to utilize a state machine replication scheme or process, in which two inputs are inputted into the state machine on each or some of the nodes on the system. More specifically, in some embodiments, one or more encrypted transactions from a Distributed Log 1302, 1322 or Log Database 1304, 1324 can be inputted into a Crypto Proxy 1306, 1326, which can use an encryption key retrieved from a Secret Database 10308, 1328 to decrypt the one or more encrypted transactions, if the particular node has the applicable encryption key stored in its Secret Database 1308, 1328. Then, in some embodiments, the decrypted one or more transactions can be inputted into the State Machine 1310, 1330 at each or some nodes on the system for execution to obtain the resulting state information. As such, in some instances, only those nodes (and state machines thereon) on the network or system with an applicable encryption key for that transaction (and/or on the particular channel for that transaction) will be able to execute the transaction and obtain the resulting state information for that channel; other nodes not on the channel and without the applicable encryption key may have different state information for the same channel as they are not able to execute the transaction.

Moreover, in some embodiments, for transactions that were never encrypted in the first place, the State Machine 1310, 1330 on each and every node on the system can be configured to execute such transactions without having its Crypto Proxy decrypt such transactions; as such, for such transaction that were not previously encrypted, all nodes on the system (and state machines thereon) can have the same state information for that transaction or public channel. In some embodiments, transactions that were not previously encrypted prior to broadcasting on the distributed log can be deemed to be on a public channel without any encryption.

In some embodiments, the Log Database 1304, 1324 on each and every node on the system can comprise the same data/information in the same order. However, in some embodiments, the Secret Database 1308, 1328 on at least some of the nodes on the system can comprise a set of different encryption key data if these nodes are on a different set of channels. At the same time, in some embodiments, the Secret Database 1308, 1328 on at least some of the nodes on the system can share at least some of the same encryption key data if these nodes are on at least one common channel. Also, in some embodiments, the State Database 1312, 1332 on at least some of the nodes on the system can comprise different state information if these nodes are on a different set of channels. At the same time, in some embodiments, the State Database 1312, 1332 on at least some of the nodes on the system can share at least some of the same state information for at least one channel if these nodes are on at least one common channel.

In some embodiments, each and every node on the system can comprise identical components of a Distributed Log 1302, 1322, Log Database 1304, 1324, Crypto Proxy 1306, 1326, Secret Database 1308, 1328, State Machine 1310, 1330, and State Database 1312, 1332. In some embodiments, each and every node on the system can comprise at least one or more of the foregoing components but not necessarily all. In some embodiments, each and every node on the system can comprise all of the foregoing identical components but different additional components.

State Information v. Log Information

In some embodiments, one or more encrypted transactions can be broadcasted to all nodes on a distributed ledger system or network. These encrypted transactions can be written/stored on the distributed log by each and every node on the distributed ledger in some embodiments.

Further, in addition to storing these encrypted transactions, in some embodiments, those nodes on the distributed ledger that possess the appropriate encryption key for decrypting a particular encrypted transaction can decrypt the transaction using the encryption key, execute the decrypted transaction according to the program logic, and/or update state information as a result of the execution. In some embodiments, state information is also stored in a database on, attached to, and/or accessible by each node, such as in a State Database. In some embodiments, those nodes on the distributed ledger without the appropriate encryption key will not be able to decrypt or execute the encrypted transaction and as such will not be able to update state information accordingly.

Figure 13B:
FIG. 13B is a schematic diagram illustrating an example embodiment(s) of data stored on a Log Database and data stored on a State Database.

FIG. 13B illustrates an example embodiment(s) of data stored on a Log Database and data stored on a State Database, regardless of whether from utilizing an independent, interdependent or dependent channel, or public channel. In the illustrated example, the top row, denoted $TX_X^j$ refers to arbitrary and encrypted transactions in some channel, Channel X. For example, a First Encrypted Transaction ("$TX_X^1$"), a Second Encrypted Transaction ("$TX_X^2$"), and a Third Encrypted Transaction ("$TX_X^3$") may be generated and broadcasted to nodes on a distributed ledger.

In some embodiments, every node on the distributed ledger can store each encrypted transaction on Channel X, once broadcasted, in a Log Database ("Log DB$^j$"). In other words, the Log Database can have stored thereon a list of transactions that are ever created and broadcasted on the distributed ledger. In particular, in the illustrated example, after the First Encrypted Transaction is broadcasted, the First Encrypted Transaction $TX_X^1$ can be stored on the Log Database. For illustrative purposes, the First Encrypted Transaction can contain the information x=0. Similarly, in the illustrated example, after the Second Encrypted Transaction is broadcasted, then the Log Database at that time can have stored thereon both the First Encrypted Transaction $TX_X^1$ and the Second Encrypted Transaction $TX_X^2$. For illustrative purposes, the Second Encrypted Transaction can contain the information x+=3. Further, in the illustrated example, after the Third Encrypted Transaction is broadcasted, then the Log Database at that time can have stored thereon both the First Encrypted Transaction $TX_X^1$, the Second Encrypted Transaction $TX_X^2$, and the Third Encrypted Transaction $TX_X^3$. For illustrative purposes, the Third Encrypted Transaction can contain the information x+=5.

In some embodiments, those nodes with an applicable encryption key to decrypt the encrypted transactions will be able to decrypt and execute the transaction and update the State Database on that node with the updated state information for Channel X. In the illustrated embodiment, "$State_X^j$" denotes the contents of the State Database corresponding to Channel X as of Transaction j in Channel X. For example, a node with an encryption key to decrypt the First Encrypted Transaction $TX_X^1$ will be able to decrypt and execute the First Encrypted Transaction to obtain the state information x=0, which can be stored in the State Database of that node. In other words, the State of Channel X after the first transaction ("$State_X^1$") can be x=0.

Further, after the Second Encrypted Transaction $TX_X^2$ is broadcasted, a node with an encryption key to decrypt the Second Encrypted Transaction $TX_X^2$ can decrypt and execute the same to obtain the state information x=3 (by executing x+=3 to the last previous state x=0) for Channel X. In other words, the State of Channel X after the second transaction ("$State_X^2$") can be x=3. Similarly, after the Third Encrypted Transaction $TX_X^3$ is broadcasted, a node with an encryption key to decrypt the Third Encrypted Transaction $TX_X^3$ can decrypt and execute the same to obtain the state information x=8 (by executing x+=5 to the last previous state x=3) for Channel X. In other words, the State of Channel X after the third transaction ("$State_X^3$") can be x=8.

Independent Channel

As described above, generally speaking, one advantage of a distributed ledger technology (DLT) system can be that consistency can be guaranteed across all one or more nodes on the distributed ledger system. In other words, every node on the DLT platform or network can be known to have an identical set of information, at any point in time. However, in order to do so, all information on the distributed ledger can be generally viewable on all nodes on the system, which may not be ideal or acceptable. Rather, it may be desirable to keep certain information private or secret from certain participants, which may not be technically possible on certain existing distributed ledger technologies. As such, applications of DLT can be limited due to the lack of ability privately share information on a distributed ledger.

One way to address this technical shortcoming of DLTs can be to use pseudonyms to handle anonymity and privacy, as in some cryptocurrency systems. However, there are significant limitations to this solution, as data besides the identities are not hidden, and even the identity information may be leaked this way. Another possible solution can be to split a single distributed ledger into two or more distributed ledgers—either logical or physical—in which only those participants proxy to the same information would be on a same distributed ledger. However, if multiple distributed ledgers are used, then data/information consistency may no longer guaranteed among the plurality of distributed ledgers, thereby negating one of the key technical advantages of distributed ledgers.

As such, to address such technical problems, namely to allow private or controlled sharing of information on a single distributed ledger while preserving consistency of all information among all of the nodes on the distributed ledger, certain systems described herein provide and utilize one or more independent and/or dependent or interdependent channels. In particular, in some embodiments, one or more independent and/or dependent or interdependent channels can exist on a single distributed ledger, wherein participants or nodes on a particular channel are able to view and access the same underlying information of a broadcasted transaction. To other participants or nodes not on the particular channel, however, only an encrypted version of the information can be viewable, thereby not disclosing the underlying information to such participants or nodes not on the channel. At the same time, however, encrypted versions of the same underlying information can be written onto the distributed ledger at every node, thereby maintaining data consistency of the distributed ledger, while allowing controlled and private sharing of information as desired among only certain identities or nodes on the distributed ledger.

Figure 14A:
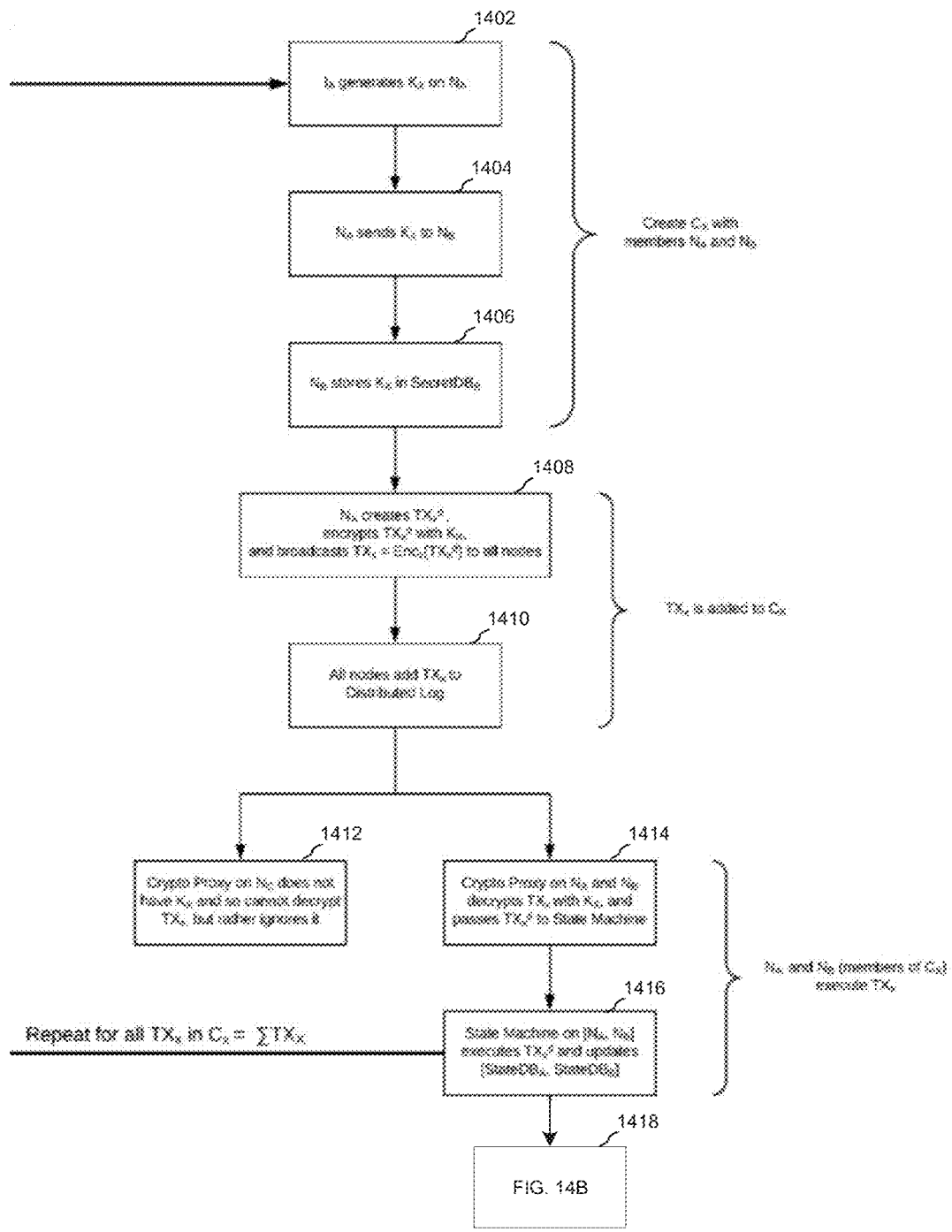
FIG. 14A is a flowchart illustrating an example embodiment(s) of private or controlled sharing of information on a distributed ledger through an independent secure channel.

In particular, FIG. 14A illustrates an example embodiment(s) of private or controlled sharing of information on a distributed ledger through an independent secure channel. However, certain processes and/or features described in connection with FIG. 14A can also be applicable to dependent or interdependent channels. Referring to FIG. 14A, in some embodiments, a participant or Identity A ("$I_A$") can be on Node A ("$N_A$"), which is part of a distributed ledger network or system. Node B ("$N_B$") and Node C ("$N_C$") can also be part of the same distributed ledger network or system. Nodes A, B, and/or C can be the same node and/or different nodes. In some embodiments, one or more identities can be present on each node.

In some embodiments, Identity A can create private channel, Channel X ("$C_X$") just with members Node A and Node B, but not including Node C. In particular, Identity A can generate an encryption key, which can be a symmetric or asymmetric key, for the new channel. More specifically, in the illustrated example, Identity A can generate Symmetric Key X ("$K_X$") at block 1402. In some embodiments, Node A can store Symmetric Key X in a database or a secure database, such as Secret Database A ("$SecretDB_A$") that Node A has access to. In order to create Channel X, in some embodiments, Node A and/or Identity A through Node A can send Symmetric Key X to Node B at block 1404. Upon receipt of Symmetric Key X, Node B can store Symmetric Key X in a database or a secure database, such as Secret Database B ("$SecretDB_B$"), on and/or accessible by Node B at block 1406. As such, in some embodiments, at this stage, only Nodes A and B have access to Symmetric Key X.

In some embodiments, at block 1408, Node A and/or Identity A through Node A can create an unencrypted or decrypted Transaction X ("$TX_x^d$") to add to Channel X at block 1408. In other words, this Transaction X can be generated by Node A for sharing only with Node B among all nodes on the distributed ledger network or system. However, prior to broadcasting Transaction X on the distributed ledger network or system, Node A can encrypt Transaction X at block 1408 with Symmetric Key X. The encrypted version of Transaction X with Symmetric Key X can be denoted "$Enc_x(TX_x^d)$." In some embodiments, Node A can then broadcast Transaction X in an encrypted form with Symmetric Key X to all nodes on the DLT at block 1408.

In some embodiments, all nodes on the distributed ledger network or system can then write the encrypted version of Transaction X to the Distributed Log at block 1410, thereby maintaining data/information consistency throughout the whole distributed network/system and nodes thereon. However, not all nodes will be able to decrypt the encrypted version of Transaction X to access the underlying plaintext or information of Transaction X.

For example, in the illustrated example, Node C does not have access to Symmetric Key X. In other words, the Crypto Proxy on Node C may not have Symmetric Key X and therefore cannot decrypt the encrypted version of Transaction X with Symmetric Key X. As such, in some embodiments, Node C can rather simply ignore Transaction X after logging the encrypted version of Transaction X on its Distributed Log for data/information consistency of the distributed ledger at block 1412.

In contrast, in the illustrated example embodiment, Node A and Node B have access to Symmetric Key X. In other words, in the illustrated example embodiment, the Crypto Proxy on Node A and the Crypto Proxy on Node B both have Symmetric Key X and therefore are able to decrypt Transaction X previously encrypted with Symmetric Key X at block 1414 to access the underlying plaintext or information. After decryption, the decrypted or unencrypted version of Transaction X can be passed by Node A and Node B to the State Machine of each node at block 1414. In some embodiments, each State Machine on Node A and Node B can then execute the unencrypted or decrypted version of Transaction X and update the State Database on Node A ("$StateDB_A$") and the State Database on Node B ("$StateDB_B$") for Channel X accordingly at block 1416. As such, in this illustrated example, all members of Channel X at this point (i.e., Node A and Node B) have now executed Transaction X.

In some embodiments, one or more processes described herein in connection with FIG. 14A can be repeated for all or a set of one or more transactions in Channel X, which can be denoted "$\Sigma\ TX_x$."

After creating a particular channel, such as Channel X in the example illustrated in FIG. 14A, it may be in the interest of the initial channel members to extend the channel membership to a new member in order to share the private or controlled information of the channel with another node. As such, in some embodiments, the system allows for addition of new members or nodes to existing channels to expand controlled sharing of information with the new member or node, while still maintaining consistency of information across the distributed ledger.

Figure 14B:
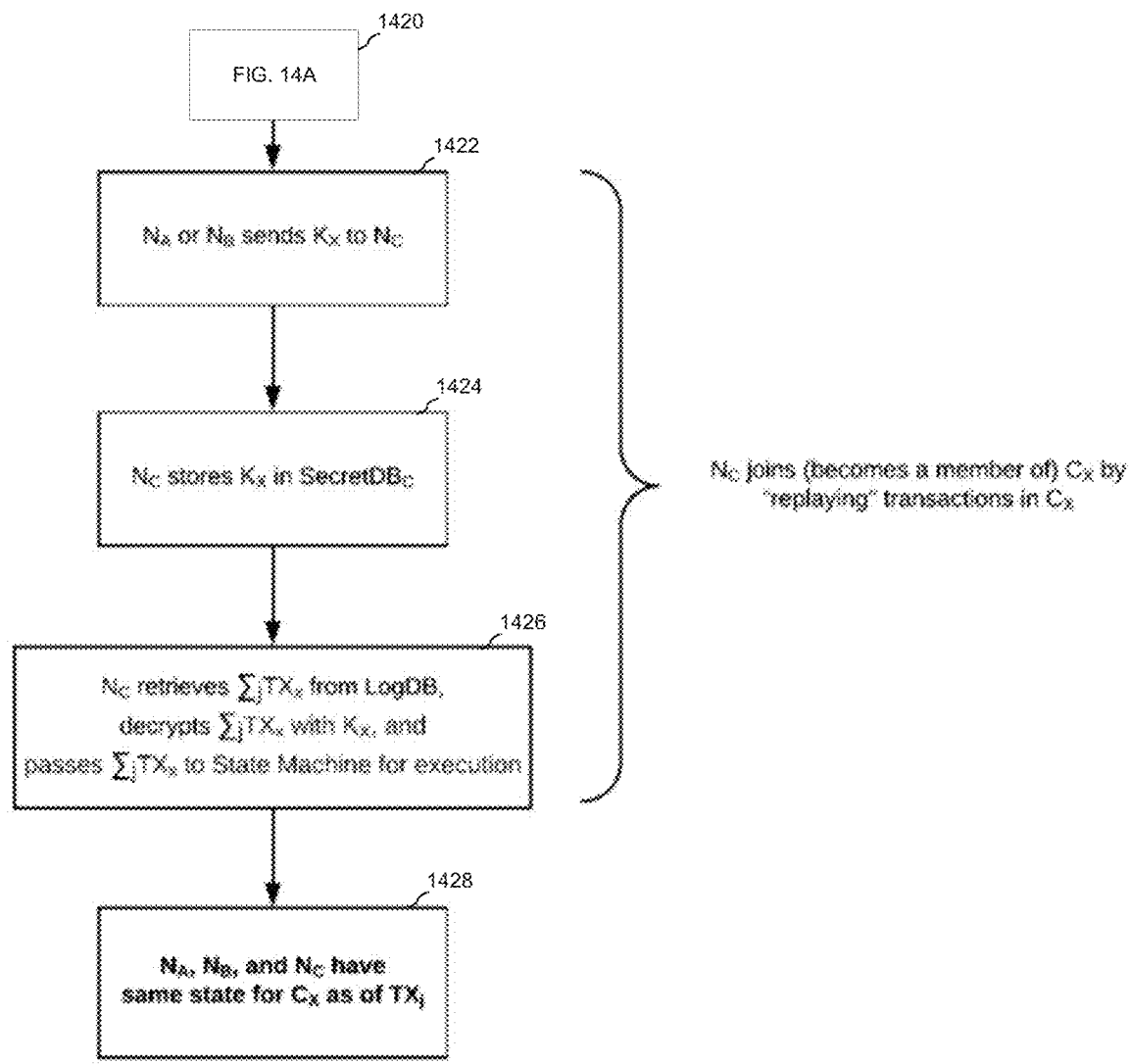
FIG. 14B is a flowchart illustrating an example embodiment(s) of adding a participant or node to an independent secure channel for private or controlled sharing of information on a distributed ledger.

FIG. 14B illustrates an example embodiment(s) of adding a member or node to an independent secure and/or private channel for private or controlled sharing of information on a distributed ledger. However, certain processes and/or features described in connection with FIG. 14B can also be applicable to dependent or interdependent channels. One or more processes described in connection with FIG. 14B can follow one or more processes described in connection with FIG. 14A.

As described above, in some example embodiments illustrated in connection with FIG. 14A, at least initially Node A and Node B can be the sole members of Channel X when Channel X is first created. In other words, Node A and Node B can be the only nodes with access to Symmetric Key X when Channel X is initially created. Then, if Node A and/or Node B wish to add Node C, a new member, to Channel X, then either Node A and/or Node B can send Symmetric Key X to Node C ("$N_C$") at block 1422. In some embodiments, Node C can then store Symmetric Key X in a database or a secure database, such as Secret Database C ("$SecretDB_C$"), on and/or accessible by Node C at block 1424. Nodes A, B, and/or C can be the same node and/or different nodes. In some embodiments, one or more identities can be present on each node.

As previously discussed, in some embodiments, Node C, which is on the distributed ledger, would have been logging an encrypted version of Transaction X, and encrypted versions of other transaction(s) on Channel X if any, on the distributed log. However, as Node C previously did not have access to Symmetric Key X, Node C would not have been able to decrypt the encrypted version of Transaction X or any other transaction(s) on Channel X, if any. Similarly, Node C previously would not have been able to execute Transaction X or any other transaction(s) on Channel X, if any, without Symmetric Key X. However, now that Node C has access to Symmetric Key X, in some embodiments, Node C can now decrypt and execute Transaction X and any other transaction(s), if any, on Channel X. In other words, Node C can now "replay" all transactions previously logged as part of Channel X, using Symmetric Key X, and thus become a member of Channel X.

In particular, in some embodiments, at block 1426, Node C can retrieve the set of transactions on Channel X in the distributed log or Log Database ("Log DB") as of the last transaction on Channel X at that time, which can be denoted "$\Sigma_j\ TX_x$," to refer to the set of all transactions logged on Channel X as of the $j^{th}$ transaction on Channel X. In some embodiments, Node C can then decrypt $\Sigma_j\ TX_x$ using Symmetric Key X that it received from either Node A and/or Node B, which Node C or any other non-member node of Channel X previously would not have been able to do. After decryption, in some embodiments, Node C can execute $\Sigma_j\ TX_x$ to determine the resulting state for Channel X and one or more nodes affected by such transactions. For example, in some embodiments, Node C can pass $\Sigma_j\ TX_x$ to a State Machine on Node C for execution at block 1426. After execution or replaying the set of transactions previously logged on Channel X, Node C can then have the same state as Node A and Node B for channel X as of the $j^{th}$ transaction on Channel X at block 1428.

One or more such processes described in connection with FIG. 14B can be repeated any number of times in order to add one or more additional members to Channel X. As such, in the illustrated example with Nodes A, B, and C, all three nodes, and other nodes on the distributed ledger, always maintained consistent logged data regardless of their membership status in Channel X. In particular, with respect to Channel X, all nodes on the distributed ledger would have always logged encrypted versions of transactions on Channel X on the distributed log or Log Database in some embodiments, thereby maintaining consistency of the distributed ledger. However, in some embodiments, only those member nodes with access to Symmetric Key X would be able to decrypt such logged Channel X transactions and execute them to determine the resulting state for Channel X. As such, the information of each transaction and the resulting state thereof can be selectively shared in a controlled manner with only those members with Symmetric Key X, while maintaining data/information consistency throughout the whole distributed log at all times.

Figure 15A:
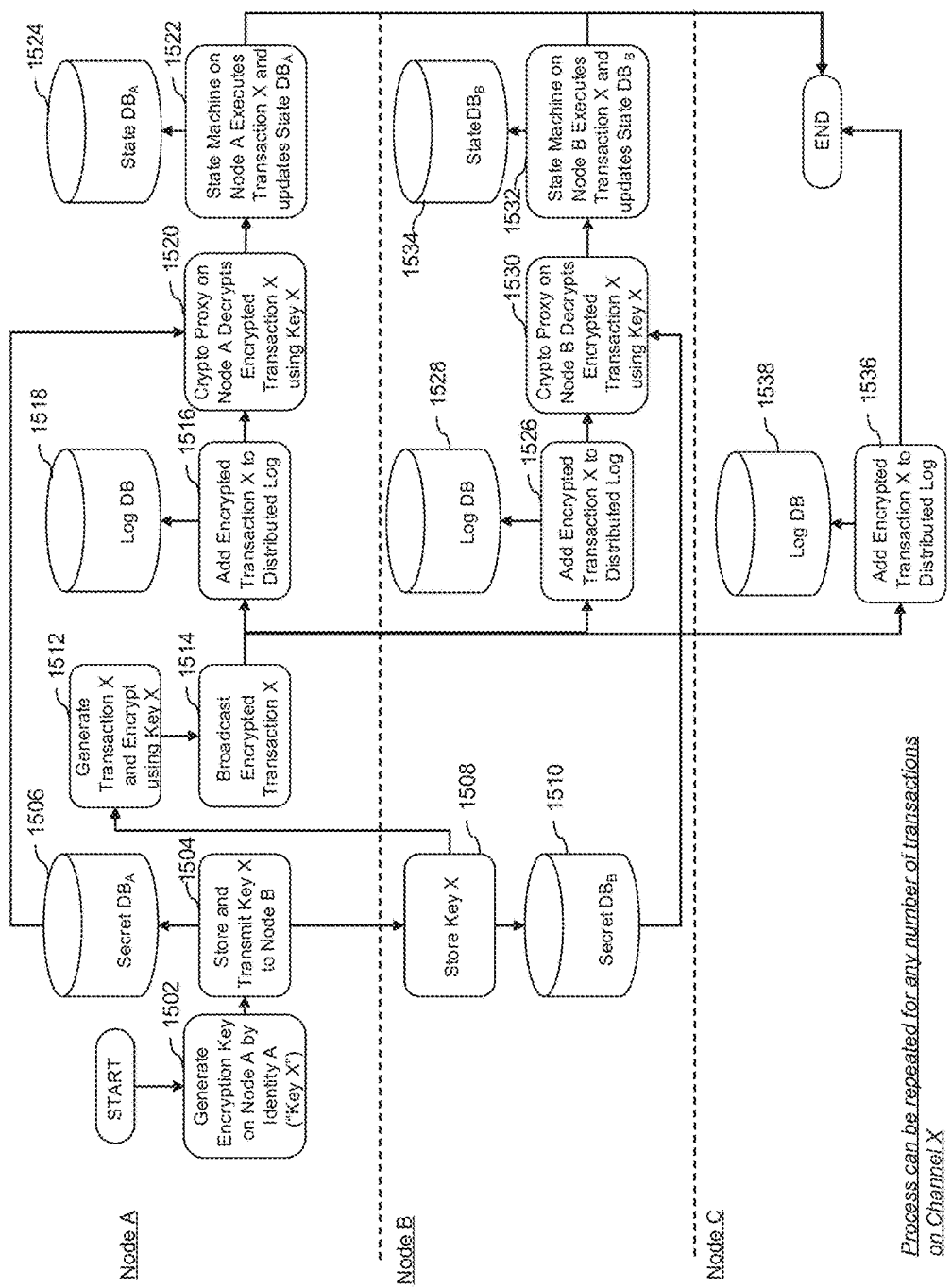
FIG. 15A is a flowchart illustrating an example embodiment(s) of private or controlled sharing of information on a distributed ledger through an independent secure channel.

FIG. 15A illustrates another example embodiment(s) of private or controlled sharing of information on a distributed ledger through an independent secure channel. However, certain processes and/or features described in connection with FIG. 15A can also be applicable to dependent or interdependent channels. In the example embodiment(s) illustrated in FIG. 15A, in some embodiments, three or more nodes can be on a distributed ledger, including Node A, Node B, and Node C. Nodes A, B, and/or C can be the same node and/or different nodes. In some embodiments, one or more identities can be present on each node. In some embodiments, every node on the distributed ledger can be configured to write or log the same information, whether encrypted or not, whenever any transaction occurs in order to maintain data/information consistency among all nodes of the distributed ledger.

However, at the same time, in some embodiments, Node A or a participant or identity on Node A may want to create or generate a private information sharing channel on the distributed ledger. In order to do so, a participant or Identity A in some embodiments, can generate an encryption key, "Key X," for a new channel, "Channel X," on Node A at block 1502. Key X can be a symmetric key or asymmetric key in some embodiments. In some embodiments, Key X can comprise a pair of encryption and decryption keys.

In some embodiments, at block 1504, Node A can store the generated Key X in a secure database that only Node A has access to, which can be denoted Secret DBA 1506. In some embodiments, Node A can also transmit Key X to another node on the distributed ledger with whom Identity A would like to share certain private information with. For example, in the illustrated example, Node A can transmit Key X to Node B at block 1504 in order to generate or create Channel X for privately sharing information between only Node A and Node B on a distributed ledger that otherwise is designed to share the same information among all nodes on the distributed ledger. In some embodiments, at block 1508, Node B can then store Key X in a secure database that only Node B has access to, which can be denoted Secret $DB_B$ 1510.

In some embodiments, Node A can generate Transaction X at block 1512, in which Transaction X reflects the information that Identity A or Node A wanted to share privately with Node B or one or more participants or identities on Node B but not with other nodes on the distributed ledger. In some embodiments, Node A can also encrypt Transaction X at block 1512 using Key X, as only Node A and Node B have access to Key X.

In some embodiments, Node A then broadcasts the encrypted version of Transaction X to all nodes on the distributed ledger at block 1514. In some embodiments, as Transaction X is encrypted with Key X, only those nodes or identities with access to Key X would be able to decrypt Key X to decrypt and determine the underlying information. In some embodiments, other nodes or identifies without access to Key X would still log the encrypted version of Transaction X, as would those nodes with Key X, onto the distributed ledger and thereby maintain data/information consistency; however, they would not be able to decrypt or determine the underlying information, thereby effectively controlling private sharing of information on a distributed ledger.

For example, in some embodiments, Node A can add or log Transaction X encrypted with Key X on the Log Database ("Log DB") 1518 at block 1516. As Node A has access to Key X, Node A can retrieve Key X from Secret DBA 12506 and decrypt the encrypted version of Transaction X using Key X at block 1520. In some embodiments, Node A can execute Transaction X after decryption using Key X and update the state machine or state machine database at Node A ("State DBA") 1224 at block 1522 based on the execution of decrypted Transaction X.

As with any other node on the distributed ledger network, in some embodiments, Node B can write Transaction X encrypted with Key X to the Log Database 1528 at block 1526. As Node B also has access to Key X, Node B can similarly retrieve Key X from Secret $DB_B$ 1510 and decrypt the encrypted version of Transaction X using Key X retrieved from its own database at block 1530. In some embodiments, Node B can execute Transaction X after decryption using Key X and update its state machine or state machine database at Node B ("State $DB_B$") 1534 at block 1532 based on the execution of decrypted Transaction X.

As with Node A, Node B, and any other node on the distributed ledger network, in some embodiments, Node C can also write Transaction X encrypted with Key X to the Log Database 1538 at block 1536. In other words, all nodes on the distributed ledger can be configured to write the same encrypted version of Transaction X to the distributed log. However, unlike Node A and Node B, Node C does not have access to Key X and therefore cannot decrypt the encrypted version of Transaction X or execute Transaction X. Rather, Transaction X encrypted with Key X is simply logged without execution. In some embodiments, this process or one or more processes illustrated in FIG. 15A can be repeated for any number of transactions on Channel X.

As discussed above, circumstances may change such that Node A and/or Node B may want to share information on Channel X with Node C. In other words, a situation may arise in which Node A and/or Node B, who were previously members of Channel X, may want to share all previous and/or all future information on Channel X with a new node that was previously not a member of Channel X, such as Node C. One way to share all previous information with Node C can be to simply send all decrypted versions of previous transactions to Node C; however, this can be both time and computer resource consuming as well as unsafe from a security standpoint, particularly given the fact that Node C is on the distributed ledger with the Channel X transaction(s) as Node A and Node B, albeit in encrypted form.

As such, rather than sending the full history, which Node C already has access to an encrypted version of, in some embodiments, the system can be configured to share Key X with new member node, Node C, and have Node C decrypt and replay previous transaction(s) on Channel X to obtain the same state information for Channel X as Nodes A and B. Further, in some embodiments, for any future transactions on Channel X, Node C can decrypt and execute them in the same manner as Nodes A and B using Key X. However, if Nodes A and B would rather share some new information only between Nodes A and B, but not Node C, then Node A and/or Node B can create a new channel, such as a new independent channel with a new encryption key to be shared only among Nodes A and B but not C.

Figure 15B:
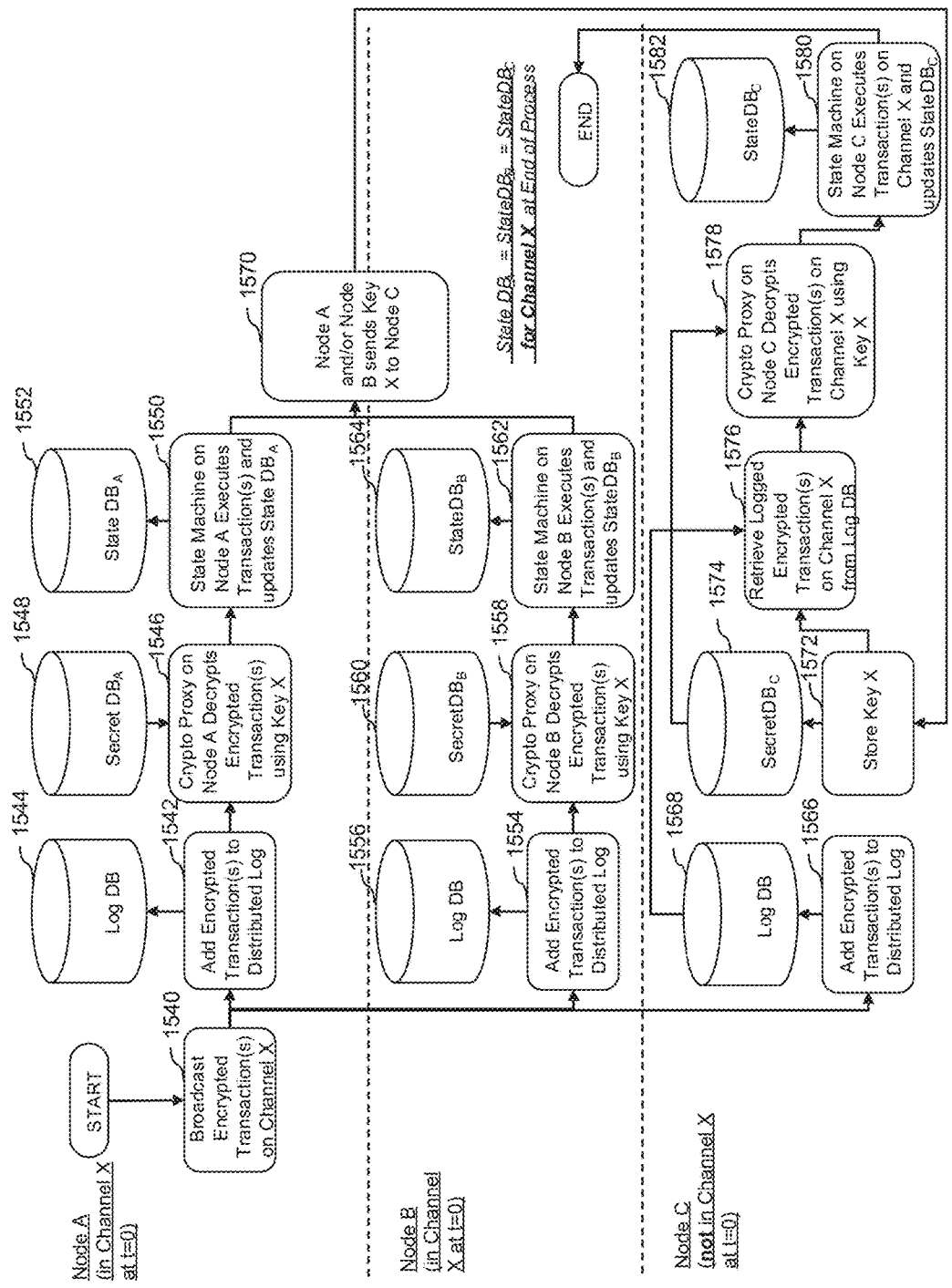
FIG. 15B is a flowchart illustrating an example embodiment(s) of adding a participant or node to an independent secure channel for private or controlled sharing of information on a distributed ledger.

FIG. 15B illustrates an example embodiment(s) of adding a member or node to an independent secure and/or private channel for private or controlled sharing of information on a distributed ledger. However, certain processes and/or features described in connection with FIG. 15B can also be applicable to dependent or interdependent channels. In the example illustrated in FIG. 15B, in some embodiments, Node A, Node B, and Node C can all be nodes on the same distributed ledger network or system. Nodes A, B, and/or C can be the same node and/or different nodes. In some embodiments, one or more identities can be present on each node. However, in some embodiments, initially or at time=0, only Nodes A and B may be members of a particular private information sharing channel, Channel X. Node C may not be on Channel X at least initially at t=0.

In some embodiments, at block 1540, Node A can generate and/or broadcast an encrypted version of a transaction(s) on Channel X to all nodes on the distributed ledger network. In some embodiments, the transaction(s) can be encrypted with an encryption key, Key X, which can be shared only among members of Channel X, which may include only Nodes A and B at t=0. Similar to the process described above in connection with FIG. 15A, in some embodiments, all nodes on the distributed ledger, including Nodes A, B, and C, can write or log the encrypted version of the transaction(s) to the distributed log.

In particular, in some embodiments, Node A can write/store the encrypted transaction(s) to the Log Database 1544 at block 1542. Since Node A is on Channel X and has access to Key X, Node A or a Crypto Proxy on Node A, in some embodiments, can decrypt the encrypted transaction(s) using Key X at block 1546. In some embodiments, Node A or the Crypto Proxy on Node A can retrieve Key X from a secure database on Node A 1548, which is denoted "Secret DBA." After decryption at block 1550, in some embodiments, Node A or a State Machine on Node A can execute the transaction(s) to obtain updated state information for Channel X and update a State Database on Node A, State DBA 1552, accordingly.

Similarly, in some embodiments, Node B can write/store the encrypted transaction(s) to its Log Database 1556 at block 1554. Since Node B is also on Channel X and has access to Key X, Node B or a Crypto Proxy on Node B, in some embodiments, can decrypt the encrypted transaction(s) using Key X at block 1558. In some embodiments, Node B or the Crypto Proxy on Node B can retrieve Key X from a secure database on Node B 1560, which can be denoted "Secret $DB_B$." After decryption at block 1562, in some embodiments, Node B or a State Machine on Node B can execute the transaction(s) to obtain updated state information for Channel X and update a State Database on Node B, State $DB_B$ 1564, accordingly. At this point, in some embodiments, the State Database on Node A 1552 and the State Database on Node B 1564 can comprise the same state information for Channel X as both Nodes A and B were able to decrypt and execute the same transaction(s) on Channel X.

In some embodiments, as with any other node on the distributed ledger network, Node C can also write/store the encrypted transaction(s) to its Log Database 1568 at block 1566. In contrast to Nodes A and B, however, Node C in the illustrated example is not on Channel X at this point and does not have access to Key X. As such, in the illustrated example, Node C would not be able to decrypt or execute the transaction(s) at this point, but rather ignores it.

However, at some point in time after t=0, Node A and/or Node B may decide to include Node C in Channel X to share the previous transaction(s) on Channel X. In order to do so, in some embodiments, Node A and/or Node B can send Key X to Node C at block 1570. After receiving Key X, in some embodiments, Node C can store Key X at block 1572 in a secure database on Node C 1574, which can be denoted "Secret $DB_C$."

In some embodiments, now that Node C has access to Key X, Node C can decrypt and replay the transaction(s) on Channel X and become proxy to the same information for Channel X as Nodes A and B. In particular, in some embodiments, Node C can retrieve the logged transaction(s) on Channel X encrypted with Key X from the Log Database 1568 at block 1576.

In some embodiments, Node C or the Crypto Proxy on Node C can retrieve Key X from Secret $DB_C$ 1574 and decrypt the transaction(s) on Channel X using Key X at block 1578. After decryption at block 1580, in some embodiments, Node C or a State Machine on Node C can execute/replay the transaction(s) to obtain updated state information for Channel X and update a State Database on Node C, State $DB_B$ 1582, accordingly. At this point, in some embodiments, the State Database on Node A 1552, the State Database on Node B 1564, and the State Database on Node C 1582 can comprise the same state information for Channel X, even though Node C became a member of Channel X at a later point in time compared to Nodes A and B.

Example of Controlled Information Sharing

Figure 16B:
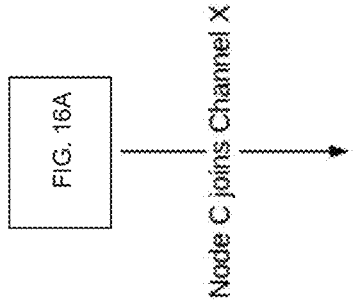
FIG. 16B is a schematic diagram illustrating an example embodiment(s) of controlled sharing of information on a distributed ledger.

FIGS. 16A-6B illustrate an example embodiment(s) of controlled sharing of information on a distributed ledger. Certain processes and/or features described in connection with FIGS. 16A-16B can be applicable to any and all embodiments described herein, irrespective of whether an independent, interdependent/dependent, or public channel is being utilized.

In the example embodiment illustrated in FIGS. 16A-16B, a distributed ledger can include Nodes A, B, and C. Nodes A, B, and/or C can be the same node and/or different nodes. In some embodiments, one or more identities can be present on each node. On this distributed ledger system or network, three can be at least two channels, Channel X and Channel Y. Further, at least initially, Node A and Node B can be in Channel X but not Channel Y. In addition, at least initially, Node C can be in Channel Y but not Channel X. As such, in some embodiments, a channel can be considered a set of identities and/or nodes. Furthermore, each of the nodes, Nodes A, B, and C, can comprise a Distributed Log and a State Database as described above. Each of Channel X and Y can be either an independent channel or an interdependent channel.

In the illustrated example embodiment, the Distributed Log on all of the nodes can comprise the same information, thereby maintaining data consistency. For example, each of the Distributed Logs on Nodes A, B, and C can comprise a set of all encrypted transactions broadcasted on the distributed ledger on every channel ("$\Sigma TX$"). In particular, each of the Distributed Logs on Nodes A, B, and C can comprise a set of encrypted transactions on Channel X ("$\Sigma TX_x$") and a set of encrypted transactions on Channel Y ("$\Sigma TX_y$"), as well as encrypted transactions on any other channel. $\Sigma TX_x$ and $\Sigma TX_y$ can be subsets of $\Sigma TX$. In the illustrated example, these transactions can include a First Encrypted Transaction ($TX_1$), a Second Encrypted Transaction ($TX_2$), a Third Encrypted Transaction ($TX_3$), a Fourth Encrypted Transaction ($TX_4$), a Fifth Encrypted Transaction ($TX_5$), a Sixth Encrypted Transaction ($TX_6$), or the like, in which the First, Fourth, and Fifth Encrypted Transactions are on Channel X, and the Second, Third, and Sixth Encrypted Transactions are on Channel Y.

In some embodiments, in contrast to the Distributed Log, the information stored on the State Databases on the nodes can be different or the same, depending on which channel each node is a member of. For example, the state information for Channel X stored on the State Databases of Nodes A and B can the same as both of these nodes are in Channel X. However, the State Database of Node C may not comprise any state information or updated state information for Channel X, as Node C is not a member of Channel X and cannot decrypt or execute encrypted transactions on Channel X. Further, the State Database of Node C may comprise state information for Channel Y. However, the State Databases of Nodes A or B may not comprise any state information or updated state information for Channel Y, as Nodes A and B are not members of Channel Y and cannot decrypt or execute encrypted transactions on Channel Y.

In particular, in the illustrated example embodiment, the State Databases on both Nodes A and B can comprise updated state information for Channel X as of the $j^{th}$ transaction or $State_x^j$. This can comprise state information arising from executing the decrypted versions of all transactions on Channel X until the $j^{th}$ transaction, including $TX_1$, $TX_4$, and $TX_5$, or in other words, Execute($\Sigma_j TX_x$). In contrast, the State Database on Node C may not comprise any or updated state information for Channel X, as Node C may not be able to decrypt or execute any of the encrypted transactions for Channel X that were broadcasted. In other words, although the encrypted transactions for Channel X are stored in the Distributed Log on Node C, thereby maintaining consistency of the data, Node C may not have access to the underlying transaction information and/or state information for Channel X.

Similarly, in the illustrated example embodiment, the State Database of Node C can comprise updated state information for Channel Y as of the $j^{th}$ transaction or $State_y^j$. This can comprise state information arising from executing the decrypted versions of all transactions on Channel Y until the $j^{th}$ transaction, including $TX_2$, $TX_3$, and $TX_6$, or in other words, Execute($\Sigma_j TX_y$). In contrast, the State Databases on Nodes A or B may not comprise any or updated state information for Channel Y, as Nodes A and B may not be able to decrypt or execute any of the encrypted transactions for Channel Y that were broadcasted. In other words, although the encrypted transactions for Channel Y are stored in the Distributed Log on both Nodes A and B identical to Node C, thereby maintaining consistency of the data, Nodes A and B may not have access to the underlying transaction information and/or state information for Channel Y.

In some embodiments, Node C may join Channel X. For example, either Node A and/or Node B may provide the encryption key for Channel X to Node C. In some embodiments, the encryption key for Channel X can be sent directly to Node C, for example through a side channel. In some embodiments, the encryption key for Channel X can be sent to Node C through the network, for example by encrypting the Channel X encryption key with a public key of a participant registered on Node C and then broadcasting the Channel X encryption key encrypted with the public key on the distributed ledger as a transaction. As such, in some embodiments, every node on the distributed ledger can write/store this transaction, but may be not be able to decrypt the transaction without the participant's corresponding private key and therefore not be able to obtain the Channel X encryption key. In any event, in some embodiments, Nodes A, B, and C may all be in Channel X, and only Node C may be in Channel Y as illustrated in the example embodiment of FIG. 13B. One or more processes or states depicted in FIG. 16B may follow one or more processes or states depicted in FIG. 16A.

In some embodiments, as described above, the Distributed Log of each of Nodes A, B, and C can comprise the same encrypted version of every transaction broadcasted on the distributed ledger, whether it be for Channel X or Y or another channel. The addition of a new member node to Channel X may not affect the Distributed Log in any way in some embodiments.

However, the State Database on Node C may now include updated state information for Channel X in addition to updated state information for Channel Y. More specifically, in some embodiments, now that Node C is a member of Channel X, Node C may now have access to the encryption key for Channel X and thus be able to decrypt and execute encrypted transactions on Channel X that Node C previously could not. In other words, Node C may now decrypt encrypted transactions on Channel X, including $TX_1$, $TX_4$, and $TX_5$, and execute or replay the same to obtain updated state information for Channel X, which can be stored in the State Database of Node C. As such, in some embodiments, the system allows for adding new parties to a transaction, such as a financial or other transaction, and allows the newly added party to read the history of transaction(s) and obtain the current state by having evidence of all of the previous operations on a particular channel/transaction. In other words, regardless of when a node joins a channel, every node on a particular channel can share the same state information as well as all of the previous transaction/operation history.

In addition, the State Database of Node C can continue to have stored thereon updated state information for Channel Y. However, the State Databases of Nodes A and B may continue not to comprise any or updated state information for Channel Y.

Dependent/Interdependent Channel

As described above, in some embodiments, the system can be configured to utilize one or more dependent or interdependent channels. Dependent or interdependent channels can be utilized in addition to or in lieu of independent channels. In some embodiments, a dependent or interdependent channel can refer to a channel in which a transaction thereon relies on one or more transactions or data on another channel.

Figure 17:
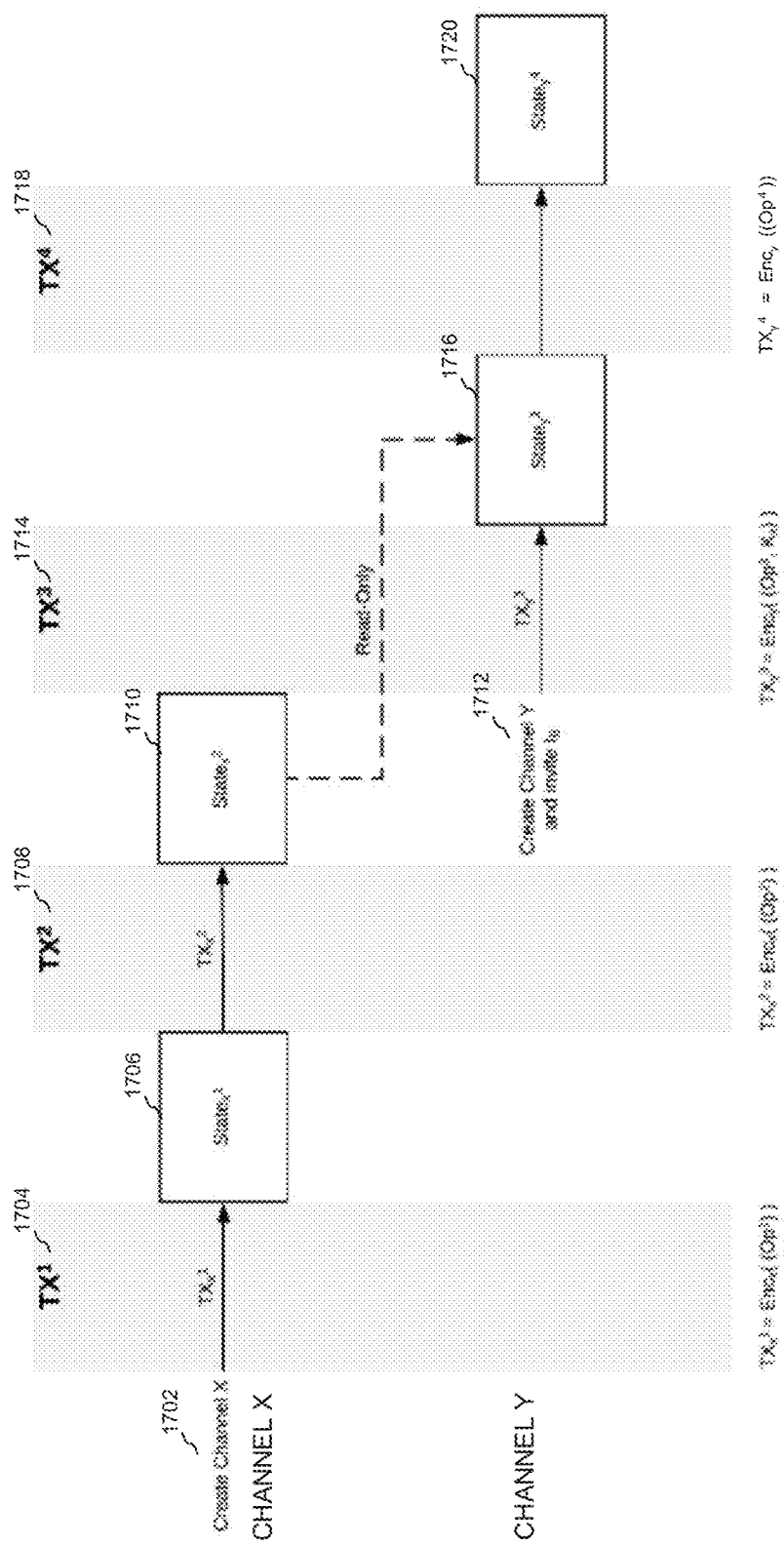
FIG. 17 is a schematic diagram illustrating an example embodiment(s) of a dependent or interdependent secure channel on a distributed ledger.

FIG. 17 is a schematic diagram illustrating an example embodiment(s) of a dependent or interdependent secure and/or private channel on a distributed ledger. In the illustrated example embodiment, the system can comprise Channel X. In particular, in some embodiments, Channel X can be created at block 1702. For example, an Identity A on Node A can create a company in Channel X, information of which can be shared with member nodes on Channel X, who have access to an encryption key for Channel X ("$K_x$").

In some embodiments, a First Transaction on Channel X ("$TX_x^1$") can be generated and broadcasted on the distributed ledger at block 1704. The First Transaction can comprise information relating to the creation of the company for example. In some embodiments, the First Transaction can comprise a First Operation in encrypted form, which can be denoted $Enc_x((Op^1))$. In some embodiments, member nodes on Channel X can use the Channel X encryption key "$K_x$" to decrypt the First Transaction and execute the same to obtain state information for Channel X after executing the First Transaction, which can be denoted $State_x^1$, at block

1706. For example, if the First Transaction comprised information relating to the creation of the company, member nodes on Channel X, but no non-member nodes, can be aware that the company was created by decrypting and executing the First Transaction.

In some embodiments, a Second Transaction on Channel X ("$TX_x^2$") can be generated and broadcasted on the distributed ledger at block 1708. For example, the Second Transaction can include company information updated by Identity A on Channel X. In some embodiments, the Second Transaction can comprise a Second Operation in encrypted form, which can be denoted $Enc_x((Op^2))$. In some embodiments, nodes on Channel X can use the Channel X encryption key "$K_x$" to decrypt the Second Transaction and execute the same to obtain state information for Channel X after the Second Transaction, which can be denoted $State_x^2$, at block 1710. For example, if the Second Transaction comprised updated company information added by Identity A, member nodes on Channel X, but no non-member nodes, can be made aware of the updated company information by decrypting and executing the Second Transaction.

In some embodiments, it may be advantageous to share information on Channel X with a node or identity that was previously not a member. One way to do this may be to add the new node to Channel X as described in some embodiments herein. However, in certain situations, it may be advantageous to give access to the information on Channel X to the new node or identity without adding the new node to Channel X itself. More specifically, it may be advantageous to share information on Channel X with a new node, but not allow members of Channel X to have access to any subsequent transactions with the new node building onto information on Channel X. In addition, it may be advantageous to allow the new node to view information on Channel X but not generate new transactions on Channel X. As an illustrative example, for managing share ownership in a company, one may want shareholder workflows to be dependent on the information about the company as a whole (for example, total shares outstanding), but it may advantageous to keep such information about particular shareowners' positions private. In order to do so, in some embodiments, a new dependent or interdependent channel can be created for actions of a particular shareholder, wherein this new channel can be dependent on an existing channel for sharing information about the company, such as total shares outstanding. Another example can be a situation in which an asset or other state information on a first channel must be verified in order to process a subsequent transaction on a second channel; the second channel can be dependent on the first channel. As such, in some embodiments, the system can provide multiparty workflows as well as transfer of assets by utilizing one or more dependent and/or independent secure channels for privately sharing information on a distributed ledger network. In particular, by utilizing one or more dependent or interdependent channels, a hierarchy of knowledge can be generated and managed, wherein members of different channels can be privy to different levels of information, while all on the same distributed ledger system and maintaining data consistency across the plurality of nodes on the distributed ledger.

Referring to the example embodiment(s) illustrated in FIG. 17, a new interdependent or dependent channel, Channel Y, can be created at block 1712. For example, Identity A, who is a member of Channel X, may want to propose sale of company shares to Identity B. In such circumstances, Identity B may want access to company information on Channel X prior to deciding whether to purchase Identity A's shares. However, it may not make sense to add Identity B to Channel X, because Identity B is not a shareholder and therefore should not have the ability to write or create transactions on Channel X. In addition, Identity A may not want all of the members of Channel X (e.g., other shareholders) to be aware that Identity A is proposing selling shares to Identity B. For any one or more of these or other reasons, in some embodiments, Identity A may create a dependent or interdependent channel, Channel Y, and invite Identity B ("$I_B$") to Channel Y at block 1712.

In some embodiments, Identity A can generate a Third Transaction on Channel Y ("$TX_y^3$"), for example to propose sale of company shares to Identity B at block 1714. Identity A and Identity B can be operating on the same node or on different nodes. In some embodiments, the Third Transaction can be encrypted with an encryption key specific to Channel Y, which is accessible only to members of Channel Y, including Identity A and Identity B. In some embodiments, the Third Transaction can comprise a set of inputs, which can include a Third Operation and the encryption key for Channel X. In other words, the Third Transaction can comprise the Third Operation and encryption key for Channel X, which can both be encrypted with an encryption key for Channel Y, which can be denoted $Enc_y((Op^3, K_x))$.

In some embodiments, Identity B can then use the encryption key for Channel Y ("$K_y$") to decrypt the Third Transaction, which comprises the Third Operation and the encryption key for Channel X. Identity B can then use the encryption key for Channel X to decrypt transactions on Channel X, which are available in encrypted form on the Distributed Log, and execute the same to determine the state information for Channel X. In addition, Identity B can execute the Third Operation after decrypting the Third Transaction using the encryption key for Channel Y. In some embodiments, the Third Operation can be dependent on or require access to the information or state information for Channel X. As such, in some embodiments, after using $K_x$ to decrypt and execute transactions on Channel X to obtain state information for Channel X and using the same to execute the Third Operation, which was obtained by decrypting the Third Transaction with $K_y$, Identity B can determine the state information for Channel Y after the Third Transaction, which can be denoted "$State_y^3$" at block 1716. In some embodiments, Identity B can only have read-only access to information on Channel X by using $K_x$ to decrypt transactions on Channel X; however, Identity B may not have write access to Channel X as Identity B is not on Channel X.

In some embodiments, after executing the Third Operation in Channel Y based at least in part on information from Channel X, Identity B can then generate a Fourth Transaction on Channel Y ("$TX_y^4$") at block 1718. For example, Identity B may review the company information in Channel X and accept the trade. The Fourth Transaction can be encrypted with the encryption key for Channel Y, as only Identity A and Identity B would need access to the underlying information or Operation of the Fourth Transaction. In other words, the Fourth Transaction $TX_y^4$ can be denoted as $Enc_y((Op^4))$. In some embodiments, the members of Channel Y, including Identity A and Identity B, can decrypt the Fourth Transaction using the encryption key for Channel Y and execute the Fourth Operation to obtain the resulting state information for Channel Y or "$State_y^4$" 1720.

Key Rotation/Change

In some embodiments, the system can be configured to allow an encryption key for a particular channel, whether independent or dependent, to be changed or rotated. Key rotation or change can be advantageous in a number of situations. For example, by changing or rotating the encryption key for a channel, security can be enhanced. As such, in some embodiments, the system can be configured to periodically rotate or change the encryption key for a particular channel.

In addition, by rotating or changing an encryption key to a channel, it can be possible to kick out a member node or identity from a particular channel, thereby denying access to future transactions on the channel. For example, in some embodiments, a member node or identity of a channel can rotate or change the channel encryption key and share the new channel encryption key with every member node or identity of the channel except for Node or Identity X. Then, in some embodiments, Node X or Identity X, the ex-member of that channel, will no longer be able to decryption and execute any future transactions on the channel; however, Node X or Identity X may still be able to access old transactions and state information that occurred while Node X or Identity X was a member on the channel.

In some embodiments, the systems disclosed herein can be configured to implement key rotation using a FreezeChannel transaction and/or a RotateKey transaction. In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel can be a link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This can allow the recovery of all past channel keys—when an identity receives the current channel key, it can replay and/or execute all past transactions posted in the channel by retrieving all past channel keys that are stored (in encrypted form) in the RotateKey transactions.

Example Embodiments of Private Data Sharing on a DLT Platform

As described above, in some embodiments, the systems, methods, and devices described herein are configured to allow trustless sharing of private data on a blockchain or distributed ledger, and more particularly, can include frameworks and/or solutions to ensure privacy and consistency on a distributed ledger. In some embodiments, the systems, methods, and devices described herein allow selective sharing of data across a plurality of nodes on a distributed ledger or blockchain, while at the same time maintaining consistency of the data.

In some embodiments, the systems, methods, and devices described herein comprise obtaining at a first node in a plurality of nodes a first key, for example via a key exchange protocol from a second node in the plurality of nodes. In some embodiments, the systems, methods, and devices described herein comprise decrypting at the first node, at least one transaction encrypted by the first key. In some embodiments, the at least one transaction is executed in order starting from latest transaction to earliest transaction. In some embodiments, the systems, methods, and devices described herein comprise executing at the first node, the at least one transaction. In some embodiments, executing the at least one transaction includes generating a directed acyclic graph (DAG) of the at least one transaction. In some embodiments, the systems, methods, and devices described herein comprise processing at the first node, the at least one transaction based on the generated DAG and processing at least one dependent transaction of the at least one transaction. In some embodiments, the at least one dependent transaction is processed by connecting read edges and write edges of the at least one transaction based on the generated DAG. In some embodiments, the systems, methods, and devices described herein comprise storing at the first node, a local copy of the decrypted and processed DAG.

In some embodiments, the systems, devices, and methods described herein are configured to selectively eliminate sharing data with a first node in a plurality of nodes in a blockchain in order to protect the privacy of the data is provided. In some embodiments, the systems, methods, and devices comprise at a second node in the plurality of nodes: transmitting to each node in the plurality of nodes a FREEZE transaction using a first key, generating a second key, and/or generating a rotate transaction. In some embodiments, the rotate transaction includes the first key and is encrypted with the second key. In some embodiments, the systems, methods, and devices comprise transmitting the second key to each node in the plurality of nodes except the first node.

In some embodiments, a distributed ledger, such as a blockchain, can be a network of nodes operated by different, potentially hostile, owners that maintain some shared state. In certain distributed ledgers, all nodes' transactions are completely public. However, in some situations, concealing certain transactions or elements thereof, such as for privacy reasons, while simultaneously maintaining verifiable accuracy and consistent view across all the nodes can be important.

Generally speaking, as a non-limiting example, the network of nodes that form a distributed ledger, such as a blockchain, can maintain some shared state. The ledger state and/or shared state can be often generated by a sequentially consistent log of transactions, which can be processed independently and deterministically by all nodes within the network to come to an agreement on the current state of a system. In other words, transactions can be processed sequentially in an independent manner by each node within the network. Consequently, each node can determine the current state of one or more data objects in the distributed ledger. As a non-limiting example, since the transactions are deterministic, every node must arrive at the same result. For instance, consider two individual accounts, account A having $100 and account B having $100. A sequence of transactions to move $10 from account A to account B could include a first transaction verifying if account A has enough money and debiting $10 and then a second transaction crediting $10 into account B. Each of these transactions can be processed independently and deterministically by all nodes within the network. In this example, current shared ledger state could represent account A with $90 and account B with $110.

However, in order to prevent the "double-spend" problem and to enable consistency across all nodes, every transaction can be made public across all the nodes in implementations of a blockchain such as Bitcoin for example. To give an illustrative example, when node A sends an asset to node B, every node on the network can see that node A's account has been debited. If these transactions were concealed, node A could send the same asset to node C because only node A and node B would be aware of the previous transaction. In other words, every cash transfer, credit card charge, and healthcare transaction may have to be made available to every node on the network in order to facilitate verifiable accurate and consistent view of the distributed ledger. Hence, such implementations of distributed ledgers and blockchains may not be applicable to many real-world technologies without resolving the contradiction of individual privacy and a consistent, synchronized view of the current ledger state.

In view of the above, in some embodiments, the systems, devices, and methods described herein provide frameworks and solutions to ensure both privacy and consistency on a distributed ledger. In some embodiments, the state changes of data objects in the distributed ledger can be tracked in a dependency graph. Then, in some embodiments, when data is shared amongst the nodes in the distributed ledger, the data that is shared across a subset of nodes in a network can be selectively disclosed. In some instances, the data that is shared across the subset of nodes can include additional verifiable information to allow for validation of the data across the subset of nodes. In this manner, in some embodiments, a group of nodes involved in a sequence of transactions can have a consistent view of a subset of the global state, and this subset can remain private from other nodes in the network.

Transactions and Data Dependencies

In some embodiments, transactions can be arranged in a dependency graph, where the edges represent the inputs and outputs of a transaction's function. In particular, in some embodiments, each transaction can include (1) a set of input states, (2) a function that computes over the input states, and (3) a special input for data verification. As an illustrative example, consider a transaction in a distributed ledger to credit $10 into account A. The set of input states for this transaction can represent the balance in account A at the time the transaction is executed. The function that computes over the input states can be a function to credit $10 into account A. In another example, consider a scenario in which a doctor requests a scan for a patient. An insurance company can post a transaction on a distributed ledger with a set of input states that represent the doctor's request and the patient's insurance record and the function that computes over the input states can be a function to approve the doctor's request.

In some embodiments, a special input, called the "proof," can provide a mechanism for a node to independently verify that the input states are valid. In some embodiments, whether the states represent integers or arbitrary collections of data, different types of proofs can be used to validate the states. Some non-limiting examples of concrete instantiations of such proof mechanisms include partially homomorphic encryption, zero knowledge proofs, verifiable computation, re-running all past transactions locally, which can require cryptographic keys that are used to protect past transactions, and/or the like. The end result of "proof" can be that the subset of the nodes in the network that include the transaction including the "proof" will agree on the latest value within a state of a data object within the distributed ledger and/or the ledger state.

As discussed above, in some embodiments, the transactions can be arranged in a dependency graph. By sharing this graph amongst a group of nodes within the distributed ledger, each node can independently execute the transactions to verify that the outputs are correct and consistent amongst all the nodes within that group.

Example Graph Structure

In some embodiments, the execution of a sequential log of transactions can generate a directed acyclic graph (DAG) with labeled edges. As referred to herein, in some embodiments, the graph G=(V, E) is a set V of vertices and a set E of labeled edges. In some embodiments, a transaction creates a new vertex in the graph. Each vertex can represent the state of a data item at a point in the transaction history. The structure of the data can be arbitrary, and the vertex may represent the state of a single integer or a complex data structure (e.g. to represent a corporate bond, healthcare record, car title). All edges can be labeled either Read or Write, L={W, R}. A Read edge (x, y, R) can imply that vertex y can read from vertex x. A Write edge (x, y, W) can imply that 1) vertex y can read from vertex x and 2) vertex y is a new version of vertex x. In other words, the Write edge can update the data contained within vertex x.

In some embodiments, when a transaction is posted on the distributed ledger, each node with access to the transaction (e.g., each node with which the transaction is shared) generates a vertex. As discussed above, in some embodiments, every node processes the transaction individually and independently. In some embodiments, each node can execute the transaction at different times. In some embodiments, when a node executes the transaction, Read and Write edges can be created for the transaction. In this manner, in some embodiments, by executing a sequential log of transactions each node can generates a DAG.

In some embodiments, every vertex can have exactly 0 or 1 Write edges, and 0 or more Read edges. In some embodiments, the path of the Write edges can represent the evolution of the state of a data object. For example, the path of Write edges can represent the evolution of a corporate bond, health record, car title, and/or the like. In some embodiments, the write path can be represented as:

$$\forall v \in V, p = \{v_1, v_2, \ldots, v_n\} \text{ where } \{(v_1, v_2, W), (v_2, v_3, W), \ldots, (v_{n-1}, v_n, W)\} \subseteq E$$

In some embodiments, the last vertex vn in this path holds the current state of a data item, denoted curr(p). This vertex can have an outdegree of 0 Write edges, though there may, in some instances, be many outgoing Read edges. In some embodiments, all or some of the write paths are disjoint sets, forming a linear forest. In some embodiments, since there is a unique write path for every state or data object, the set of all write paths p can be denoted P, where $\forall p_i, p_j \in P$, $p_i \cap p_j = \emptyset$.

As an illustrative example, consider a distributed ledger for corporate bonds. The evolution of each corporate bond can be represented by at least one unique write path. The history of a corporate bond can be tracked by tracing the vertexes in the write path for that bond. That is, each vertex in the write path for a corporate bond can represent a state of the corporate bond. The last vertex in the write path for the corporate bond can represent the current state of the corporate bond.

In some embodiments, a transaction inserts a new vertex in the graph. In some embodiments, a special type of transaction (e.g., "new" transaction) can create a new vertex with no edges. It can initialize an empty state and create a write path of one vertex. As an illustrative example, consider adding a new account, say account C, to an existing distributed ledger. The addition of new account C can be a special type of transaction that creates a vertex for account C with an empty state. The changes to the balance of account C (i.e., crediting and/or debiting account C) can create a write path.

In some embodiments, a regular transaction T names a path $p^w$ to create exactly one Write edge, and a set of 0 or more paths $p^r$ to create Read edges. It can also contain a function F that can read from the curr(p) vertex from all the listed paths (i.e., all listed write paths and read paths), and produces a new vertex to append to $p^w$.

$$T=(p^w,\{p_i^r\},F(\text{curr}(p^w),\text{curr}(\{p_i^r\})))$$

In some embodiments, when the transaction executes, it can update the graph with a new vertex v and a set of edges:

$$G'=(V\cup\{v\},E\cup\{(w,v,W),(ri,v,R)\}) \text{ where } w,ri\in V$$

Figure 18:
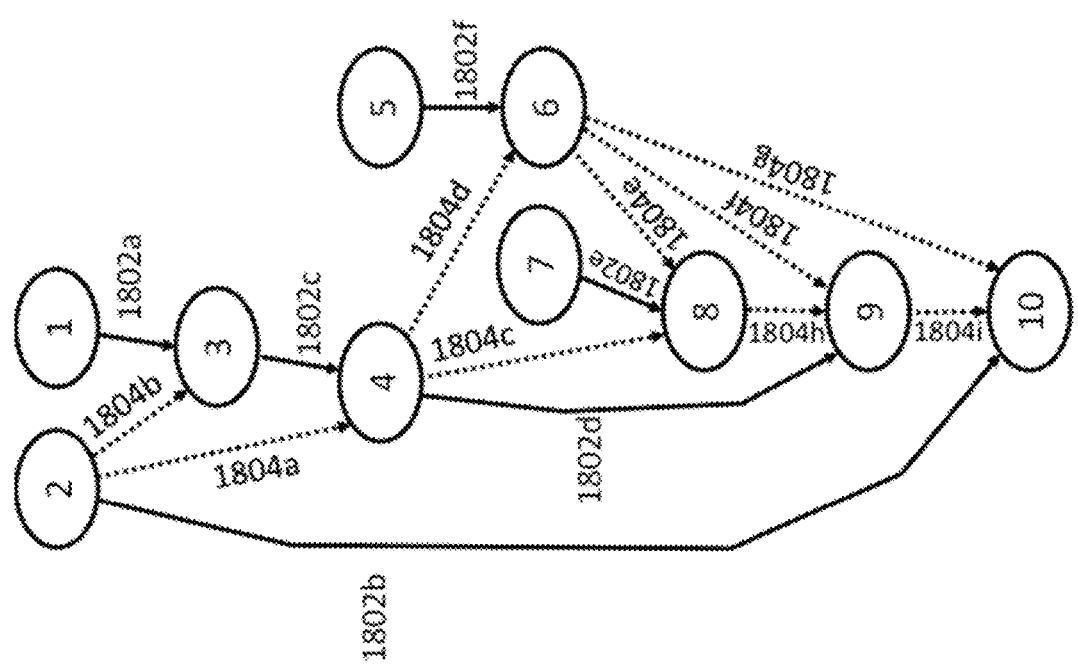
FIG. 18 is a schematic diagram illustrating an example transaction graph with write and read edges.

FIG. 18 illustrates a sample transaction graph with Write and Read edges. In the illustrated example of FIG. 18, the solid lines (e.g., 1802a-1802f) represent Write edges (collectively, Write edge 1802), the dotted lines (e.g., 1804a-1804i) are Read edges (collectively, Read edge 1804). In the illustrated example of FIG. 18, the transactions are numbered in the order they are processed. In some embodiments, the DAG is constructed one vertex at a time. For example, transaction 8 updates 7 and reads from 4 and 6 to create vertex 8, at which point the graph consists of vertices {1 . . . 8}. After transaction 10 completes, the write paths are {2, 10}, {1,3,4,9}, {7,8} and {5,6}. The latest value of any vertex can be determined by looking at the data within the last vertex in each path. In this instance, the set of last vertexes in each write path after transaction 10 completes are {10, 9, 8, 6}. Any new transaction can only read and write from vertices in this set. In fact, one can examine the value of a vertex at any point in time. For example, after transaction 5 inserts vertex 5, the ledger state can be found in {5, 4, 2}. In other words, after transaction 5 inserts vertex 5, the write paths are {2}, {1,3,4}, and {5} and the last vertex in each of the write paths hold the current state of the system, in this instance, {5, 4, 2}. In the illustrated example, the graph maintains the full history of all state changes in the system. It is a persistent data structure that captures every state change at every point in time.

Figure 19:
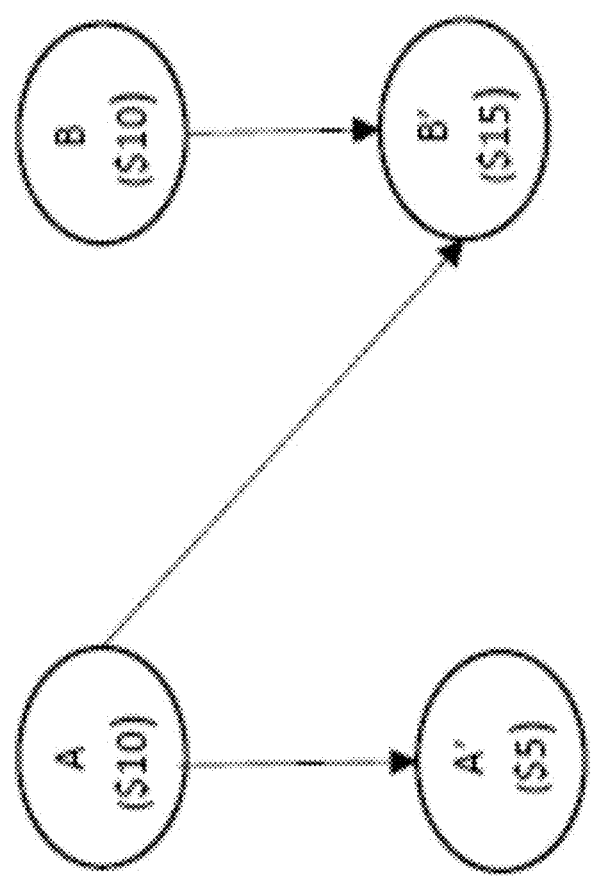
FIG. 19 is a schematic diagram illustrating an example exchange between two nodes using an example directed acyclic graph.

FIG. 19 illustrates an example exchange between two nodes, in particular an exchange of money between two nodes A and B, using an example directed acyclic graph. For purposes of illustration, assume that a graph is initialized with two vertices A and B, each with $10 as the state. In some embodiments, moving $5 from A to B can require two transactions. In particular, transaction #1 can read from A to verify it has enough money, then update B to create B' with $15. In other words, transaction #1 can insert vertex B' in the graph. The execution of transaction #1 inserts a Read edge from A to B' and a Write edge from B to B'. Transaction #2 can update A to A' with $5 (i.e., a new vertex A' is inserted with a Write edge from A to A'). In some embodiments, these transactions must be run together atomically to ensure no node ever sees a state where A has $10 and B' has $15. In some embodiments, all transactions after this will only see the vertices A' and B' containing the updated account balances as their state.

Additional Example Embodiments of Private Data Sharing on a DLT Platform

In some embodiments, a network can include a subset of independent nodes that wish to hide data from all other nodes (not within the subset) within the network. The subset of independent nodes can be configured to share the data with only member nodes within the subset. For example, four nodes can collaborate on a deal and be configured to hide the details from all other nodes in the network. Transactions can be selectively shared among the four nodes in various ways: sent directly to only the group members, pulled on demand from group members, and/or encrypted and broadcast on a decentralized ledger.

In some embodiments, the first technique for sharing transactions is to only share it with members of a group. The transactions can be annotated with metadata that lists which nodes are allowed to receive it. The second technique can be to only send a hash of the transaction plus some metadata to all nodes. Each node can decide whether to request the data from the node which initiated the transaction. This node can decide whether to send the data or not. Finally, in some embodiments, the data can be encrypted and sent to all members, which is described in more detail below.

Example Embodiments of Selective Sharing with Encryption on a DLT Platform

In some embodiments, every write path is encrypted by a different symmetric key or is unencrypted (a null key). A write path encrypted with a null key can be accessed, processed, and decrypted by every node within the network. In some embodiments, the symmetric key and/or unencrypted key can be generated when a node issues a special type of transaction to create a new vertex with no edges. In some embodiments, every transaction can be encrypted by the same symmetric key used for the write state within the transaction. In some embodiments, to nodes without the correct keys, all the transactions broadcast in the network are encrypted and unreadable. Therefore, in some embodiments, each node sees a subgraph containing only those vertices and edges for which they have the appropriate symmetric encryption keys. In some embodiments, the union of all these subgraphs can be the complete graph representing the global state of the network.

Figure 20:
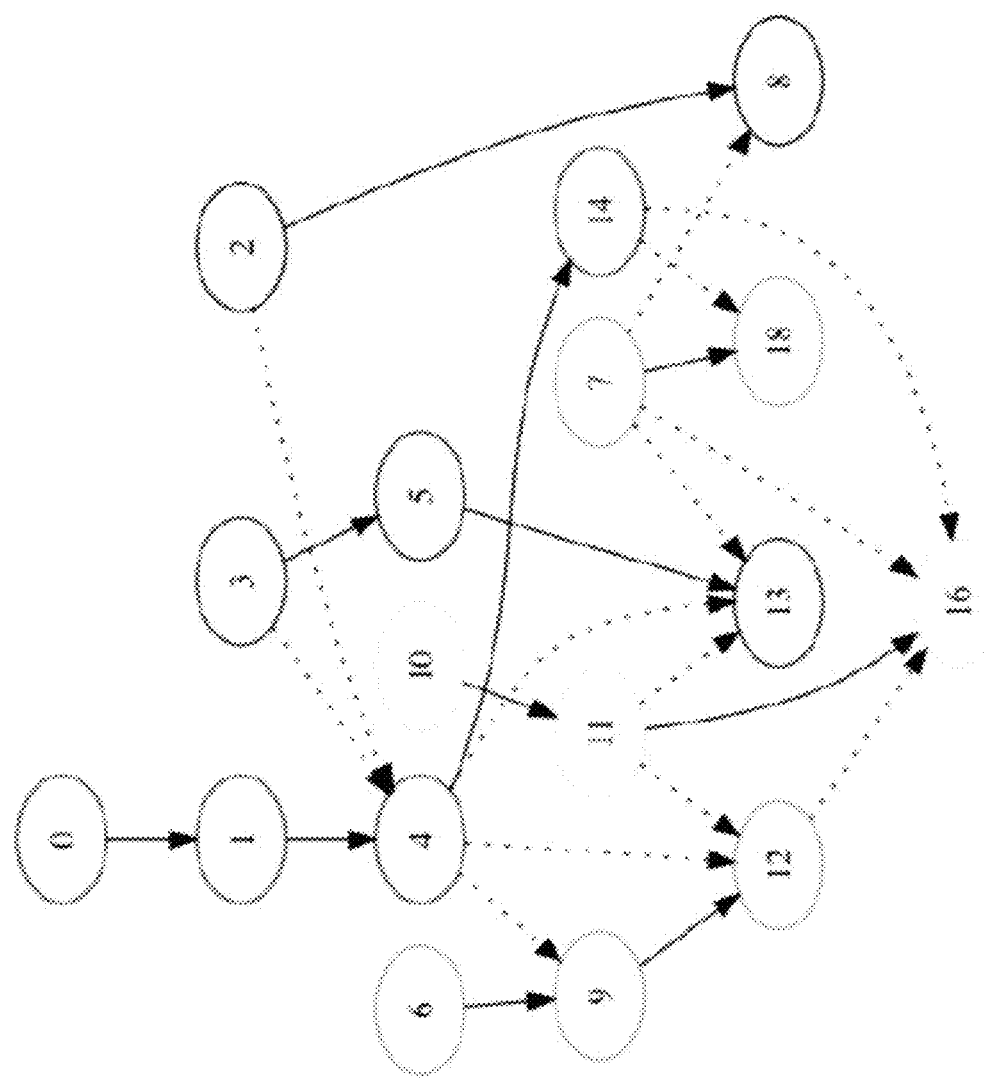
FIG. 20 is a schematic diagram illustrating an example graph implementing selective sharing with encryption and channel dependency.

FIG. 20 illustrates an example graph implementing selective sharing with encryption and channel dependency. In the illustrated example, the numbers in the vertices correspond to the transaction executed to create the vertex. In some embodiments, every write path is encrypted by a different key, for example including the write paths {0, 1, 4, 14}, {2, 8}, {3, 5, 13}, {6, 9, 12}, {7, 18}, and {10, 11, 16}.

For example, transaction 13 creates a new vertex 13 in the example illustrated in FIG. 20. The transaction itself can be encrypted by the symmetric key assigned to the write path {3, 5}, denoted as key(p). In some embodiments, nodes without the key would never see the write path {3, 5, 13} in the graph. In some embodiments, only those nodes with the correct key can decrypt and process transaction 13, which implies these nodes already see the write path {3, 5, 13}. However, in the illustrated example, to read the vertices {11, 4, 7} also requires having the keys for the {0, 1, 4, 14} path, {10, 11, 16} path, and {7, 18} path. In the illustrated example, the keys for all Read edges are included in the transaction; therefore, a node is only required to have the key to decrypt transaction 13. For instance, the key for the {0, 1, 4} path, {10, 11} path, and {7} path are included in transaction 13.

In some embodiments, transactions do not include vertices to read from. Instead, in some embodiments, transactions can include keys to the write path. In some embodiments, when a transaction is submitted by a client, it does not get a transaction number until the network includes it in the distributed ledger or blockchain. As an illustrative example, assume two clients submit transactions that depend on transaction 1. In some embodiments, the network will put them in an arbitrary sequential order and assign them transaction numbers. Assume one of these transactions is 4. In some embodiments, this will modify the state of vertex 1 into vertex 4. Assume the next transaction is 14. In some embodiments, it can no longer modify vertex 1 because it has been overwritten by vertex 4. In some embodiments, by referring to write paths indirectly with keys, a transaction is not strictly dependent on a specific transaction, which could change at any time. Instead, in some embodiments, a transaction will append a vertex on top of the current tip of a write path. That is, by including the key to the write paths in the transactions, the transactions can read from the current state of the data object that is represented by the write path.

In contrast, providing a vertex in the transaction to read from can necessitate additional computational steps. In particular, in some embodiments, since the nodes execute transactions independently and at different times, the state of the data object may change over time. In some embodiments, by including just the vertices, nodes may have to execute the transaction (which may result in an error due to state change), update the state of the data object, and execute the transaction a second time with the updated state.

In some embodiments, a transaction encrypted by the key for the Write edge can be now defined as follows:

$$T=(\text{key}(p^w), \{\text{key}(p_i^r)\}, F(\text{curr}(p^w), \text{curr}(\{p_i^r\})))$$

In some embodiments, if this is the first time anode has ever seen a particular path, it must decrypt and process all transactions encrypted by that key to reconstruct the path in the graph. For example, in some embodiments, if a node has never seen the path $\{0, 1, 4, 14\}$, it must decrypt and process transactions 0, 1, and 4 to have the current state of that path (e.g., when the node is processing transaction 13). In some embodiments, only then can it process transaction 13, which depends on 4. This can be important because, in some embodiments, there could be no other safe way to get the data from 4. In some instances, a node cannot ask another node for the data, because it may "lie" and provide incorrect data. In some embodiments, a node must execute all the transactions itself to generate the correct states, thereby verifying that the node's final view is correct, and unable to be manipulated.

In some embodiments, there can be two ways for a node to get the symmetric keys for a path. The first, explained above, can be when keys are provided as part of the Read set for a transaction. In some embodiments, to share a subgraph with a node, the symmetric key for the Write path must be delivered directly to a node to add it to the group. In some embodiments, nodes can use a key exchange protocol to securely share the symmetric keys. In some embodiments, when a node receives a symmetric key for a write path, it retrieves all previous transactions forming this write path, plus all dependent Read paths, and executes these transactions in the order they were published to reconstruct the subgraph representing this private state. For instance, in some embodiments, when a node receives a symmetric key for the write path $\{6, 9, 12\}$, the node can retrieve all the transactions in this write path, plus the dependent read paths $\{0, 1, 4\}$ and $\{10, 11\}$. In some embodiments, it executes these transactions in the order they were published. In some embodiments, the node does not require transactions 14 and 16, even though they are on the $\{0, 1, 4, 14\}$, $\{7, 18\}$, and $\{10, 11, 16\}$ write paths. In some embodiments, since these transactions occurred after transaction 12, they do not affect the $\{6, 9, 12\}$ write path.

In some embodiments, to remove anode from a group, a group must generate a new key to encrypt future transactions in the write path so that the removed node has no access to any subsequent transactions.

In some embodiments, without privacy every node processes every transaction to construct identical DAGs representing the history of all state calculations. With privacy, in some embodiments, every node constructs an induced subgraph of the DAG, limited to only the write paths for which they have the right keys. In some embodiments, a node can share a subgraph with another node by sending the symmetric key. In some embodiments, the recipient node can decrypt transactions with that key and reconstruct the subgraph. In some embodiments, all nodes with the same keys will see the same subgraph.

In some embodiments, sharing the symmetric keys for read and write edges allows a group of nodes to process transactions, while hiding the states from other nodes not in the group. However, in some embodiments, this works if the membership of the group remains constant starting from the first vertex in the write path. In such embodiments, if a group's membership changes, special care must be taken to ensure the privacy of the data.

Removing a node from a group can illustrate some of the machinery required to handle membership changes. For example, in some embodiments, if a node is removed from a group sharing a common symmetric key for a write path, a new key can be generated for the remaining members of the group. Hence, the write path may no longer be encrypted by a single key. Instead, in some embodiments, the write path is partitioned into segments, each encrypted by a different key. For example, it can now be a path $p=\{s_1, s_2, \ldots, s_n\}$, where each segment $s_i$ is a write path encrypted by a different symmetric key. In some embodiments, when a new segment is created, the new symmetric key is sent to members of the group using a key exchange protocol or other methods described herein.

In some embodiments, in order to implement this on a distributed ledger or blockchain, a pair of additional special messages may be needed to handle the symmetric keys. First, in some embodiments, a FREEZE message is sent to all members of the group. In some embodiments, this message can indicate the end of a path segment and can be encrypted by the current symmetric key. In some embodiments, any transaction encrypted by the same key that arrives after the FREEZE message can be ignored. The second special message, in some embodiments, is a ROTATE message, which indicates the beginning of a path segment. In some embodiments, this message contains the symmetric key for the previous path segment and it can be encrypted by a new symmetric key for the next path segment. In some embodiments, given only the symmetric key for the latest path segment, a node can decrypt the previous path segment by using the symmetric key concealed in the ROTATE message. In some embodiments, the combination of these two transactions demarcate the beginning and end of path segments, and allows a node to decrypt all path segments.

In some embodiments, to remove a node, additional messages can be sent out to the network. For example, in some embodiments, a FREEZE message can be sent using the current key to declare the end of a segment. In some embodiments, a new symmetric key can be generated. In some embodiments, a ROTATE message containing the current key can be encrypted with the new key. Further, in some embodiments, a node can be removed from the group, and the new key can be sent to the remaining nodes in the group.

In some embodiments, at this point the key rotation is complete and the removed node can no longer decrypt transactions sent to the group. In some embodiments, once a FREEZE message is processed, the node(s) no longer decrypts transactions with the current key. In some embodiments, any transactions using that key already sent on the network will be ignored.

In some embodiments, when a node is added to a group for a write path, the latest symmetric key is sent to the new node by a key exchange protocol or other methods described herein. However, in some instances, hundreds or thousands of transactions may have already been processed before this node was added to the group. In some embodiments, all these encrypted transactions exist on every node's local copy of the log. In some embodiments, for the new node to have a consistent view of these transactions, the new node decrypts and executes all these transactions, including dependent transactions connected by read and write edges. In some embodiments, the entire decrypted subgraph is a tree rooted at the next transaction encrypted by this same symmetric key.

In some embodiments, the decryption scheme takes into consideration the possibility that the write path may be divided into many segments. In some embodiments, the new node may need to decrypt all the segments. In some embodiments, since the new node has the latest key, it decrypts the last segment in the write path. In some embodiments, the first message in that last segment will be a ROTATE message. In some embodiments, this can contain the symmetric key for the previous segment. In some embodiments, the node will recursively decrypt each previous segment until it decrypts the entire write path. In some embodiments, by executing all the transactions in the write path, the new node will reconstruct the subgraph representing the state. At this point, in some embodiments, the new node will have the same subgraph as all other members in the group and can now safely participate in the group.

Figure 21:
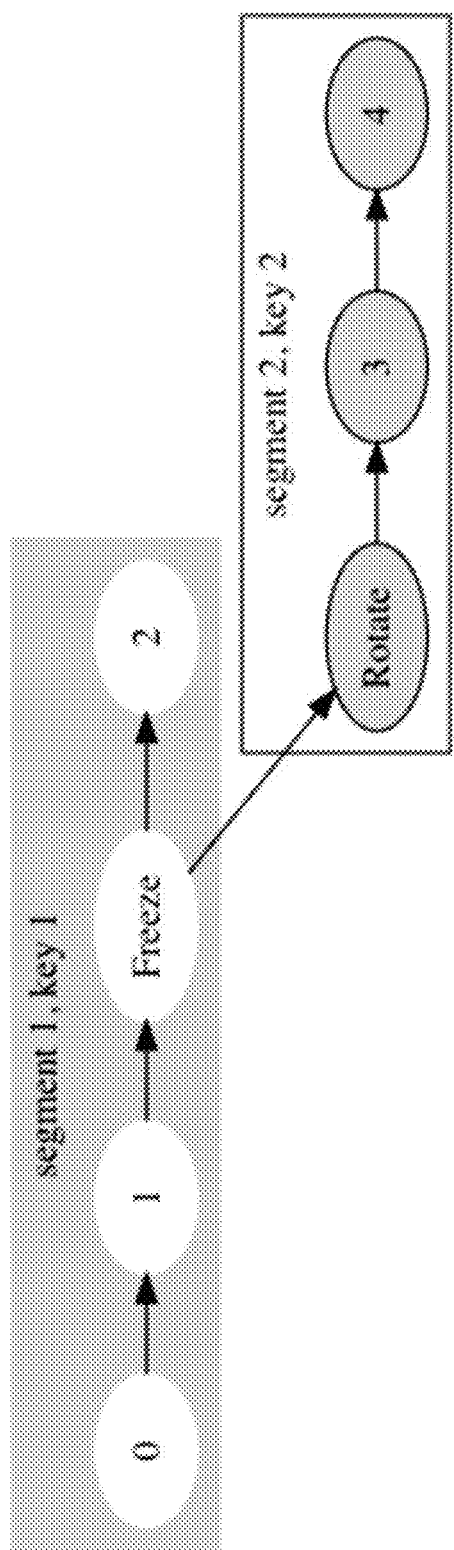
FIG. 21 is a schematic diagram illustrating an example single write path with two segments having two different keys.

FIG. 21 illustrates an example single write path with two segments having two different keys. In the illustrated example, in segment 1, all transactions are encrypted by key 1. In some embodiments, when a node processes the FREEZE message, it ignores any remaining transactions encrypted by the same key. Therefore, in the illustrated example, transaction 2 may not get executed. In some embodiment, after the FREEZE message, key 2 is generated and sent to all members of the group. Then, in some embodiments, the ROTATE key message is published, which contains key 1. In some embodiments, since all nodes will get key 2, they can decrypt and process transactions 3 and 4.

In some embodiments, when a node is added to a group, it is sent the latest key for the write path. In the example illustrated in FIG. 21, a new node can be sent key 2. This node can look at all past transactions to decrypt segment 2. When it decrypts the Rotate message, it can discover key 1. It can use this to decrypt segment 1. Once all the segments in the write path are decrypted, they can be executed in order. In some embodiments, the completion of this process ensures the node has constructed the same subgraph as all other nodes in the group.

In some embodiments, as discussed above, transactions can include a special input called "proof" to independently verify if input states are valid. In some embodiments, special input of a transaction can be the symmetric key. In such instances, the "proof" can include decrypting the subgraph encrypted by the symmetric key.

Example Implementation of Private Data Sharing on a DLT Platform

In some embodiments, the systems, methods, and devices described herein can be stored as a program component that is executed by a CPU at every node within the distributed ledger. In some embodiments, some features discussed herein enable displaying data selectively across the nodes within the distributed ledger. In some embodiments, some features discussed herein also ensure consistency of data across the nodes within the distributed ledger. Consequently, in some embodiments, verifiably accurate data can be provided across the nodes while also maintaining privacy as required.

In some embodiments, the generating of DAGs of transactions can be developed by employing development tools and languages such as, but not limited to: Apache components, Assembly, ActiveX, binary executables, (ANSI) (Objective-) C (++), C# and/or .NET, database adapters, CGI scripts, Golang, Java, JavaScript, mapping tools, procedural and object oriented development tools, Pascal, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); Representational State Transfer (REST); SWFObject; Yahoo! User Interface; and/or the like), WebObjects, and/or the like. In some embodiments, some features and technologies disclosed herein implement key exchange protocols such as Diffie-Hellman key exchange or RSA key transport to securely exchange keys to segments of write path between nodes in the distributed ledger.

An example pseudocode implemented by a processor (and/or processors) within a node on a distributed ledger or blockchain to generate DAGs, decrypt transactions, and/or exchange keys, according to some embodiments, is provided below:

```
from functools import singledispatch
from collections import namedtuple, defaultdict
from networkx import DiGraph
from pyrsistent import m
State = namedtuple('State', ['name', 'key'])
Transaction = namedtuple('Transaction', ['write_state', 'read_states', 'func'])
NewChannel = namedtuple('NewChannel', ['write_state'])
FreezeChannel = namedtuple('FreezeChannel', ['write_state'])
RotateState = namedtuple('RotateState', ['write_state', 'prev_key'])
SendKey = namedtuple('Sendkey', ['write_state'])
Encrypt = namedtuple('Encrypt', ['key', 'data'])
class Node:
    def __init__(self, pub_key = "MYKEY"):
        self.PublicKey = pub_key
        self.KEYS = ['null']
        self.PendingTX = { }
        self.StateGraph = DiGraph( )
        self.StateGraph.add_node(-1, state=m( )) # public state
        self.WritePaths = defaultdict(list, public=[-1]) #type: Dict [str, List[Tuple[int,pMap]]]
    def catchup(n, curr_txi, name, key):
        if not key in n.KEYS:
            n.KEYS.append(key)
            if key in n.PendingTX:
                for packet, ptxi in n.PendingTX[key]:
                    execute(packet.data, n, ptxi)
                del n.PendingTX[key]
            else:
                pass # no tx yet
        if n.WritePaths[name]:
            txi = next(i for i in n.WritePaths[name] if i < curr_txi)
            return txi
# Messages
@singledispatch
def execute(command, node, tx_index):
    assert False, "Invalid command type: " + str(type(command))
@execute.register(Transaction)
```

```
def _(c, n, txi):
name, key = c.write_state
write_txi = catchup(n, txi, *c.write_state)
read_txis = [catchup(n, txi, *state) for state in c.read_states]
write_map = n.StateGraph.nodes[write_txi]["state"]
read_maps = [n.StateGraph.nodes[r]["state"] for r in read_txis]
new_map = c.func(write_map, *read_maps)
n.StateGraph.add_node(txi, action="transaction", state=new_map)
n.StateGraph.add_edge(txi, write_txi, label="write")
n.StateGraph.add_edges_from(((txi, r) for r in read_txis), label="read")
n.WritePaths[name].insert(0, txi)
@execute.register(NewChannel)
def _(c, n, txi):
name, key = c.write_state
n.StateGraph.add_node(txi, state=m( ))
n.WritePaths[name].insert(0, txi)
@execute.register(FreezeChannel)
def _(c, n, txi):
name, key = c.write_state
prev = catchup(n, txi, name, key)
n.StateGraph.add_node(txi, action="freeze",
state=n.StateGraph.nodes[prev]['state'])
n.StateGraph.add_edge(txi, prev, label="write")
n.WritePaths[name].insert(0, txi)
@execute.register(RotateState)
def _(c, n, txi):
name, key = c.write_state
prev = catchup(n, txi, name, c.prev_key)
n.StateGraph.add_node(txi, action="rotate",
state=n.StateGraph.nodes[prev]['state'])
n.StateGraph.add_edge(txi, prev, label="write")
n.WritePaths[name].insert(0, txi)
@execute.register(SendKey)
def _(c, n, txi):
name, key = c.write_state
catchup(n, txi, name, key)
def dispatch(node, packet, txi):
k = packet.key
if k in node.KEYS:
execute(packet.data, node, txi)
elif k == node.PublicKey:
execute(packet.data, node, txi)
else:
node.PendingTX[k] = node.PendingTX.get(k, [ ]) + [(packet, txi)]
```

As such, in some embodiments, the systems, devices, and methods described herein allow trustless sharing of private data on a blockchain. In some embodiments, transactions can be selectively shared with some nodes in the blockchain and hidden from other nodes in the blockchain to protect privacy of the data. In some embodiments, transactions in the blockchain are arranged in a dependency graph with labeled edges. In some embodiments, a graph with read paths and write paths is generated as the transactions are executed. In some embodiments, each write path can be encrypted with a key thereby selectively hiding data from nodes that do not possess the key. In some embodiments, each node sees a subgraph containing only those vertices and edges for which they have the appropriate encryption keys. In some embodiments, subgraphs can be decrypted by using the appropriate encryption keys. In some embodiments, the union of all these subgraphs is the complete graph representing the global state of the blockchain.

In some embodiments, a computer-implemented method to selectively share data across a plurality of nodes in a blockchain by maintaining consistency of the data comprises: at a first node in the plurality of nodes: obtaining a first key via a key exchange protocol from a second node in the plurality of nodes; decrypting at least one transaction encrypted by the first key, the at least one transaction being executed in order starting from latest transaction to earliest transaction; executing the at least one transaction, the execution including generating a directed acyclic graph (DAG) of the at least one transaction; processing the at least one transaction based on the generated DAG; processing at least one dependent transaction of the at least one transaction by connecting read edges and write edges of the at least one transaction based on the generated DAG; and storing a local copy of the decrypted and processed DAG.

In some embodiments, a computer-implemented method to selectively eliminate sharing data with a first node in plurality of nodes in a blockchain to protect the privacy of the data comprises: at a second node in the plurality of nodes: transmitting to each node in the plurality of nodes a FREEZE transaction using a first key; generating a second key; generating a rotate transaction, the rotate transaction including the first key and encrypted with the second key; and transmitting the second key to each node in the plurality of nodes except the first node.

Example Hardware Configuration of Computing System

Figure 11:
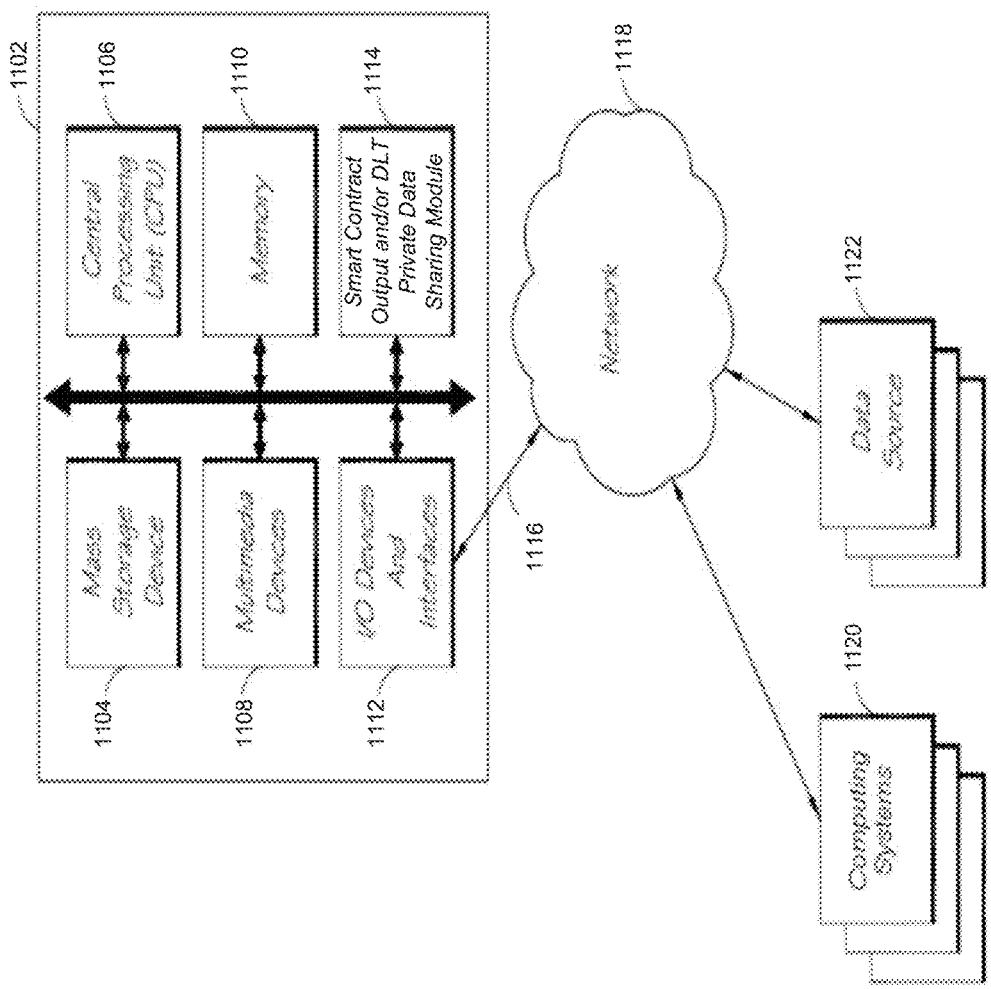
FIG. 11 illustrates an embodiment of a hardware configuration for a computing system usable with embodiments of the present disclosure.

FIG. 11 illustrates an embodiment of a hardware configuration for a computing system that can be used to implement the systems, processes, and methods described herein.

For instance, the example computer system 1102 is in communication with one or more computing systems 1120 and/or one or more data sources 1122 via one or more networks 1118. While FIG. 11 illustrates an embodiment of a computing system 1102, it is recognized that the functionality provided for in the components and modules of computer system 1102 may be combined into fewer components and modules, or further separated into additional components and modules.

The computer system 1112 can comprise a Smart Contract Output and/or DLT Private Data Sharing module 1114 that carries out the functions, methods, acts, and/or processes described herein. The DLT Private Data Sharing module 1114 is executed on the computer system 1102 by a central processing unit 1106 discussed further below.

In general the word "module," as used herein, refers to logic embodied in hardware or firmware or to a collection of software instructions, having entry and exit points. Modules are written in a program language, such as JAVA, C or C++, PYTHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1102 includes one or more processing units (CPU) 1106, which may comprise a microprocessor. The computer system 1102 further includes a physical memory 1110, such as random access memory (RAM) for temporary storage of information, a read only memory (ROM) for permanent storage of information, and a mass storage device 1104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1102 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1102 includes one or more input/output (I/O) devices and interfaces 1112, such as a keyboard, mouse, touch pad, and printer. The I/O devices and interfaces 1112 can include one or more display devices, such as a monitor, that allows the visual presentation of data to a participant. More particularly, a display device provides for the presentation of GUIs as application software data, and multi-media presentations, for example. The I/O devices and interfaces 1112 can also provide a communications interface to various external devices. The computer system 1102 may comprise one or more multi-media devices 1108, such as speakers, video cards, graphics accelerators, and microphones, for example.

The computer system 1102 may run on a variety of computing devices, such as a server, a Windows server, a Structure Query Language server, a Unix Server, a personal computer, a laptop computer, and so forth. In other embodiments, the computer system 1102 may run on a cluster computer system, a mainframe computer system and/or other computing system suitable for controlling and/or communicating with large databases, performing high volume transaction processing, and generating reports from large databases. The computing system 1102 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 1102 illustrated in FIG. 11 is coupled to a network 1118, such as a LAN, WAN, or the Internet via a communication link 1116 (wired, wireless, or a combination thereof). Network 1118 communicates with various computing devices and/or other electronic devices. Network 1118 is communicating with one or more computing systems 1120 and one or more data sources 1122. The Smart Contract Output and/or DLT Private Data Sharing module 1114 may access or may be accessed by computing systems 1120 and/or data sources 1122 through a web-enabled user access point. Connections may be a direct physical connection, a virtual connection, and other connection type. The web-enabled user access point may comprise a browser module that uses text, graphics, audio, video, and other media to present data and to allow interaction with data via the network 1118.

Access to the Smart Contract Output and/or DLT Private Data Sharing module 1114 of the computer system 1102 by computing systems 1120 and/or by data sources 1122 may be through a web-enabled user access point such as the computing systems' 1120 or data source's 1122 personal computer, cellular phone, smartphone, laptop, tablet computer, e-reader device, audio player, or other device capable of connecting to the network 1118. Such a device may have a browser module that is implemented as a module that uses text, graphics, audio, video, and other media to present data and to allow interaction with data via the network 1118.

The output module may be implemented as a combination of an all-points addressable display such as a cathode ray tube (CRT), a liquid crystal display (LCD), a plasma display, or other types and/or combinations of displays. The output module may be implemented to communicate with input devices 1112 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the computing system 1102 may comprise a physical or logical connection established between a remote microprocessor and a mainframe host computer for the express purpose of uploading, downloading, or viewing interactive data and databases on-line in real time. The remote microprocessor may be operated by an entity operating the computer system 1102, including the client server systems or the main server system, and/or may be operated by one or more of the data sources 1122 and/or one or more of the computing systems 1120. In some embodiments, terminal emulation software may be used on the microprocessor for participating in the micro-mainframe link.

In some embodiments, computing systems 1120 which are internal to an entity operating the computer system 1102 may access the Smart Contract Output and/or DLT Private Data Sharing module 1114 internally as an application or process run by the CPU 1106.

The computing system 1102 may include one or more internal and/or external data sources (for example, data sources 1122). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1102 may also access one or more databases 1122. The databases 1122 may be stored in a database or data repository. The computer system 1102 may access the one or more databases 1122 through a network 1118 or may directly access the database or data repository through I/O devices and interfaces 1112. The data repository storing the one or more databases 1122 may reside within the computer system 1102.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server.

The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Embodiments

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of providing a distributed ledger technology-based database, the method comprising:
   generating, by a computer system, a subscription of a user identity registered on a first decentralized network node of a decentralized network node system to a dataset on the distributed ledger technology-based database, wherein generation of the subscription is based at least in part on a first plurality of predetermined electronic actions deployed on the distributed ledger technology-based database, wherein the first plurality of predetermined electronic actions are configured to direct a subscription process, wherein the dataset is provided to the distributed ledger technology-based database by a second decentralized network node of the decentralized network node system,
   wherein the subscription process results in a codified joint agreement establishing a right of the user identity registered on the first decentralized network node to receive the dataset from the second decentralized network node over the decentralized network node system,
   wherein generation of the subscription of the user identity registered on the first decentralized network node to the dataset on the distributed ledger technology-based database is initiated based at least in part by the user identity registered on the first decentralized network node initiating subscription to the dataset among a plurality of datasets stored on the distributed ledger technology-based database by executing a second plurality of predetermined electronic actions deployed on the distributed ledger technology-based database, wherein the second plurality of predetermined electronic actions are configured to initiate the subscription,
   wherein the distributed ledger technology-based database is formed by the first decentralized network node and the second decentralized network node,
   wherein each of the first decentralized network node and the second decentralized network node comprises a computer processor and an electronic storage medium,
   wherein a first smart contract deployed on the distributed ledger technology-based database comprises the first plurality of predetermined electronic actions, wherein a second smart contract deployed on the distributed ledger technology-based database comprises the second plurality of predetermined electronic actions,
   wherein the distributed ledger technology-based database comprises a blockchain, and
   wherein the computer system comprises a computer processor and an electronic storage medium.

2. The method of claim 1, wherein the first smart contract and the second smart contract comprise a single smart contract deployed on the distributed ledger technology-based database comprises the first plurality of predetermined electronic actions and the second plurality of predetermined electronic actions.

3. The method of claim 1, wherein the dataset provided to the distributed ledger technology-based database by the second decentralized network node is broadcast to all decentralized network nodes of the decentralized network node system.

4. The method of claim 1, wherein each decentralized network node of the decentralized network node system maintains a local copy of the distributed ledger technology-based database.

5. The method of claim 1, wherein the dataset is encrypted with a key before the dataset is provided to the distributed ledger technology-based database by the second decentralized network node, wherein the subscription process further results in the user identity registered on the first decentralized network node being provided with the key, and wherein the key enables the first decentralized network node to decrypt the encrypted dataset.

6. The method of claim 5, wherein the provision of the key to the user identity registered on the first decentralized network node provides access to the user identity to a private channel for accessing the dataset.

7. The method of claim 1, wherein the user identity registered on the first decentralized node is permissioned to execute the second plurality of predetermined electronic actions deployed on the distributed ledger technology-based database.

8. The method of claim 1, wherein the second decentralized node is permissioned to execute the first plurality of predetermined electronic actions deployed on the distributed ledger technology-based database.

9. The method of claim 1, further comprising deploying a third plurality of predetermined electronic actions configured to direct an index generation process for calculating an index value.

10. The method of claim 1, further comprising generation of a data product by the first decentralized network node, wherein generation of the data product is based at least in part on a third plurality of predetermined electronic actions configured to direct a data product generation process based at least in part on the dataset and the subscription of the first decentralized network node of the decentralized network node system to the dataset.

11. The method of claim 1, wherein the dataset comprises one or more financial index data, wherein the one or more financial index data comprises a list of constituent securities and weightings for the list of constituent securities.

12. The method of claim 1, wherein a platform providing for generation of the subscription is operated on each decentralized network node of the decentralized network node system, including the first decentralized network node and the second decentralized network node.

13. The method of claim 1, wherein the first smart contract and the second smart contract comprise separate smart contracts deployed on the distributed ledger technology-based database.

14. The method of claim 1, wherein the plurality of datasets stored on the distributed ledger technology-based database are datasets broadcast as available for distribution over the decentralized network node system.

15. A decentralized network node system comprising:
- a plurality of decentralized network nodes each comprising a computer processor and an electronic storage medium, wherein the plurality of decentralized network nodes includes a first decentralized network node and a second decentralized node;
- a platform operating on the plurality of decentralized network nodes; and
- a distributed ledger technology-based database maintained by the plurality of decentralized network nodes through the platform,
- wherein the platform is configured for generation of a subscription of a user identity registered on the first decentralized network node to a dataset on the distributed ledger technology-based database, wherein generation of the subscription is based at least in part on a first plurality of predetermined electronic actions deployed on the distributed ledger technology-based database, wherein the first plurality of predetermined electronic actions are configured to direct a subscription process, wherein the dataset is provided to the distributed ledger technology-based database by the second decentralized network node,
- wherein the subscription process results in a codified joint agreement establishing a right of the user identity registered on the first decentralized network node to receive the dataset from the second decentralized network node over the decentralized network node system,
- wherein generation of the subscription of the user identity registered on the first decentralized network node to the dataset on the distributed ledger technology-based database is initiated based at least in part by the user identity registered on the first decentralized network node initiating subscription to the dataset among a plurality of datasets stored on the distributed ledger technology-based database by executing a second plurality of predetermined electronic actions deployed on the distributed ledger technology-based database, wherein the second plurality of predetermined electronic actions are configured to initiate the subscription,
- wherein a first smart contract deployed on the distributed ledger technology-based database comprises the first plurality of predetermined electronic actions, wherein a second smart contract deployed on the distributed ledger technology-based database comprises the second plurality of predetermined electronic actions,
- wherein the distributed ledger technology-based database comprises a blockchain.

16. The decentralized network node system of claim 15, wherein the first smart contract and the second smart contract are separate smart contracts.

17. The decentralized network node system of claim 15, wherein the first smart contract and the second smart contract comprise a single smart contract.

18. The decentralized network node system of claim 15, wherein the dataset is encrypted with a key before the dataset is provided to the distributed ledger technology-based database by the second decentralized network node, wherein the subscription process further results in the user identity registered on the first decentralized network node being provided with the key, and wherein the key enables the first decentralized network node to decrypt the encrypted dataset.

19. The decentralized network node system of claim 15, wherein the platform is further configured for the generation of a data product by the first decentralized network node, wherein generation of the data product is based at least in part on a third plurality of predetermined electronic actions configured to direct a data product generation process based at least in part on the dataset and the subscription of the first decentralized network node of the decentralized network node system to the dataset.

* * * * *